(12) United States Patent
Ensing

(10) Patent No.: US 10,831,817 B2
(45) Date of Patent: *Nov. 10, 2020

(54) SYSTEMS AND METHODS FOR GENERATING TARGETED MEDIA CONTENT

(71) Applicant: Maris Jacob Ensing, Orange, CA (US)

(72) Inventor: Maris Jacob Ensing, Orange, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/380,847

(22) Filed: Apr. 10, 2019

(65) Prior Publication Data

US 2020/0019565 A1    Jan. 16, 2020

Related U.S. Application Data

(63) Continuation-in-part of application No. 16/142,435, filed on Sep. 26, 2018, now Pat. No. 10,484,818, and
(Continued)

(51) Int. Cl.
*G06F 16/535*    (2019.01)
*G06K 9/00*    (2006.01)

(52) U.S. Cl.
CPC ....... *G06F 16/535* (2019.01); *G06K 9/00087* (2013.01); *G06K 9/00624* (2013.01); *G06K 2209/15* (2013.01)

(58) Field of Classification Search
CPC .... G06Q 50/01; G06Q 10/10; G06Q 30/0261; G06Q 10/02; G06Q 30/02; G06Q 30/0601; G06Q 10/00; G06Q 30/0207; G06Q 20/0453; G06Q 20/3278; G06Q 20/40145; G06Q 30/0258; G06Q 30/0259; G06Q 30/0267; G06Q 20/32; G06Q 50/265; G06Q 30/0643; G06Q 20/3823; G06Q 30/32; G06Q 20/4014; G06Q 50/22;
(Continued)

(56) References Cited

U.S. PATENT DOCUMENTS 6,072,894 A    6/2000  Payne
6,549,118 B1   4/2003  Seal et al.
(Continued)

FOREIGN PATENT DOCUMENTS

KR    10-2011-0137469 A    12/2011
KR    10-2016-0027576 A    3/2016
KR    10-2017-0011862 A    2/2017

OTHER PUBLICATIONS

Non-Final Office Action on co-pending U.S. Appl. No. 16/036,625, dated Apr. 5, 2019.
(Continued)

*Primary Examiner* — Nimesh Patel
(74) *Attorney, Agent, or Firm* — Klein, O'Neill & Singh, LLP

(57) ABSTRACT

Systems and methods for generating targeted media content capture an image from an image capture device. The system can analyze the image to recognize an image fingerprint, such as a facial feature or a license plate. Some image fingerprints can be correlated with one another, for example a person's face can be correlated with a car license plate. The system then correlates image fingerprints with attributes, which could be used to select media content that is specialized for those attributes. The system can also collect correlative information to enhance the attribute and image fingerprint capabilities.

20 Claims, 44 Drawing Sheets

Related U.S. Application Data a continuation-in-part of application No. 16/111,109, filed on Aug. 23, 2018, which is a continuation-in-part of application No. 16/036,625, filed on Jul. 16, 2018.

(58) Field of Classification Search
CPC ............ G06Q 20/3227; G06Q 20/363; G06Q 30/0631; G06Q 50/24; G06Q 10/1097; G06Q 20/3276; G06Q 20/34; G06Q 20/367; G06Q 20/3674; G06Q 20/382; G06Q 20/40; G06Q 50/12; H04L 51/32; H04L 67/306; H04L 67/18; H04L 51/38; H04L 51/20; H04L 63/107; H04L 43/08; H04L 43/04; H04L 63/0861; H04L 67/02; H04L 63/102; H04L 63/10; H04L 63/0892; H04L 63/08; H04L 63/12; H04L 2209/80; H04L 63/108; H04L 9/32; H04L 9/3231; H04L 41/0806; H04L 67/303; H04L 63/1416; H04L 65/1059; H04L 2209/608; H04L 43/16; Y02D 70/1262; Y02D 70/142; Y02D 70/144; Y02D 70/146; Y02D 70/164; Y02D 70/22; Y02D 70/1242; Y02D 70/1222; Y02D 10/24; Y02D 70/166; Y02D 70/26; Y02D 70/23; H04W 4/21; H04W 4/02; H04W 4/023; H04W 4/029; H04W 4/021; H04W 52/0254; H04W 4/027; H04W 12/06; H04W 64/00; H04W 50/0258; H04W 12/08; H04W 4/025; H04W 52/0225; H04W 52/0251; H04W 4/90; H04W 52/18; H04W 4/23; H04W 4/80; H04W 88/02; G06F 16/29; G06F 3/0482; G06F 2221/2111; G06F 2201/805; G06F 21/88; G06F 21/32; G06F 21/31; G06F 21/554; G06F 2221/2149; G06F 21/50; G06F 17/2765; G06F 21/60; G06F 21/316; G06F 21/602; G06F 21/6245; G06F 19/3418; G06F 19/30; G06F 19/325; G06F 1/163; G06F 2203/011; G06F 3/005; G06F 3/013; G06F 3/017; G06F 3/04815; G06K 9/00288; G06K 9/00677; G06K 9/00711; G06K 9/00228; G06K 9/00013; G06K 9/00221; G06K 9/00335; G06K 9/00369; G06K 9/00778; G06K 9/00302; G06K 9/00771; G06K 9/4642; G06K 9/00785; G06K 19/10; G06K 2209/01; G06K 9/00362; G06K 9/00664; G06K 9/00671; G06K 9/00892; G01S 2205/006; G01S 2205/008; G01S 5/0009; G01S 5/0018; G01S 5/0054; G01S 19/17; G01S 5/0231; G08B 13/1963; G08B 21/10; G08B 13/00; G08B 13/1961; G08B 13/19641; G08B 13/19697; G08B 25/006; G08B 25/08; G08B 25/14; G08B 13/196; G08B 13/19689; G08B 25/10; G08B 7/068; G08B 13/126; G08B 13/19613; G08B 13/1966; G08B 25/005; H04M 1/72536; H04M 2201/50; H04M 2242/04; H04M 1/66; H04M 2250/14; H04M 11/007; H04M 2250/52; A61B 5/0022; A61B 5/746; A61B 2503/06; A61B 5/002; A61B 5/02438; A61B 5/1118; A61B 5/747

See application file for complete search history.

(56) References Cited

U.S. PATENT DOCUMENTS

| | | |
|---|---|---|
| 8,504,843 B2 | 8/2013 | Tu |
| 8,539,357 B2 | 9/2013 | Hildreth |
| 8,589,968 B2 | 11/2013 | Klberth et al. |
| 8,700,451 B2 | 4/2014 | Jayakody |
| 8,712,110 B2 | 4/2014 | Eckhoff et al. |
| 8,725,567 B2 | 5/2014 | Huang et al. |
| 8,791,787 B2 | 7/2014 | Hardacker et al. |
| 8,965,170 B1 | 2/2015 | Benea et al. |
| 9,363,155 B1 | 6/2016 | Gravino et al. |
| 9,575,558 B2 | 2/2017 | Almen et al. |
| 9,767,346 B2 | 9/2017 | Govindara et al. |
| 9,875,719 B2 | 1/2018 | Eckhoff et al. |
| 10,123,066 B2 | 11/2018 | Zhang et al. |
| 10,165,333 B2 | 12/2018 | Patel et al. |
| 2005/0225637 A1 | 10/2005 | Eghbalian |
| 2007/0024580 A1 | 2/2007 | Sands et al. |
| 2007/0291998 A1 | 12/2007 | Takizawa et al. |
| 2008/0004951 A1 | 1/2008 | Huang et al. |
| 2010/0071003 A1 | 3/2010 | Bychkov et al. |
| 2010/0177193 A1 | 7/2010 | Flores |
| 2011/0052012 A1 | 3/2011 | Bambha et al. |
| 2011/0072452 A1 | 3/2011 | Shimy et al. |
| 2012/0174143 A1 | 7/2012 | Yang et al. |
| 2013/0061258 A1 | 3/2013 | Takaya et al. |
| 2013/0194406 A1 | 8/2013 | Liu et al. |
| 2013/0219417 A1 | 8/2013 | Gilson et al. |
| 2013/0243260 A1 | 9/2013 | Burry et al. |
| 2013/0312018 A1 | 11/2013 | Elliot et al. |
| 2014/0168477 A1 | 6/2014 | David |
| 2015/0150031 A1 | 5/2015 | Gibbon et al. |
| 2015/0160035 A1 | 6/2015 | Longo et al. |
| 2015/0304727 A1 | 10/2015 | Vandichalrajan |
| 2015/0319506 A1 | 11/2015 | Kansara et al. |
| 2016/0110591 A1 | 4/2016 | Smith et al. |
| 2016/0140107 A1 | 5/2016 | Cecchi et al. |
| 2016/0343237 A1 | 11/2016 | Herman et al. |
| 2017/0171613 A1 | 6/2017 | Ku et al. |
| 2017/0177923 A1 | 6/2017 | Zheng et al. |
| 2017/0214728 A1 | 7/2017 | Chan et al. |
| 2017/0295215 A1 | 10/2017 | Syed |
| 2017/0289596 A1 | 11/2017 | Krasadakis et al. |
| 2017/0352256 A1 | 12/2017 | Miwa |
| 2018/0091854 A1 | 3/2018 | Greenberger et al. |
| 2018/0108040 A1 | 4/2018 | Kim et al. |
| 2018/0211187 A1 | 7/2018 | Chen et al. |
| 2018/0357667 A1 | 12/2018 | Hall et al. |
| 2018/0357981 A1 | 12/2018 | Ng et al. |
| 2019/0034710 A1 | 1/2019 | Dickinson et al. |

OTHER PUBLICATIONS

Non-Final Office Action on co-pending U.S. Appl. No. 16/142,435, dated Apr. 29, 2019.
Non-Final Office Action on co-pending U.S. Appl. No. 16/036,625, dated Feb. 24, 2020.
International Search Report on corresponding PCT application (PCT/US2019/041431) from International Searching Authority (KIPO) dated Jan. 30, 2020.
Written Opinion on corresponding PCT application (PCT/US2019/041431) from International Searching Authority (KIPO) dated Jan. 30, 2020.
Final Office Action on co-pending U.S. Appl. No. 16/111,109, dated Apr. 2, 2020.

SYSTEMS AND METHODS FOR GENERATING TARGETED MEDIA CONTENT

CROSS-REFERENCE TO RELATED APPLICATIONS

This application is a Continuation-In-Part application of currently pending U.S. patent application Ser. No. 16/142,435, filed Sep. 26, 2018, and it is also a Continuation-In-Part application of currently pending U.S. patent application Ser. No. 16/111,109, filed Aug. 23, 2018, which is a Continuation-In-Part of U.S. patent application Ser. No. 16/036,625, filed Jul. 16, 2018. The subject matter of all applications cited herein are hereby incorporated by reference in its entirety as if set forth herein.

FEDERALLY FUNDED RESEARCH OR DEVELOPMENT

Not Applicable

BACKGROUND

The present disclosure relates generally to providing or supplementing media content based on one or more images captured by an image capture device.

There are many types of media delivery systems used by companies, such as, for example, billboards, service kiosks, drive-through windows, and gas station pumps, that display media to consumers in a variety of locations, such as, for example, museums, galleries, theme parks, audience centers, zoos, and roads. Often, to enhance the viewer experience, these media delivery systems will provide media content, for example to inform, educate or entertain a target audience, and/or to advertise goods or services. The media content is often played back on a display, speakers, headphones, and/or other playback devices, such as, for example, a portable or handheld device (e.g., a tablet or smartphone).

One aspect of providing media content to supplement a media delivery system is providing content that will be of interest or entertaining to the audience members. Each audience may be made up of various members that have different interests and needs. Thus, those skilled in the art are constantly striving to provide systems and methods that provide media content that supplements media delivery systems to meet the needs of each particular audience member.

SUMMARY

Systems and methods in accordance with various aspects of this disclosure provide targeted media content based upon a set of images captured. The media content computer system is generally electronically coupled to any media content playback device(s) and the image-capturing devices of the system. As used herein, an electronic or a functional connection is one that allows two electronic devices to transmit data to one another. An electronic connection may be wired or wireless using any suitable data-coupling technology.

In preferred embodiments, a set of images is analyzed to determine the most effective targeted media content appropriate. One or more images are generally analyzed by a media content computer system to generate identifiers as a function of image fingerprints found in a set of images, for example by transmitting queries to an image database that correlates image fingerprints with identifiers.

The media content computer system could also be programmed to analyze identifiers to determine related identifiers that are not found in a set of images, for example by transmitting queries to a relationship database that correlates identifiers that are related to one another. Exemplary related identifiers include identifiers of occupants (e.g. drivers and/or passengers) that are known to ride within an identified vehicle, or identifiers of students that are known to follow an identified teacher. In preferred embodiments, the media content computer system could generate new relationships through analysis of a set of images, and can also create expiration times for any relationships such that a relationship could be deleted upon a time threshold. For example, a media content computer system could analyze a set of images that contain three people identified via facial recognition algorithms who all enter a car having a license plate. Unique identifiers of each of the three people and the car could be associated with one another in the relationship database, such that each person has a relationship with the car. Relationships could be set to expire as a function of an algorithm, for example a person who sits in a driver's seat could be configured to have a permanent relationship or a relationship that expires within a year while a person who sits in a passenger seat could have a relationship set to expire within a threshold time period (e.g. a few days, a week).

The media content computer system preferably uses some or all of the identifiers to determine attributes that are related to the identifiers, for example by transmitting queries to an attribute database that correlates an identifier with one or more attributes. In some embodiments, the media content computer system could further populate the attribute database by analyzing one or more transactions. A set of images could be taken of an individual identified by their facial fingerprint, and recognition of an action indicative of a transaction taking place, for example a movement to swipe an RFID (Radio Frequency Identifier) chip in front of a gas station pump or a movement to provide a credit card to a cash register attendant. That transaction identifier could be correlated with a transaction that is recorded by a transactional capture device, such as a cash register or a gas station pump via any suitable means, for example via a time-stamp or a bar code, such that transaction information could then be associated with the person's identifier in the attribute database.

With such gleaned attributes, one or more samples of media content could be generated, for example by transmitting queries to a media content database that correlates one or more attributes with media content. For example, an individual who purchases a certain type of good could be provided media content associated with that good, or an individual who prefers media content with subtitles could be provided media content with subtitles. The media content system could further monitor individuals' actions in response to the playing media content to alter the media content, for example an individual who is not looking at a display within a threshold period of time could trigger the media content system to cycle the playing media content with a different media content file. Attributes in the attribute database could also further be modified as a function of observed actions.

In some embodiments, a media content computer system could be programmed to identify a transaction, for example a payment for fuel at a filling station or a payment for one or more items at a cash register or other electronic payment station. In some embodiments, the media content computer system could be programmed with an advanced algorithmic analysis program that recognizes transactional movements and goods from a detailed set of images to derive transaction attributes (e.g. identifies a facial fingerprint, identifies a purchase, and identifies a good to associate an identifier of the facial fingerprint with an attribute of that good). In preferred embodiments, the media content computer system cooperates with transactional capture devices that capture a set of transaction attributes and a captured transaction identifier. Such captured transaction identifiers captured by the transactional capture device could then be matched with generated transaction identifiers derived from an analysis of a set of images. Contemplated transaction identifiers include time-stamp values and partial or whole account numbers (e.g. credit card account numbers or membership IDs). Contemplated transactional capture devices include filling station pumps, service kiosks, and cash register computer systems. Matched transaction identifiers could then be used to update an attribute database using transaction attributes captured by a transactional capture device correlated with identifiers derived from an image fingerprint.

In one embodiment, a media content system and method may also determine playback parameters for the media content. In accordance with some aspects, a configuration of an interactive touchscreen or other input device may be modified based upon the captured image. In accordance with a number of these aspects, a subsequent image may be captured, and the media content and/or playback parameters are updated based upon the subsequent image. For example, an image may identify a height of a person relative to a height of a touchscreen, which triggers the system to move a user interface of the touchscreen to a new height as a function of the person's height, or an image may identify a person having an English primary language attribute, which triggers the system to play media non-English content with English subtitles.

A media content-providing system in accordance with this disclosure could optionally include one or more of an exhibit control system, module, or functionality; a content control system, module, or functionality; an image analysis system, module, or functionality; and a facial recognition system, module, or functionality. The exhibit control function may advantageously be provided by a computer system that is connected to an image capture device (e.g., a camera) focused on an audience area near the exhibit, and one or more media playback devices. The computer system could control the camera to capture images of the audience area, process the image to recognize identifiers associated with attributes, and provide the attributes to a content control system, module, or functionality. The computer system then receives media content information to download media content from a third party or it receives media content directly. The media content is then played back by the playback devices. The media content information may include playback parameters for the media content, and the computer system may advantageously adjust the playback parameters based on information from the facial recognition system. The content control function may be performed by a computer system, a database storing media content associated with the exhibit, and a database that stores audience member information. The content control system or module receives the image from the exhibit control system or module and provides the image to the image analysis system or module and/or facial recognition system or module. The content control system or module then receives audience information from the image analysis system or module and/or the facial recognition system or module, and it determines the media content and playback parameters that are sent to the exhibit control system or module. The image analysis system or module receives the image of the audience area from the content control system or module, analyzes the image, and returns audience information attributes determined based on the image analysis to the content control system or module.

Contemplated media delivery systems further include any device suitable for delivering media content to an audience member, preferably in a video/audio format, although other forms of media content could be used, for example smell, taste, or tactile formats. In accordance with some aspects of this disclosure, a media delivery system includes an image capture device operable to obtain an image, a media content playback device, a processor, and memory that stores instructions for the processor, media content that can be played on the playback device, and a database that stores identifier relationships between media content and identified entities within a captured image. The instructions cause one or more processors of the media delivery system to receive the image from the image capture device. The image is analyzed to determine image identifiers, and the image identifiers are matched with related media content in the database to determine what types of media are the most appropriate to display on the media content playback device.

In accordance with some other aspects of the disclosure, a method for providing media content for an exhibit is performed in the following manner: An image of an entity is captured by an image capture device. A processor performs image analysis on the captured image to identify one or more image identifiers. The processor then matches the image identifiers against media content that is related with one or more of the image identifiers. The processor then selects media content and transmits it to the media content playback device.

DETAILED DESCRIPTION

Figure 1:
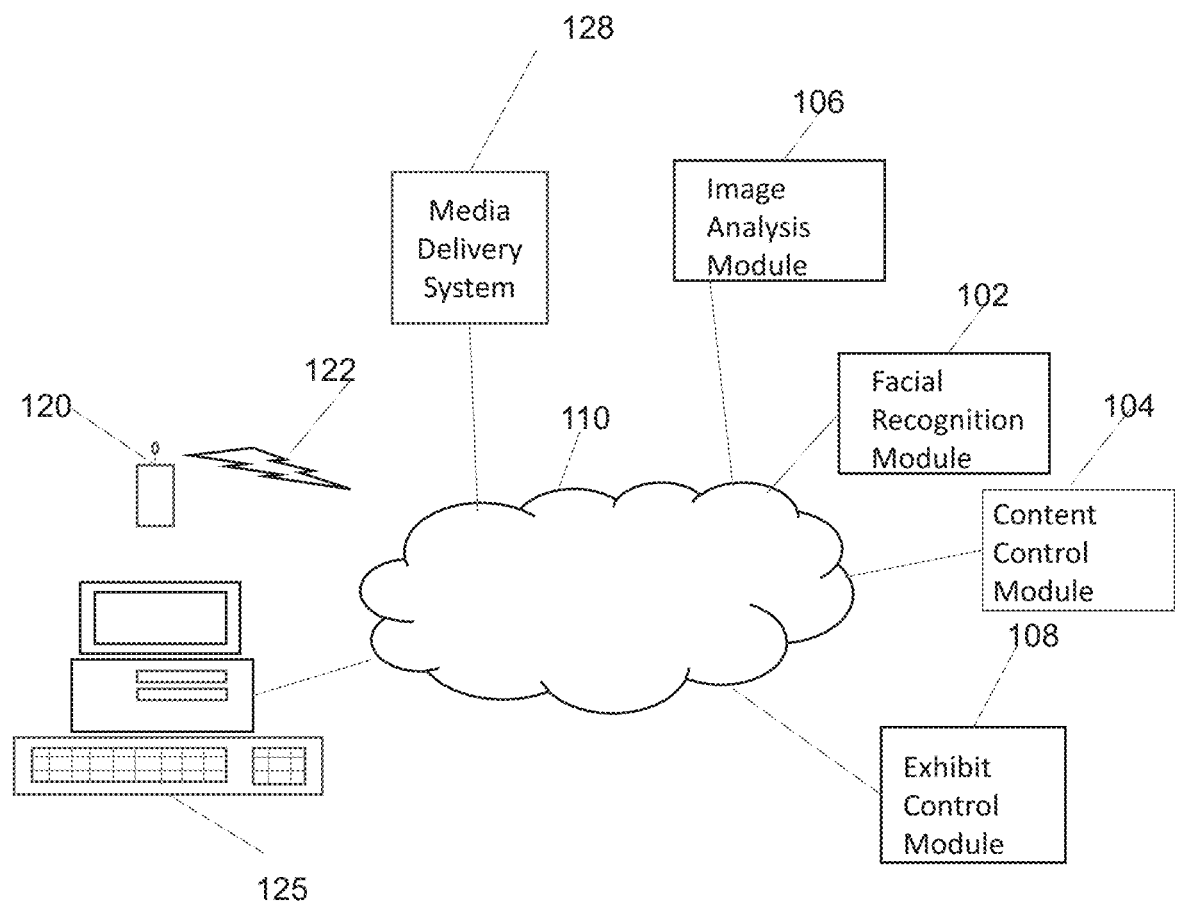
FIG. 1 is a diagrammatic embodiment of systems and devices that perform processes for providing media content to supplement an exhibit in accordance with aspects of the disclosure.

Systems and methods in accordance with various aspects of this disclosure provide targeted media content based upon a set of images captured. As used herein, a "set" comprises at least one item, such that a "set of images" could comprise only a single image, or several images, but never zero images. It should be appreciated that any captured, received, or generated data could comprise a single data element or a plurality of data elements.

For purposes of this discussion, "media content" comprises any type of content that may be sensed by human being during playback. Examples of types of media content include, but are not limited to, visual, audio, tactile, vibrational, smell, taste, or any other form of media that may be sensed by a human user. Accordingly, a media content playback device could be any suitable electronic device that is configured to play the media content to a user, for example a video display, an audio speaker, a braille display, an olfactometer, or any combination thereof.

At least one display and image capturing device are preferably accessed and controlled by a media content computer system that cross-references information gleaned from a set of captured images against one or more databases to select targeted media content. As used herein, a "computer system" comprises any suitable combination of computing or compute devices, such as desktops, laptops, cellular phones, blades, servers, interfaces, systems, databases, agents, peers, engines, modules, or controllers, operating individually or collectively. Computer systems comprise at least a processor configured to execute software instructions stored on a tangible, non-transitory computer readable storage medium (e.g., hard drive, solid state drive, RAM, flash, ROM, etc.). The software instructions preferably configure the computer system to execute the functionality as disclosed. In some embodiments, a computer system may be distributed across a network, while in other embodiments, a computer system may comprise only a single embedded system.

Aspects of the disclosure may be embodied as a system, method or program code/instructions stored on one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more non-transitory machine-readable medium(s) may be utilized. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory machine-readable storage medium may be any tangible medium that can contain, or store a program for use by or in connection with an instruction execution system, apparatus, or device. A non-transitory machine-readable storage medium can be machine-readable, but preferably program instructions are not stored on a non-transitory storage medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code such as the "C" programming language, assembly language, or similar programming languages embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a non-transitory machine-readable medium that can direct a machine to function in a particular manner, such that the instructions stored in the machine-readable medium produce an article of manufacture including instructions which implement the function/act specified in the flowchart and/or block diagram block or blocks.

As used herein, an "image fingerprint" is any portion of an image that can be analyzed to provide a characteristic. The characteristics could be unique, for example a facial fingerprint used to perform facial recognition on a photo of a person's face, or they could be non-unique, for example a uniform worn by one of a plurality of people within a group. Likewise, identifiers could also be unique, for example a person's social security number or a UID (Unique Identifier assigned by the system), or non-unique, for example a name of a school a group of students attend. Contemplated image fingerprints include facial fingerprints, license plate numbers, logos, bar codes, clothing/accessories, or any other suitable image that can be tagged with a feature. Contemplated identifiers include social security numbers, UIDs, license plate alphanumeric codes, car make/model, and group names (e.g. name of school, name of class, name of company).

As used herein, an "attribute" comprises any characteristic, and could be saved in any suitable form, for example a numerical value or an alphanumeric string. Contemplated attributes include preferences for goods and/or services and demographics.

Flowcharts are provided to aid in understanding the illustrations and are not to be used to limit scope of the claims. The flowcharts depict exemplary operations that can vary within the scope of the claims. Additional operations may be performed; fewer operations may be performed; the operations may be performed in parallel; and the operations may be performed in a different order. Each block of the flowchart illustrations and/or block diagrams, and combinations of blocks in the flowchart illustrations and/or block diagrams, can be implemented programmatically by executing program code on a computer system using one or more processors.

Plural instances may be provided for components, operations or structures described herein as a single instance. Boundaries between various components, operations and data stores may be defined arbitrarily. Particular operations are preferably illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a plurality of disparate computer systems electronically coupled using a network, and cloud computing allows shared resources, for example, software, data, processors, bandwidth, and information to be available, on-demand, like a public utility.

Exemplary cloud computing providers deliver business applications online which are accessed from another web service or software like a web browser, while the software and data are stored remotely on servers. The cloud computing architecture can use a layered approach for providing application services. A first layer is an application layer that is executed at client computers. After the application layer, could be a cloud platform and cloud infrastructure, followed by a "server" layer that includes hardware and computer software designed for cloud specific services. The various disclosed systems can be a part of the server layer for using the innovative techniques described above.

FIG. 1 illustrates a system 100 for providing media content to supplement an exhibit in accordance with an aspect of the disclosure. The system 100 includes a facial recognition module 102 and/or an image analysis module 106; a content control module 104; and exhibit control module 108, all of which are communicatively connected to one another by a network 110. A portable personal communication device 120 and a computer 125 may also be connected to the network 110. Although shown as separate devices or functionalities in FIG. 1, the facial recognition module 102, one or more of the content control module 104, the image analysis module 106, and the exhibit control module 108 may be provided by a single computing system. Alternatively, the processes that provide one or more of the facial recognition module 102, the content control module 104, the image analysis module 106, and the exhibit control module 108 may be distributed across multiple systems that are communicatively connected via the network 110.

The facial recognition module 102 may be implemented or functionalized by a computer system that includes a memory and a processing unit to perform the processes for providing facial recognition, for example by capturing a set of images and cross-referencing facial fingerprints against a database that contains relationships between facial fingerprints and identifiers. The computer system that implements the facial recognition module, functionality, or system may include one or more servers, routers, computer systems, and/or memory systems that are communicatively connected via a network to provide facial recognition and/or other image analysis, and to return identifiers that can be used to derive appropriate media content.

The content control module 104 may be implemented or functionalized by a computer system that includes a memory and a processing unit to perform processes for storing and providing media content for one or more exhibits in a venue. The content control module 104 may also advantageously store and update audience information for use in determining the media content to provide to an exhibit. The content control functionality may be provided by a central control system for the venue. Specifically, the content control module 104 may be implemented or functionalized by a system that includes one or more servers, routers, computer systems, and/or memory systems that are communicatively connected via a network to store and provide media content for one or more exhibits in the venue, as well as to store and update audience information for use in determining the content to provide to an exhibit.

The image analysis module 106 may be implemented or functionalized by a computer system that includes a memory and a processing unit to perform the processes for providing image analysis. The computer system that implements the image analysis module, functionality, or system may include one or more servers, routers, computer systems, and/or memory systems that are communicatively connected via a network to provide facial recognition and/or other image analysis.

The exhibit control module 108 may be implemented or functionalized by a computer system that controls devices in the exhibit area that include an image capture device and various playback devices for media content that supplements the exhibit. Advantageously, one computer system may control devices for more than one exhibit. In specific embodiments, the exhibit control module 108 may be implemented or functionalized by a system that includes one or more servers, routers, computer systems, memory systems, an image capture device, and/or media playback devices that are communicatively connected via a local network to obtain and present media content for the exhibit.

The network 110 may advantageously be the Internet. Alternatively, the network 110 may be a Wide Area Network (WAN), a Local Area Network (LAN), or any combination of Internet, WAN, and LAN that can be used communicatively to connect the various devices and/or modules shown in FIG. 1.

The portable personal communication device 120 may a smart phone, tablet, Personal Digital Assistant (PDA), a laptop computer, or any other device that is connectable to the network 110 via wireless connection 122. The computer 125 may advantageously connect to the network 110 via either a conventional "wired" or a wireless connection. The computer 125 may be, for example, a desktop computer, a laptop, a smart television, and/or any other device that connects to the network 110. The portable personal communication device 120 and/or the computer 125 allow a user to interact with one or more of the above-described modules to provide information such as, for example, personal information to be added to audience member information of the user. In some embodiments, the portable personal communication device 120 or a media delivery system 128 may be used as the playback device of the supplemental media content for an exhibit.

Although a particular system of devices and/or functional modules is described above with respect to FIG. 1, other system architectures that, add, remove, and/or combine various devices and/or modules may be used to perform various processes in accordance with various other aspects of the disclosure.

Figure 2:
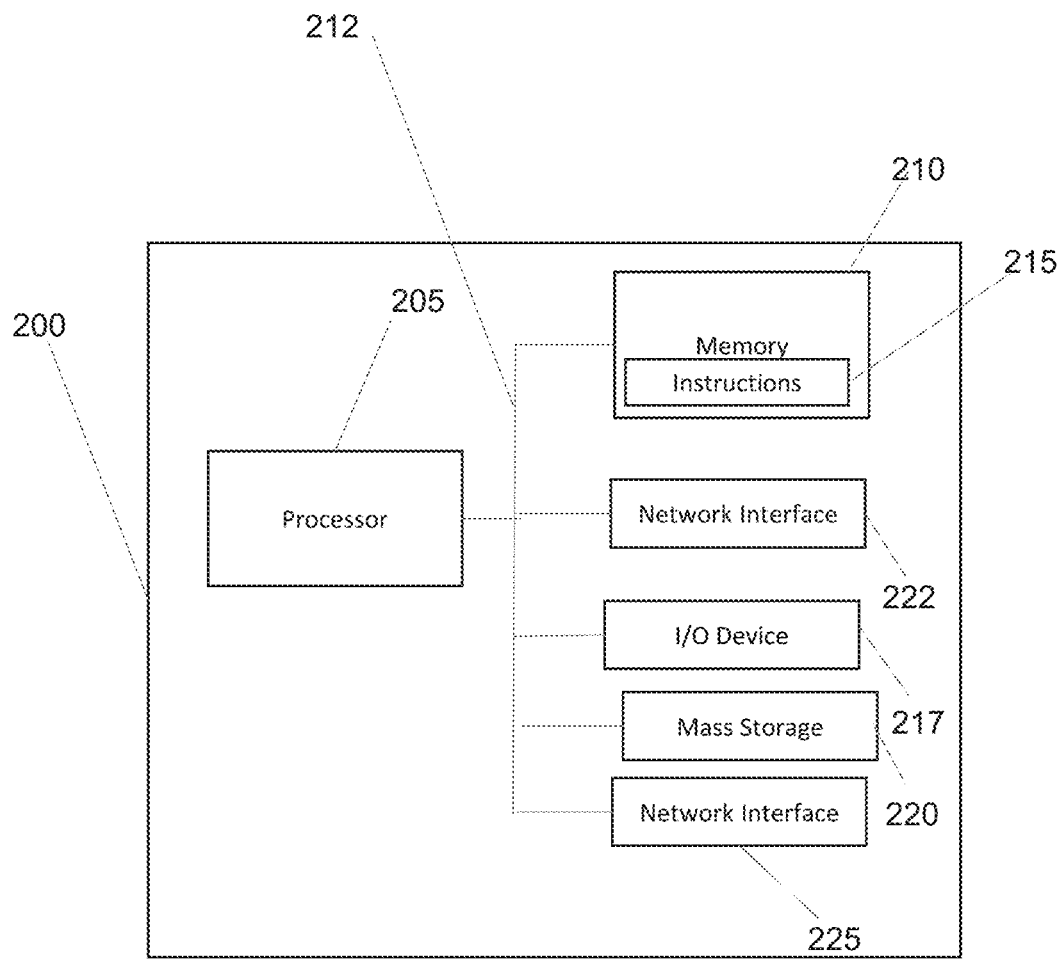
FIG. 2 is a block diagram of an exemplary computer processing system in accordance with an aspect of the disclosure.

FIG. 2 is a high-level block diagram showing an example of the architecture of a processing system 200 that may be used according to some aspects of the disclosure. The processing system 200 can represent a computer system that provides a facial recognition functionality, a content control functionality, an image analysis functionality, an exhibit control functionality, and/or other components or functionalities.

Processing system 200 includes one or more processors 205 in operative communication with memory 210 and coupled to a bus system 212. The bus system 212, as shown in FIG. 2, is a schematic representation of any one or more separate physical buses and/or point-to-point connections, connected by appropriate bridges, adapters and/or controllers. The bus system 212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The one or more processors 205 are the central processing units (CPUs) of the processing system 200 and, thus, control its overall operation. In certain aspects, the one or more processors 205 accomplish this by executing software stored in memory 210. The processor(s) 205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 210 represents any form of random access memory (RAM), read-only memory (ROM), flash memory, or the like, or a combination of such devices. Memory 210 includes the main memory of the processing system 200. Instructions 215 implementing the process steps of described below may reside in memory 210 and are executed by the processor(s) 205 from memory 210.

Also advantageously connected operatively to the processor(s) 205 through the bus system 212 are one or more internal or external mass storage devices 220, and a network interface 222. The mass storage device(s) 220 may be, or may include, any conventional medium for storing large volumes of data in a non-volatile manner, such as one or more solid state, magnetic, or optical based disks. The network interface 222 provides the processing system 200 with the ability to communicate with remote devices (e.g., storage servers) over a network, and may be, for example, an Ethernet adapter, a Fiber Channel adapter, or the like.

The processing system 200 also advantageously includes one or more input/output (I/O) devices 217 operatively coupled to the bus system 212. The I/O devices 217 may include, for example, a display device, a keyboard, a mouse, etc.

Figure 3:
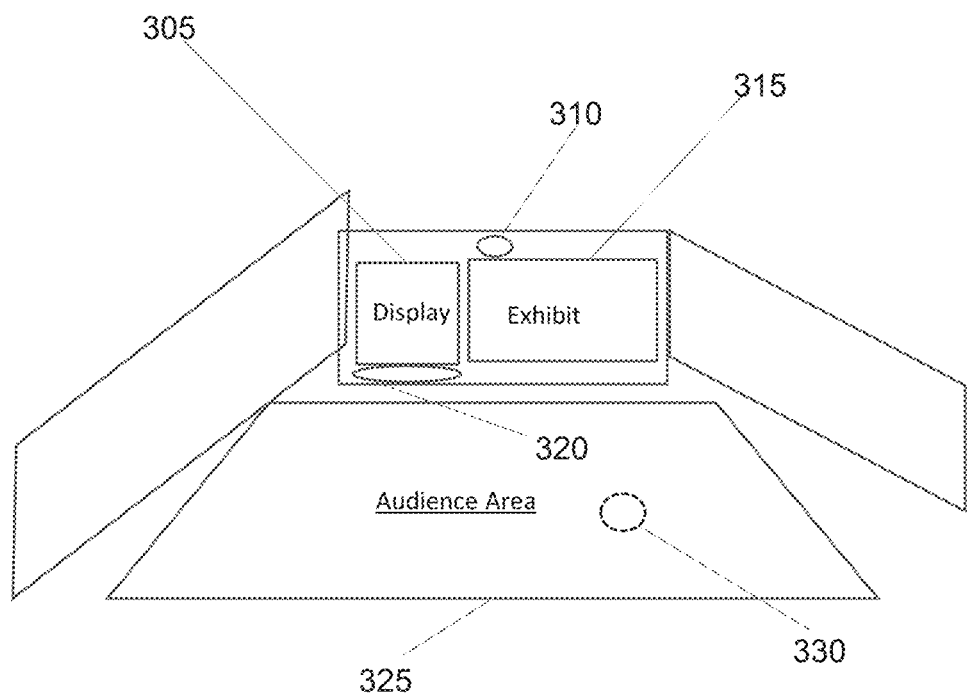
FIG. 3 is conceptual perspective view of an exemplary room with an exhibit including playback devices to provide supplemental media content accordance with an aspect of the disclosure.

FIG. 3 illustrates an exhibit display area in accordance with an aspect of the invention. As shown in FIG. 3, an exhibit 315 is located in a room. For example, the exhibit 315 may be mounted on a wall of a room (as shown), placed on the floor, or hanging from the ceiling. Alternatively, the exhibit 315 may be a stage or other raised platform where performances by actors, artists, musicians, or others may be staged.

To provide supplemental media content, one or more media playback devices may be provided to present the supplemental media content to an audience. For example, a personal device, such as a smart phone, tablet, or other media playback device may be carried or worn by one or more audience members and/or exhibit staff members. The personal devices may communicate with the exhibit control module via a wireless connection, either directly to the exhibit control module, or through a network connection in accordance with various aspects to obtain and/or present the supplemental media content.

In FIG. 3, the playback devices are shown as a display 305 and speakers 320. The display 305 may be a monitor or other video playback device that is located proximate the exhibit 315 to display video content of the supplemental media content for the exhibit 315. Speakers 320 are auditory playback devices that may advantageously be mounted to the wall, or standing proximate the wall, under the display 305, or elsewhere in the room, and that play back auditory content in the supplemental media content. In general, the display 305, speakers 320, and/or other playback devices may be located or mounted anywhere proximate the exhibit 315, and they are advantageously placed to provide sufficient coverage of an audience area 325 to allow the desired number of audience members to view, hear, and/or in some other way sense the presentation of the media content.

An audience area 325 is defined proximate the exhibit 315. In FIG. 3, the audience area 325 is the floor in front of the exhibit 315; however, the audience area 325 may be any defined area where an audience may be expected to stand, sit, or otherwise view the exhibit. For example, the audience area 325 may be benches or seats in front of the exhibit 315. In some embodiments, a sensor 330, such as, for example, a pressure sensor, a motion detector, or any other type of sensor that senses the presence of at least one audience member, is located in or near to audience area 325.

An image capture device 310, such as, for example, a camera (preferably a video camera), is located proximate the exhibit 315, e.g., in the wall, and it is focused on audience area 325. The image capture device 310 captures still images and/or video images of the audience as the audience views the display 305 and/or the exhibit 315. Although shown as wall-mounted proximate the exhibit 315, the image capture device 310 may be placed anywhere in the area of the exhibit 315 that will allow the device to capture images of at least a portion, if not all, of the audience members that are in and/or proximate to the audience area 325.

Although an exemplary exhibit area in accordance with an aspect of the invention is described above with reference to FIG. 3, other configurations that add, remove, combine, and/or move components relative to one another are possible.

Figure 4A:
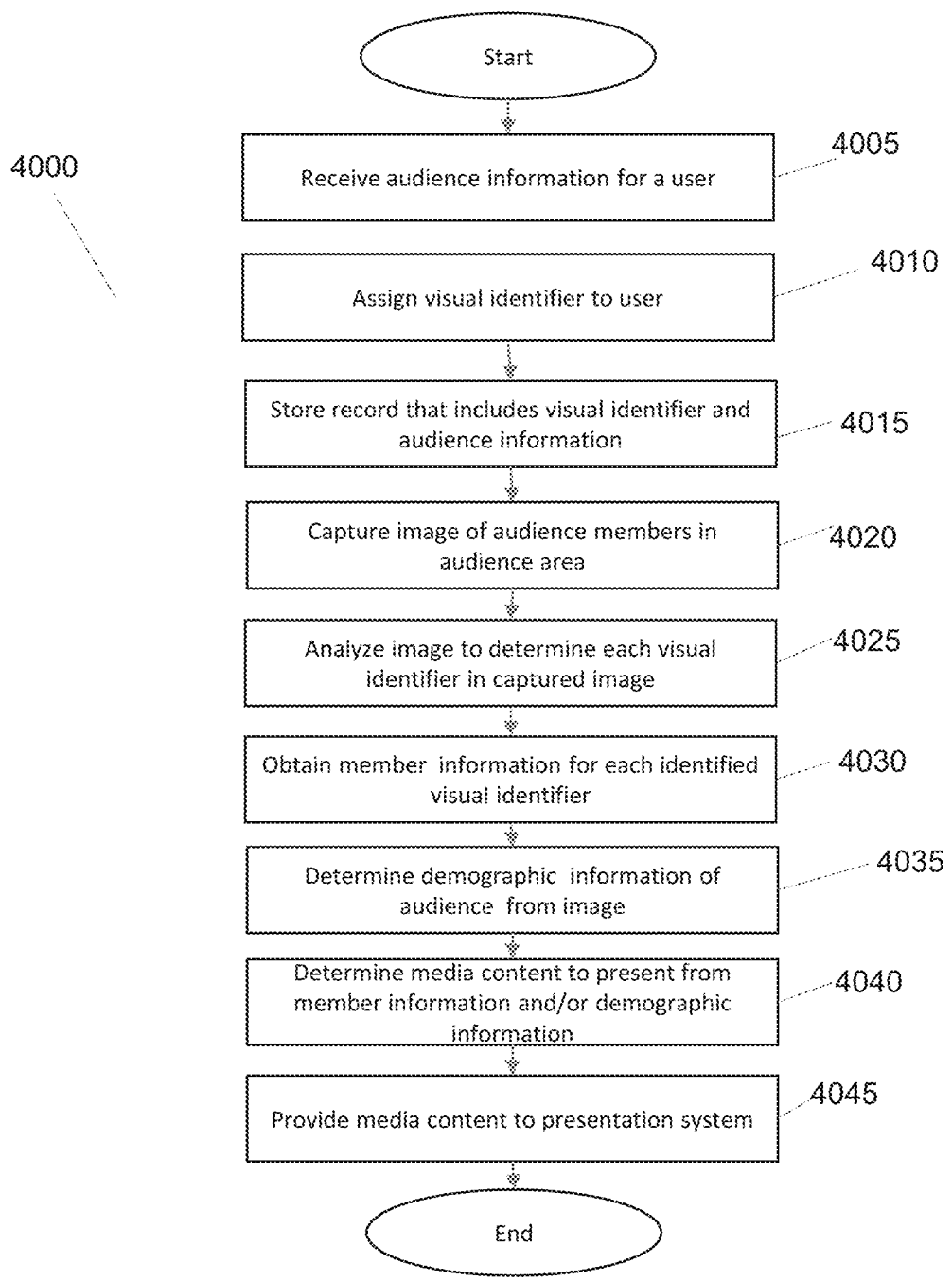
FIG. 4A is a flow diagram of an overview of an exemplary process for providing supplemental media content for an exhibit based upon an image of an audience area of the exhibit in accordance with an aspect of the disclosure.

FIG. 4A illustrates a flow diagram of a general method for providing supplemental media content for an exhibit using image processing of a captured image of the audience area of the exhibit in accordance with another aspect of the invention. Process 4000 receives information about an audience member (4005). In accordance with some embodiments, the information may be particular to the individual audience member. In accordance with some other embodiments, the information may pertain to group that includes the audience member. For purposes of this discussion, a group may be any set of audience members that have common characteristics that may be used to determine media content to provide. Examples of groups may include, but are not limited to, classes, tour groups, families, and people with similar disabilities.

A visual identifier is then assigned for the audience members (4010). In accordance with some embodiments, a visual identifier may be particular to an individual audience member. For example, a facial image of the audience member may be assigned as a visual identifier of the audience member in many of these embodiments. In accordance with some other embodiments, the visual identifier may be some sort of visual identifier that is assigned to each member of a related group of audience members. For example, the visual identifier may be, but is not limited to, a particular color or pattern for garments worn by the group or may be a color, pattern, or symbol on a lanyard, badge, or tag worn or held by each member of the group that is distributed to each member of the group by the venue.

A record that includes an identifier associated with the audience member, a visual identifier, and information relevant in determining the media content to present is stored (4015). In accordance with some embodiments, the record is a group record that identifies a group name or other group identifier, the visual identifier associated with the group, and group information that is information relevant in determining the media content. In accordance with some other embodiments, the record may be an audience member record that stores a name or other identifier of an individual audience member, a facial image or some other particular visual identifier of the audience member, and member information relevant in determining the media content for the audience member.

The process 4000 captures an image of audience members in an audience area proximate the exhibit (4020). An image analysis process is then performed on the captured image to identify each visual identifier in the captured image (4025). As discussed in below, two examples of image processing that may be used include color, pattern, or symbol recognition for group visual identifiers, and facial recognition for facial images of audience members. The computer system can be programmed to derive such information from a set of images, and make decisions upon cross-referencing that information against a table or a database. For example, the computer system could analyze a set of images to determine what color a majority of entities wear, what pattern a majority of entities have on a tag, what symbol from a set of recognized symbols exist in a set of images, and/or could be programmed to derive facial fingerprints from a set of images. The member and/or group information for each identified visual identifier (e.g., with appropriate user information) is obtained (4030). Demographic information and, optionally, other audience-related information for the audience as whole may also be determined or obtained by the image analysis device or module, or the facial recognition device or module (4035). Identifier information could be entered into a table or a database that matches identifiers against media content (e.g. show media content A to groups where a majority of entities wear red, show media content B to groups where a majority of entities wear blue), or into a table or database that matches identifiers against attributes, which could then be used as a query in another database to select media content (e.g. square symbols are worn by English-speakers and triangles are worn by Spanish speakers. Media content in English should be shown to English speakers while media content in Spanish should be shown to Spanish speakers). The media content to present to the audience is then determined based on the obtained group and/or user information and/or from the determined demographic information for the audience (4040). In accordance with some aspects, playback parameters for each piece of media content to be provided may also be selected as a function of attributes that are derived either directly (e.g. direct analysis of a set of images) or indirectly (e.g. indirect analysis by cross-referencing information from the image against one or more databases). The media content and/or playback parameters can then be provided to the exhibit control device or module for playback using the media playback devices (4045), after which the process 4000 ends.

Figure 4B:
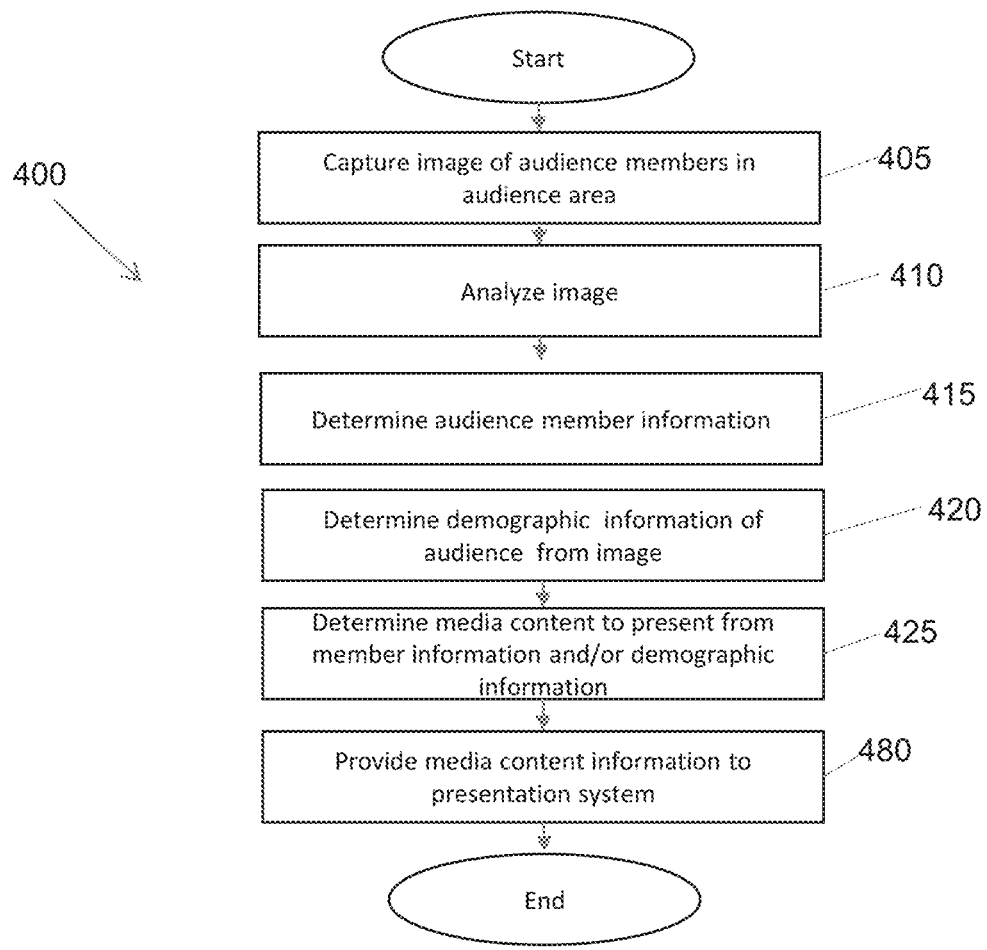
FIG. 4B is a flow diagram of an exemplary process for providing supplemental media content for an exhibit based upon visual identifiers of one or more groups identified in an image of an audience area of the exhibit in accordance with an aspect of the disclosure.

FIG. 4B illustrates a flow diagram of a process 400 for providing supplemental media content for an exhibit in accordance with an aspect of the invention based upon group information and visual identifier that identify an audience member as part of a particular group. In some particular embodiments, the image processing performed is color recognition. The process 400 captures an image of audience members in an audience area proximate the exhibit (405).

Image analysis is then performed on the captured image of the audience area (410) to identify (e.g., with appropriate group information) current audience information (415). Demographic information and, optionally, other audience-related information for the audience as a whole may also be determined or obtained by the above-mentioned image analysis device or module 106 (420). The media content to present to the audience is then determined based on the current audience information identified from the captured image of the audience area and/or from the determined demographic information for the audience (425). In accordance with some aspects, playback parameters for each piece of media content to be provided may also be determined or obtained. The media content and/or playback parameters are provided to the exhibit control device or module for playback using the media playback devices (430), after which the process 400 ends.

Figure 4C:
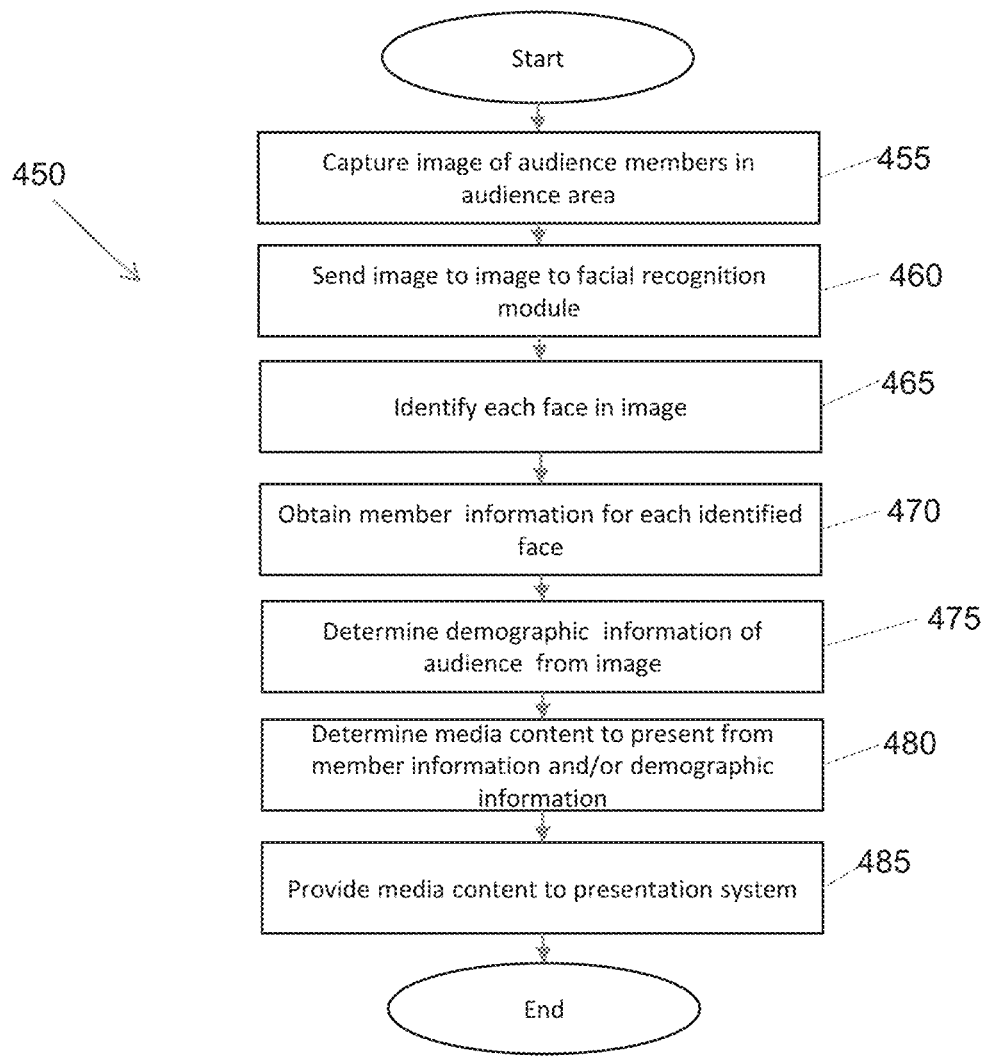
FIG. 4C is a flow diagram of an exemplary process for providing supplemental media content for an exhibit based upon facial recognition of audience members in an image of an audience area of the exhibit in accordance with an aspect of the disclosure.

FIG. 4C illustrates a flow diagram of a process for providing supplemental media content for an exhibit using facial recognition of audience members in the captured image of the audience area in accordance with another aspect of the invention. The process 450 captures an image(s) of audience members in an audience area proximate the exhibit (455). The captured image(s) or facial fingerprints derived from the image(s) may advantageously be provided to a facial recognition device or module (460).

The facial recognition device or module identifies the desired portions of the captured image of the audience area that include the facial image of one or more audience members (465).

In embodiments using a facial recognition process, the facial recognition function could be performed on each identified portion of the captured image to identify (e.g., with appropriate user information) each audience member (470). Demographic information and, optionally, other audience-related information for the audience as whole may also be determined or obtained by the facial recognition device or module (475), preferably by cross-referencing identified information against an image, relationship, and/or attribute database. The media content to present to the audience is then determined based on information gleaned from a set of images, for example an identifier of a person (cross-referenced against a table or database that associates that person's identifier with the media content), an attribute of a person (cross-referenced against a table or database that associates that person's identifier with an attribute), or a relationship of a person (cross-referenced against a table or database that associates that person's identifier with another identifier) the audience members identified from the portions of the images that include a face and/or from the determined demographic information for the audience (480). In embodiments that use both a person's identifier and demographic information, both of those could be used as queries in an attribute database that returns media content or attributes that could be aggregated or weighted in any suitable manner. In accordance with some aspects, playback parameters for each piece of media content to be provided may also be determined. The media content and/or playback parameters are provided to the exhibit control device or module for playback using the media playback devices (485), after which the process 450 ends.

The above describes an overall process for providing media content to supplement an exhibit in accordance with one aspect of the disclosure. However, other processes that add, combine, remove, and/or reorder the steps of the process are possible.

Figure 5:
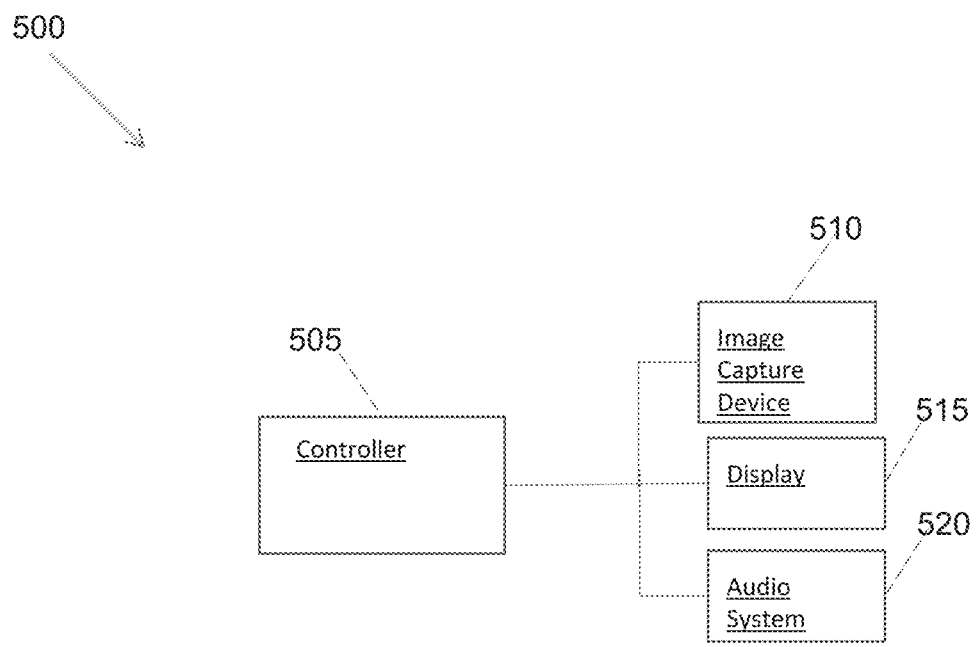
FIG. 5 is a block diagram of components of an exhibit control system in accordance with an embodiment of the disclosure.

As discussed above, in embodiments employing a facial recognition function, as well as in embodiments employing recognition of a color, pattern, or symbol, an exhibit control device or module captures the images of the audience and plays back the media content that is selected based upon the captured image. FIG. 5 is a block diagram of the components of an exhibit control device or module 500 which, in accordance with an aspect of the disclosure, includes a controller 505, an image capture device 510, a display 515, and an audio system 520.

The controller 505 may be implemented as a processing system that controls the image capture device 510 in capturing images of the audience area to obtain the media content information provided based upon analysis of the captured image. In accordance with some aspects, the controller 505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system.

The image capture device 510 may be a camera that captures still images and/or a video camera that captures video images. In the exemplary embodiment shown in FIG. 5, the image capture device 510 is a separate device including a processing system that is communicatively connected to the controller 505 via a wireless or wired connection. In some other aspects, the image capture device 510 is an I/O device of the processing system or module including the controller 505. As discussed above, the image capture device 510 is positioned such that the device is focused on the audience area in a manner to capture images that include facial images of the audience, and/or images of a specific color, pattern, or symbol associated with members of the audience. The image capture device 510 may also capture, record, or otherwise provide other information, such as depth information for the imaged objects.

The display 515 is communicatively connected to the controller 505. The display 515 may, in some embodiments, be a monitor that is controlled by the processing system of the controller 505. In accordance with some other aspects, the display 515 may be one or more signs that are lighted by a lighting element that is controlled by the controller 505. Alternatively, the display 515 may be a touch screen that allows interaction with an audience member.

The audio system 520 may include one or more speakers that are placed around the exhibit and/or audience area, and it may further include a processing system communicatively connected to the controller 505. In some embodiments, the audio system may include an audio transducer configured as an I/O device of the controller 505.

Although an exemplary embodiment of an exhibit control device or module is described above with respect to FIG. 5, other embodiments that add, combine, rearrange, and/or remove components are possible.

Figure 6:
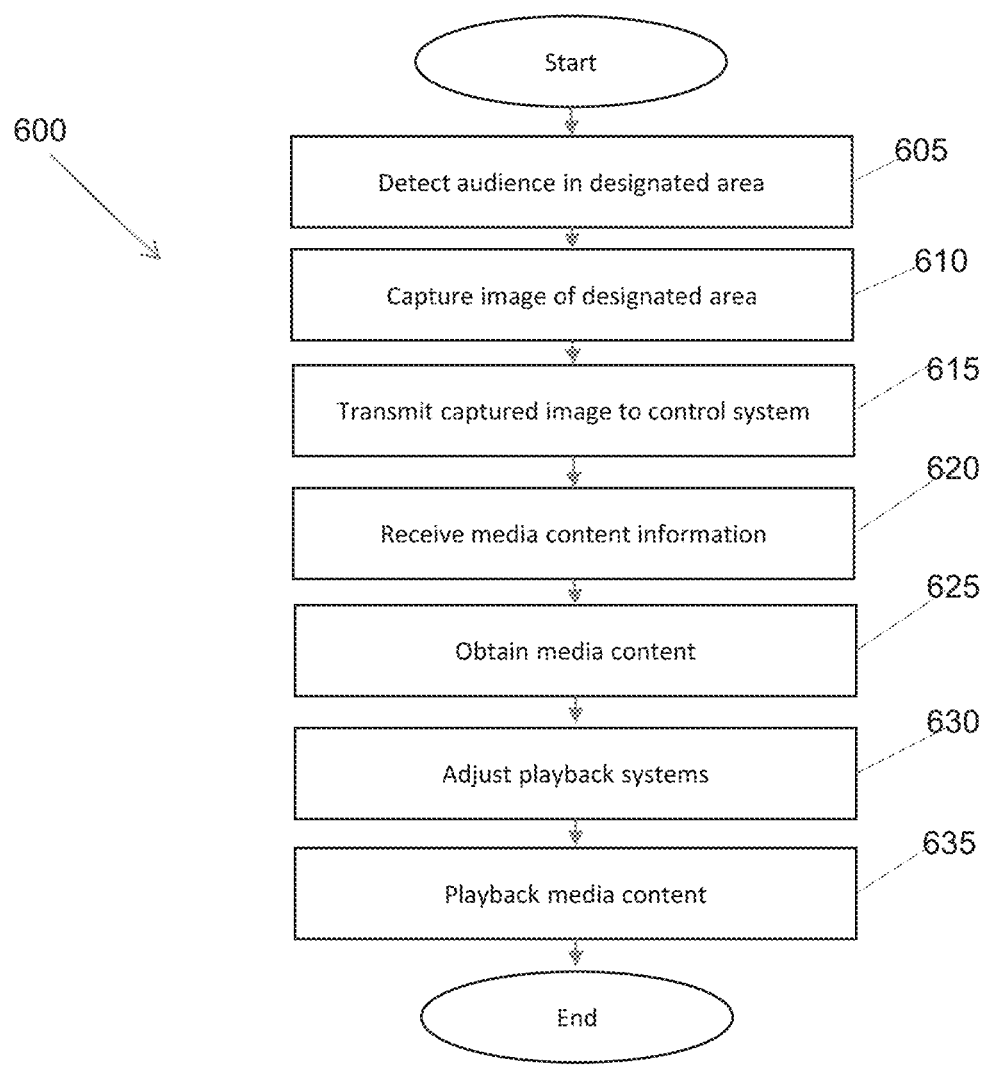
FIG. 6 is a flow diagram of an exemplary process performed by the exhibit control system to obtain and playback supplemental media content in accordance with an aspect of the disclosure.

FIG. 6 illustrates a flow diagram of a process 600 performed by the exhibit control device or module to provide supplemental media content in accordance with an aspect of this disclosure. In the process 600, an audience is detected in the audience area (605) by, for example, motion sensors, heat sensors, and/or any other type of sensor that may detect the presence of one or more audience members in the audience area.

An image is captured of the audience area (610), for example, in response to the detection of one or more audience members in the audience area. Alternatively, the image capture device may periodically capture an image at pre-defined intervals of time, or a video feed of the audience area may be continuously captured.

The captured image is transmitted to a content control device or module (615), optionally with other information about the image. Such other image information may include, for example, camera settings, depth information, lighting information, and/or other like information related to the image. The image information may be transmitted separately, or it may be transmitted in or with the captured image. Optionally, a video feed may be provided to the content control device or module. The exhibit control device or module may optionally monitor a video feed and only send an image that includes audience members that is taken from the feed when an audience is detected in the audience area. The exhibit control device or module may optionally perform image processing to improve image quality prior to transmitting the image, and/or it may optionally isolate facial images from the captured image and send only portions of the image that include facial images to the content control device or module.

The exhibit control device or module receives media content information (620) to supplement the exhibit that is determined based upon the captured image, as discussed further below. The media content information advantageously includes the media content to present, and it may also include identifiers, such as, for example, internet addresses, file directory identifiers, or other identifiers that may be used to obtain the media content and/or stream the content from an identified content provider. The video content information may optionally include playback parameters for adjusting the parameters of the playback devices to provide the desired playback. For example, the media content information, may include brightness, contrast, resolution or other information for video playback, and/or it may include volume and/or balance information for an audio playback.

The media content is then obtained (625), e.g., by being read from memory in the exhibit control device or module, and/or by being received from one or more specific media content storage systems. The media content may optionally be streamed using adaptive bit rate streaming or some other streaming technique from a content provider.

The playback parameters of the individual playback devices may then be adjusted based on the received media content information (630), and the media content is then presented by the playback devices (635), at which point the process 600 may end. However, in some embodiments, the process may be periodically repeated during playback to update the media content being presented to account for the composition of the audience changing as audience members arrive and depart during the playback.

Although an exemplary process performed by the exhibit control device or module to provide media content to supplement an exhibit in accordance with aspects of this disclosure is discussed above with respect to FIG. 6, other processes performed by the exhibit control device or module to provide the media content that add to, combine, rearrange, or remove any of the described steps are possible and are considered within the scope of this disclosure.

Figure 7:
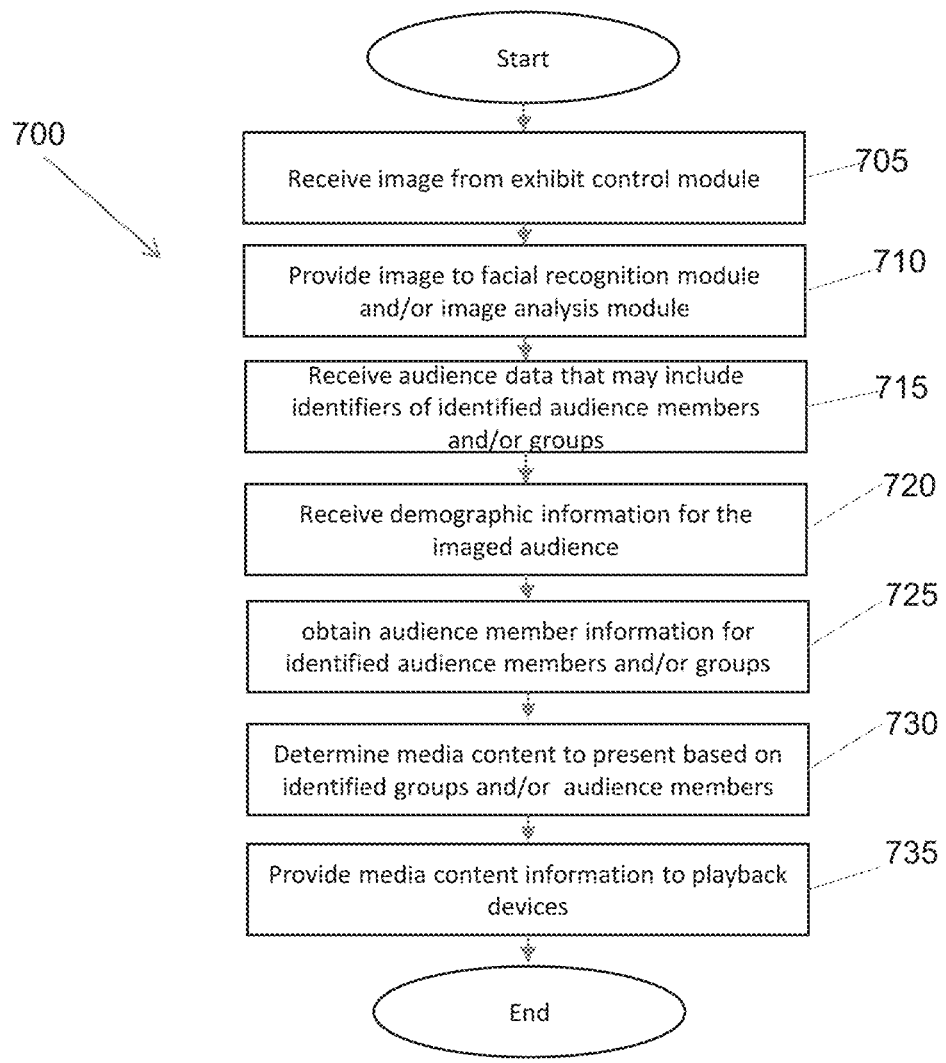
FIG. 7 is a flow diagram of an exemplary process performed by a content control system to provide supplemental media content to an exhibit in accordance with an aspect of the disclosure.

FIG. 7 illustrates a flow diagram of a process 700 performed by the content control device or module to determine the media content to provide to the exhibit control device or module, based upon the captured image. The process 700 may be performed for each image received. Thus, the process 700 may be performed once to determine the media content to present at one time in accordance, or, alternatively, the process 700 may be periodically performed during the presentation of media content to update the media content being presented to account for changes in the audience of the exhibit over time.

In the process 700, a captured image of the audience area is received from an exhibit control device or module (705). As discussed above, additional image information may optionally be received with the image. In some embodiments, the image may then be provided to a facial recognition device or module and/or an image analysis device or module for image analysis (710). The content control device or module may do some image processing prior to providing the image to the facial recognition device or module/and or image analysis device or module. The analysis may include, for example, isolating a facial image and/or a visual group identifier (e.g. a pre-defined color, pattern, or symbol) in the image, modifying the image to improve image quality, and/or analyzing the image to determine or obtain other image information. In some embodiments, such other image information may be provided by the captured image to the facial recognition device or module and/or the image analysis module.

The process 700 receives audience information that may include identifiers of audience members and/or groups identified in the captured image (715). The identifiers may be from audience information that the content control device or module, or some other system, device or module, has previously provided to the image analysis device or module and/or the facial recognition device and/or module, as discussed further below. In some aspects, the identifiers may be provided in a list of audience members and/or groups identified. Demographic information for the audience may also be received (720). The demographic information is information about the characteristics of the audience that the image analysis device or module and/or facial recognition device or module generates during analysis of the image. The demographic information may be in the form of a list for each audience member, or it may be in the form of a number representing a quantification of one or more particular characteristics. The demographic information may include, for example, the ages, nationalities, races, heights, and/or genders of the people in the audience. Other audience information may optionally be provided, such as the general emotional state of the audience even of individual audience members.

The content provider device or module then obtains the audience member information and/or group information associated with each identifier received (725). The audience member information may be information about the identified audience member stored by the content provider device or module that provides insight into the interests and requirements of the particular audience member, thereby indicating the media content that will be of likely interest to the member. The group information may be information about the identified group stored by the content provider device or module that provides insight into the interests and requirements of the particular audience member, thereby indicating the media content that will be of interest to the member.

Figure 8A:
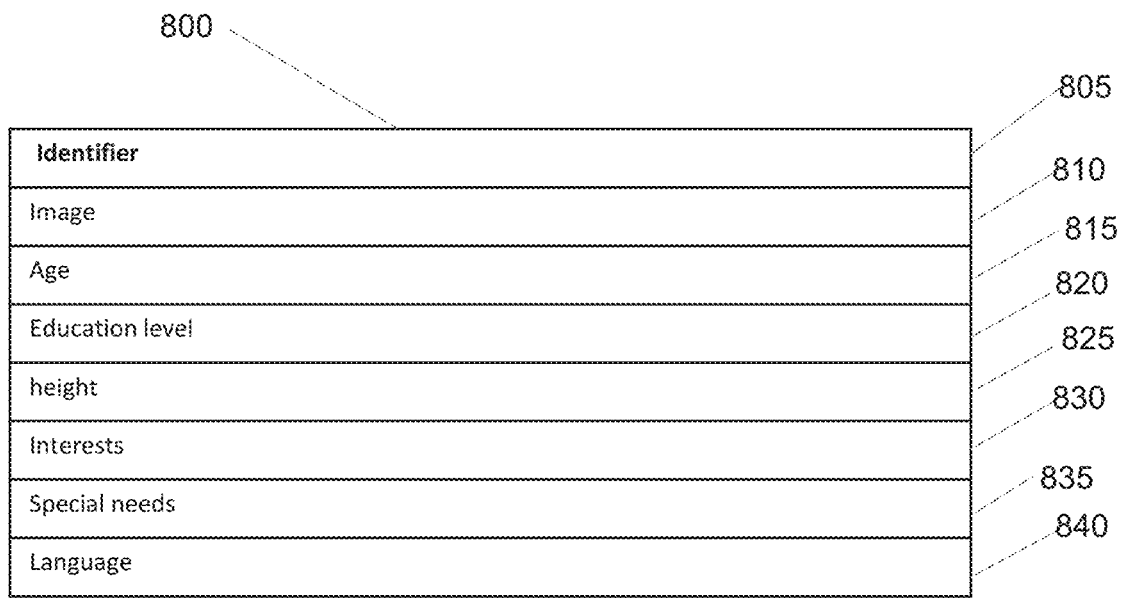
FIG. 8A is conceptual diagram of a data record for an audience member stored by an exemplary content control system for using in determining the proper media content to provide in accordance with an aspect of the disclosure.

FIG. 8A illustrates an example of an audience member record maintained by the content provider device or module in accordance with an aspect of this disclosure. The audience member record 800 advantageously includes an identifier 805, such as a name or member number for the audience member. The record 800 may also include a facial image 810 of the member that the audience member either has provided to the content provider device or module, or that was captured from the audience member during a registration process. The record 800 also includes fields for particular information about the audience member that may be used to determine media content that may be of the most interest to the audience member. The fields in the record 800 may advantageously include fields for one or more personal characteristics, such as, for example, the member's age 815, the member's education level 820, the member's height 825, the member's particular interests 830, any special needs of the member 835, and the primary language used by the member 840. Examples of particular interests may include, for example, areas of study (such as science and history) that the member is interested in understanding. Examples of special needs may include, for example, any visual aids, audio aids, and/or other aids that the user may need to perceive the media content, and requirements, such as specially-accessible inputs that a member may need to interact with the media content owing to a physical limitation. Each record may optionally include other fields and/or subfields that define particular categories in these fields that may be used to determine the proper media content to provide, and/or presentation requirements that may be needed by the playback device for the member to best experience the content.

Figure 8B:
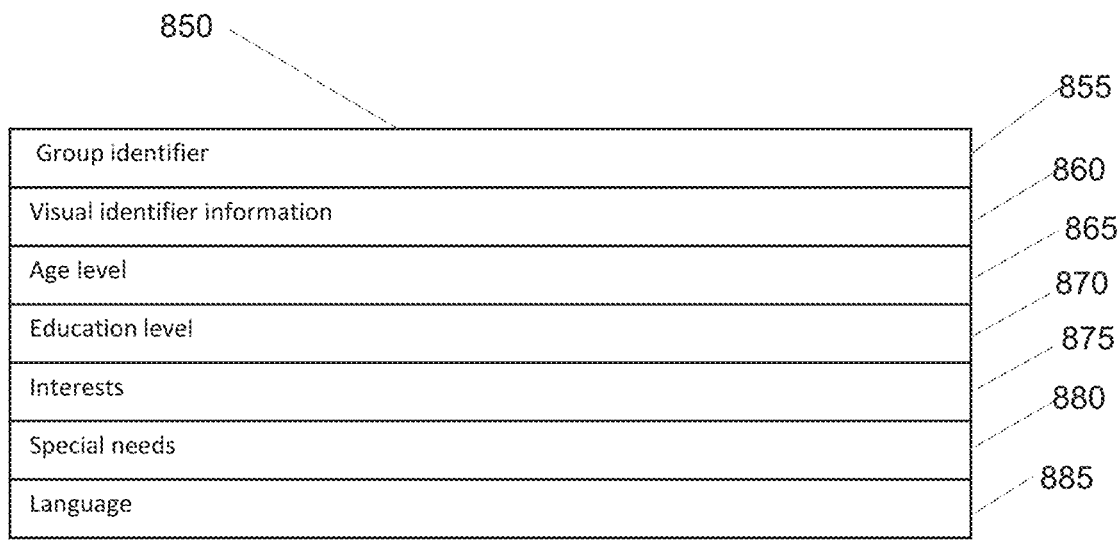
FIG. 8B is conceptual diagram of a data record for a group stored by the content control system of FIG. 8A for using in determining the proper media content to provide in accordance with an aspect of the disclosure.

FIG. 8B illustrates an example of a group record 850 maintained by the content provider device or module in accordance with another aspect of this disclosure. The group record 850 advantageously includes a group identifier 855, such as a name or group number for the group. The record 850 also includes a group visual identifier 860 of the member that the audience member either has provided to the content provider device or module, or that was captured from the audience member during a registration process. The record 850 also includes fields for particular information about the group that may be used to determine media content that may be of the most interest to the group members. The fields in the record 850 may advantageously include fields for one or more group characteristics, such as the group's age level or average age 865, the group's education level 870, the group's particular interests 875, any special needs of the group members 880, and the primary language used by the group members 885. Each record may optionally include other fields and/or subfields that define particular categories in these fields that may be used to determine the proper media content to provide and/or presentation requirements that may be needed by the playback device for the member to best experience the content.

Returning to the process 700 shown in FIG. 7, the process 700 uses the audience member information of each identified audience member and/or identified group; and/or the demographic information to determine the media content to present to supplement the exhibit (730). In situations in which the media content is to be played back by the personal devices of audience members, the process 700 may optionally use only the member information of a particular member to determine the media content to provide to that member. In some embodiments, the demographic information will be used to determine the content to provide even if there is no specific audience member record for the identified audience member.

In accordance with some aspects, the group, audience member, and/or demographic information may be applied to an algorithm that then determines the media content that will be of most interest to the broadest range of audience members. The algorithm, for example, may be an artificial intelligence algorithm, such as, for example, a neural network algorithm that takes at least a portion of the audience member and/or demographic information available and selects the media content available for the exhibit that will appeal to the greatest number of audience members. For example, the algorithm may choose an audio presentation in a language that is used by the greatest number of identified audience members, or a language determined by the greatest number of a particular nationality identified in the demographic or group information. The algorithm may then select a closed caption track for the language used by the second greatest number of audience members or another group.

The subjects covered by the media content provided may be determined to appeal to the greatest number of audience members in accordance with some aspects. For example, the algorithm may determine that most of the audience is comprised of members interested in the scientific aspect of the exhibit as opposed to the historical aspect. As such, the algorithm selects video and audio media content directed to the scientific aspects of the exhibit. The algorithm may also consider the age of the audience members in selecting the content. For example, the algorithm may select content directed to younger students if the average age of the audience is younger, and more mature content if the audience average age is determined to be in the adult range.

Furthermore, the algorithm may weight some of the audience member information based upon quality of service parameters. For example, some audience members may have bought a subscription to a service that entitles them to have preferential treatment over other audience members. As such, the information for these members may be given added weight in the algorithm when determining the content to provide.

In accordance with some aspects, the algorithm may give more or less weight to the information of the identified members than to the demographic information of the entire audience. Alternatively, the algorithm may give more weight to the demographic information to try to appeal to the greatest number of audience members.

In accordance with some aspects, the special needs of an audience member may include a time allocation to spend at a particular exhibit or at the venue as a whole. As such, the algorithm may use this time allocation information to select media content that has a playback time that conforms to the time allocation requirements of one or more audience members. In some of these aspects, the media content may also include suggestions guiding the audience member(s) to other exhibits in order to guide the member through the venue in the allocated time and/or see the exhibits that most interest the member(s).

Once the algorithm has determined the media content to provide and/or the playback parameters that meet the needs of the audience, the media content information and/or playback information is generated and provided to the exhibit control device or module (735), at which point the process 700 may end. As discussed above, the process 700 may be periodically repeated to update the media information and/or playback parameters to account for the changing composition of the audience.

An exemplary process for selecting the media content to supplement an exhibit performed by a content control device or module in accordance with an embodiment of the disclosure is described above with reference to FIG. 7. However, other processes for selecting the media content that add, combine, rearrange, and/or remove one or more steps described above are possible in accordance with other embodiments.

In some embodiments, the analysis of the captured image of the audience area may be performed by a facial recognition system (i.e., device or module) in accordance with various aspects of the disclosure. In order to perform facial recognition, the facial recognition device or module needs facial images of the audience members to perform comparisons. In accordance with some aspects of the disclosure, the facial image of a member is provided by the audience member and/or captured by the system during a registration process used to generate an audience member record, such as the record described above with respect to FIG. 8A. In accordance with some other embodiments, a group visual identifier such as, for example, one or more of a color, a symbol, or a pattern is provided by a user generating the group record or is generated elsewhere and is to generate a group record during a registration process. The color, pattern, or symbol may be provided to each individual in a particular audience in the form of an article of clothing (e.g., a hat, T-shirt, or scarf), a badge, a pin, a lanyard, a flag, a banner, a balloon, or any other appropriate item that may be worn or carried by the individuals in the audience. The registration process may be performed by a central control system or the content control device or module in accordance with various aspects of this disclosure. The facial image and/or an identifier of the audience member, and/or a visual group identifier, is then provided by the registration process to the facial recognition device or module and/or an image analysis module.

Figure 9A:
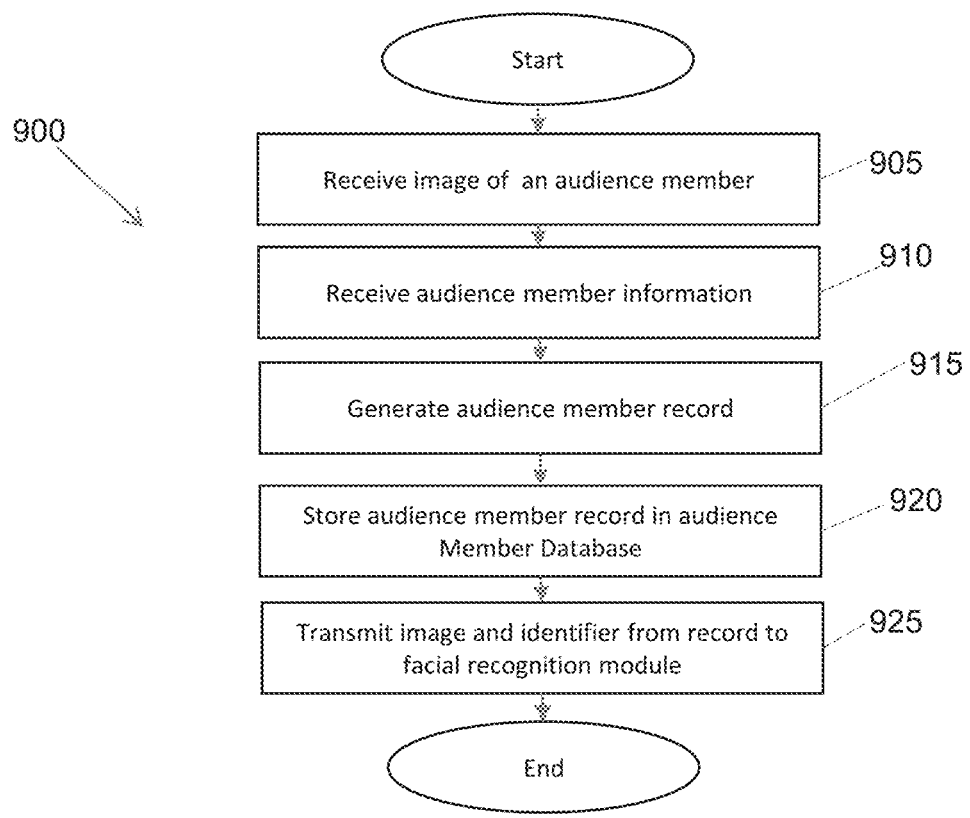
FIG. 9A is a flow diagram of a process performed by an exemplary content control system to obtain audience member information and generate an audience member record in accordance with an aspect of this disclosure.

FIG. 9A illustrates a flow diagram of a registration process 900 performed by a central control system or the content control device or module in accordance with an aspect of this disclosure in which facial recognition of audience members is used. In the registration process 900, a facial image of the audience member that is registering with the system is received (905). For example, the audience member may provide a facial image stored on the user device that audience member is using to register. In that situation, the process 900 may issue a command (for example, by a wireless communication) that directs the user device to capture the facial image using an image capture device associated with the user device, and to provide the image to the process 900. The process 900 may also receive audience member information for the member (910). In accordance with some aspects, the registering member may input the information to a personal device that provides the information to the process 900. The audience member information may include at least a portion of the information discussed above with reference to FIG. 8A. However, the information may also include any information that may be needed to select media content using a particular algorithm.

An audience member record that includes the received audience member information and the captured facial image is generated (915) and stored in an audience member database (920). The captured facial image and an identifier of the audience member is provided to the facial recognition device or model (925), and the process 900 may then end.

An exemplary process for registering an audience member in accordance with embodiments of the disclosure is described above with respect to FIG. 9A. Other registration processes that add, combine, rearrange, and/or remove one or more steps described above are possible in accordance with other embodiments.

Figure 9B:
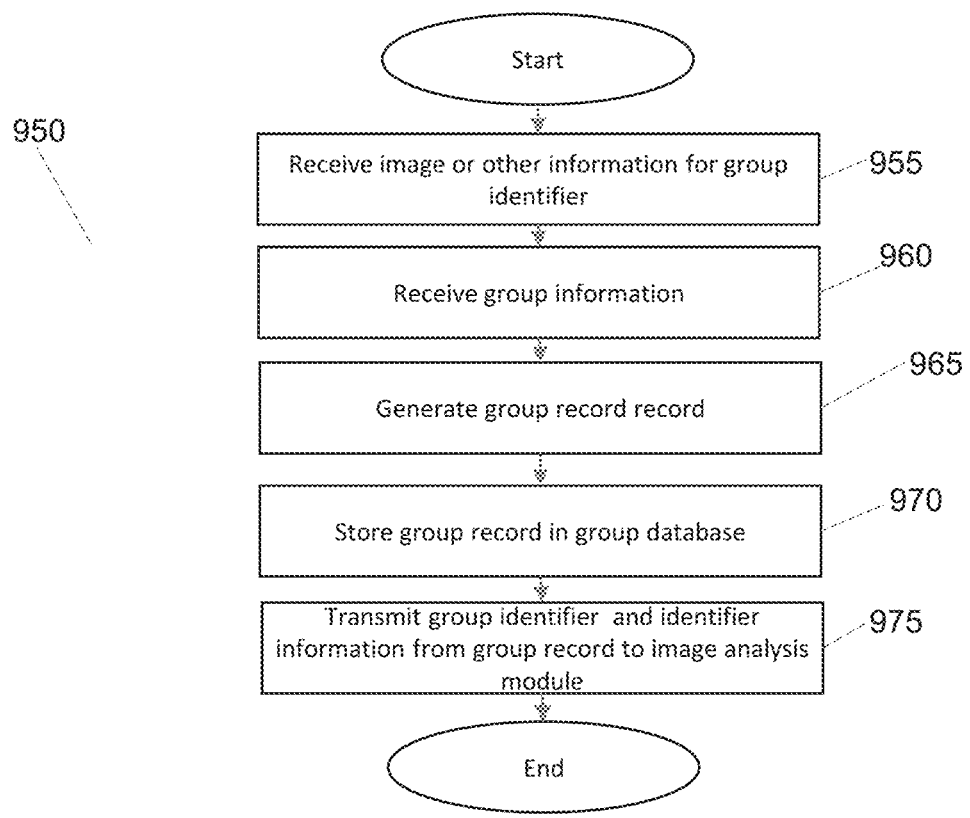
FIG. 9B is a flow diagram of a process performed by an exemplary content control system to obtain group information and generate a group record in accordance with an aspect of this disclosure.

FIG. 9B illustrates a flow diagram of a registration process 950 performed by a central control system or the content control device or module in accordance with an aspect of this disclosure using group identifiers of groups of audience members to determine audience information. In the registration process 950, visual identifier information of the group that is registering with the system is received (955). For example, the members of the group may be provided, for registration, with an item to be carried or worn and that displays a particular color, symbol, or pattern, as described above. The process 950 may also receive group information for the members (960). In accordance with some aspects, a user registering the group may input the information to a personal device that provides the information to the process 900. The group information may include at least a portion of the information discussed above with reference to FIG. 8B. However, the information may also include any information that may be needed to select media content using a particular algorithm.

A group record that includes the received group identifier information and the group visual identifier for the group is generated (965) and stored in a group database (970). The group visual identifier information and an identifier of the group is provided to the image analysis device or module (975), and the process 900 may then end.

An exemplary process for registering a group in accordance with embodiments of the disclosure is described above with respect to FIG. 9B. Other registration processes that add, combine, rearrange, and/or remove one or more steps described above are possible in accordance with other embodiments.

Figure 10A:
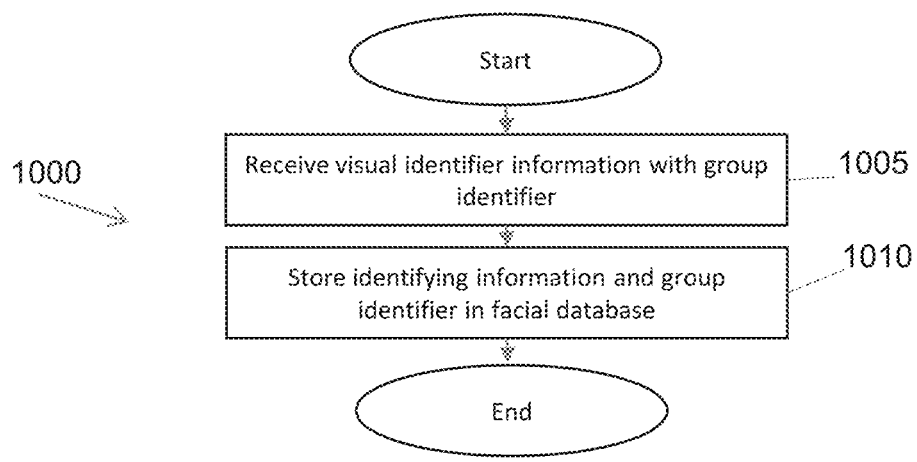
FIG. 10A is a flow diagram of a process performed by an embodiment of image analysis system to store data records of images of audience members in accordance with an aspect of the disclosure.

FIG. 10A illustrates a process 1000 performed by the facial recognition device or module in response to receiving a facial image and identifier of an audience member in accordance with some aspects of this disclosure that use facial recognition to determine audience information. In the process 1000, the facial recognition device or module receives a facial image and identifier of an audience member from a central control system or content control device or module (1005). A facial recognition record is generated and stored (1010). The generation of the facial recognition record may include, for example, analyzing the image to generate facial parameters that may be used for image comparisons during the facial recognition process, as discussed further below.

An exemplary process for obtaining audience member facial images in a facial recognition system in accordance with embodiments of the disclosure is described above with respect to FIG. 10A. Other processes for obtaining facial images that add, combine, rearrange, and/or omit one or more steps described above are possible in accordance with other embodiments.

Figure 10B:
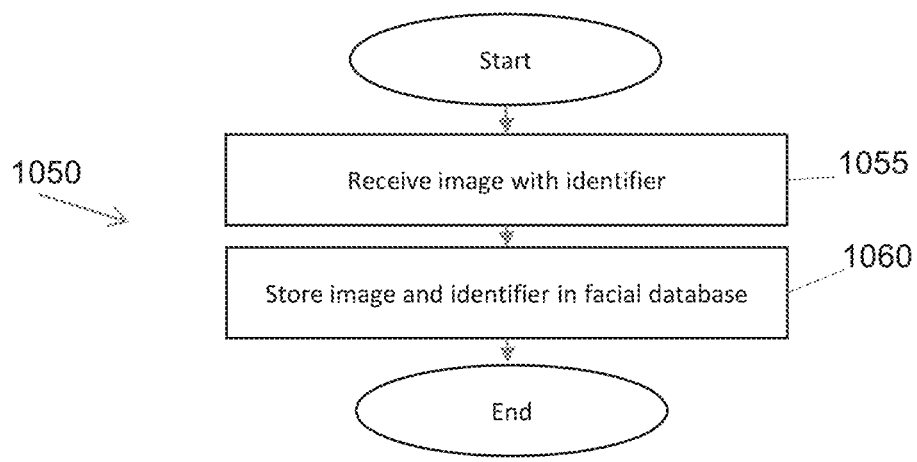
FIG. 10B is a flow diagram of a process performed by an exemplary facial recognition system to store data records of images of audience members in accordance with an aspect of the disclosure.

FIG. 10B illustrates a process 1050 performed by the image analysis device or module in response to receiving a group identifier and group visual identifier information of a group in accordance with some embodiments of this disclosure that use image analysis to determine audience information. In the process 1050, the image analysis device or module receives a group identifier and group visual identifier information of a group from a central control system or content control device or module (1055). A group record is generated and stored (1060). The generation of the group record may include, for example, analyzing an image of the group visual identifier to generate image parameters that may be used for image comparisons during the image analysis process, as discussed further below.

An exemplary process for obtaining group information in an image analysis system in accordance with embodiments of the disclosure is described above with respect to FIG. 10B. Other processes for obtaining group information that add, combine, rearrange, and/or omit one or more steps described above are possible in accordance with other embodiments.

In accordance with some aspects of the invention, facial recognition of audience members in the captured image is performed to provide audience information and in some other aspects, image analysis is used to identify groups in the audience using image analysis. Processes and data structures to perform facial recognition by a facial recognition device or module in accordance with some aspects of the invention are discussed below with reference to FIGS. 11-13. Processes and data structures used to identify groups in the audience by an image analysis device or module in accordance with some aspects of the invention are discussed below with reference to FIGS. 14-17.

Figure 11:
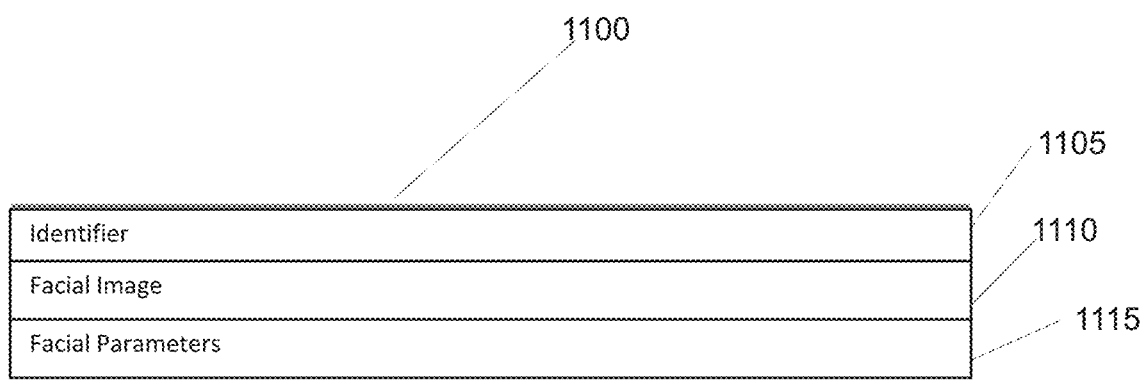
FIG. 11 is a conceptual drawing of an exemplary facial image record maintained by facial recognition system in accordance with an aspect of the disclosure.

FIG. 11 is a conceptual data structure for a facial recognition record in accordance with an aspect of the disclosure. A facial recognition record 1100 includes an identifier of the audience member 1105, the received facial image 1110, and the facial parameters for facial recognition comparisons 1115. The identifier may be, for example, a name and/or nickname of the audience member, or the identifier may be a number or alphanumeric string that associates the image to a specific audience member record stored by the content control device or module and/or the central control system.

Although an exemplary facial recognition record in accordance with embodiments of the disclosure is described above with reference to FIG. 11, other facial recognition records that add, combine, rearrange, and/or omit information are possible in accordance with other embodiments.

Figure 12:
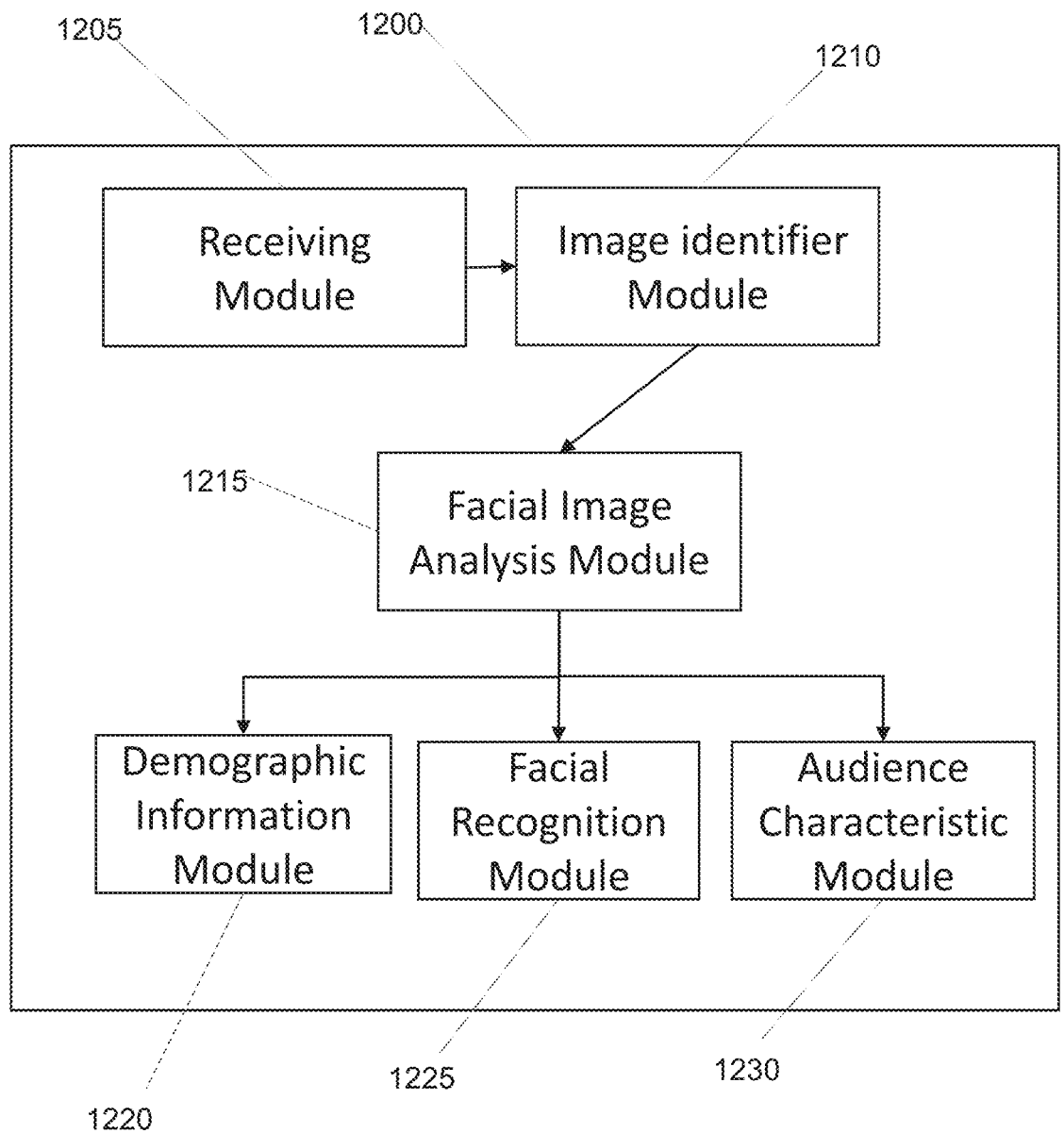
FIG. 12 is a conceptual diagram of exemplary modules of software for performing facial recognition analysis on a captured image of an audience area in accordance with an aspect of the disclosure.

The software and/or hardware modules that perform a facial recognition process in accordance with embodiments of the disclosure is shown in FIG. 12. The facial recognition system 1200 includes a receiving module 1205, a facial image identifier module 1210, a facial image analysis module 1215, a demographic information module 1220 that may generate other information (particularly demographic information), a facial recognition module 1225, and an audience characteristic module 1230.

The receiving module 1205 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1205 uses the image information in the image processing to conform the image to the required standards.

The processed image is provided to the facial image identifier module 1210, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 1215 receives the portions of the image that include a facial image and performs analysis on each image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 1215 also receives the image information and/or a complete image for use in performing the analysis. The information generated by the facial image analysis module 1215 is provided to the demographic information module 1220, the facial recognition module 1225, and the audience characteristic module 1230 to perform the facial recognition function and to generate the demographic and audience characteristic information.

The demographic information module 1220 uses the information for each facial image received from the facial image analysis module to generate demographic information for the entire audience, or at least a substantial portion of the audience (e.g., a representative sample). The demographic information may include, for example, the ages, nationalities, races, and the like of the audience members. The demographic information may also optionally include a statistical analysis of the categories to provide the mean, medium, and other information for each category.

The facial recognition module 1225 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

The audience characteristic module 1230 receives the information for each facial image and compiles audience characteristic information. The characteristic information may include the size of the audience, the positions of the audience in the audience area, and other information pertaining the physical characteristics of the audience as a whole. To do so, the audience characteristic module 1230 may also optionally receive the image information to help define the spatial characteristics shown in the image.

Although the above description describes modules of a facial recognition system in accordance with an exemplary embodiment of the disclosure, other facial recognition modules that that add, combine, rearrange, and/or omit modules are possible in accordance with other embodiments.

Figure 13:
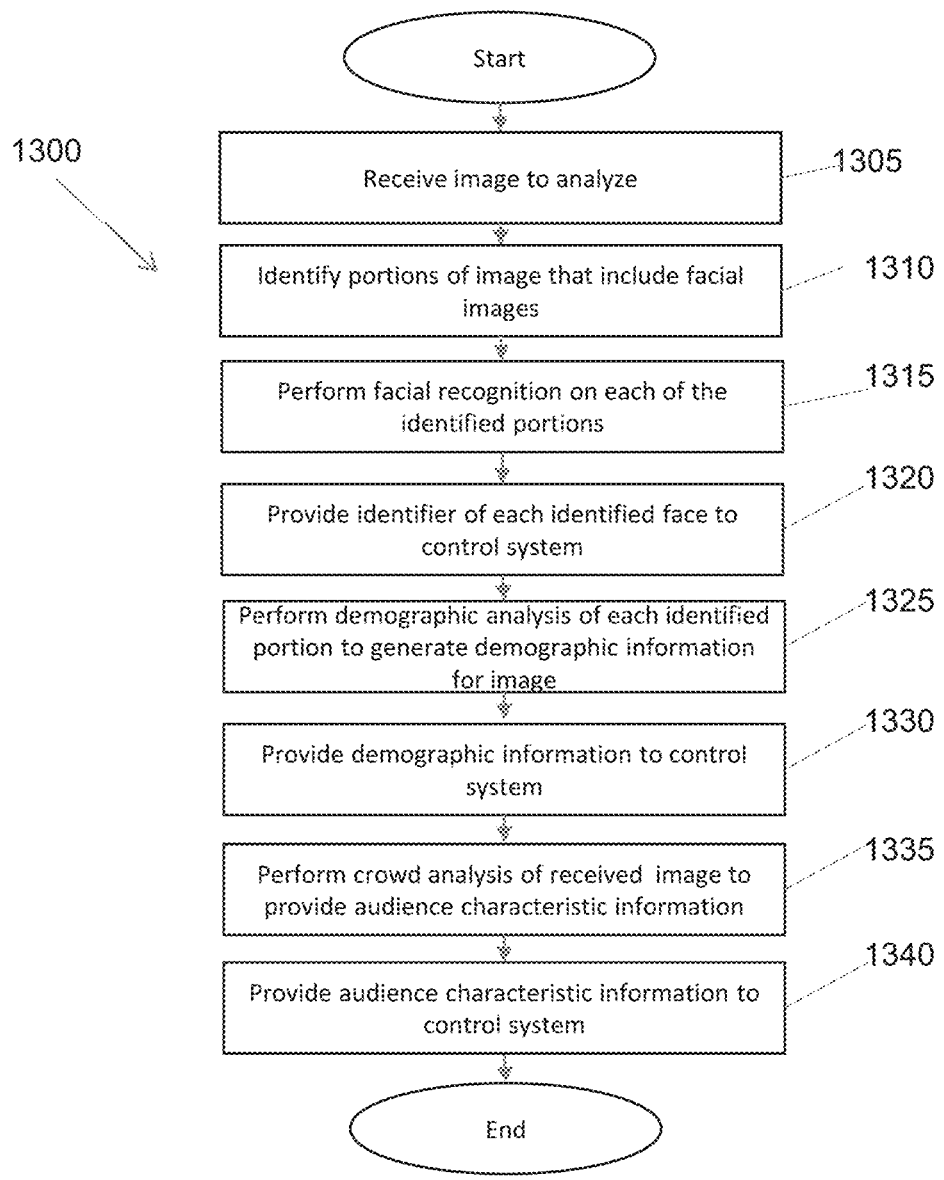
FIG. 13 is a flow diagram of an exemplary process performed by a facial recognition system to generate audience information from a captured image of an audience area in accordance with an aspect of the disclosure.

FIG. 13 illustrates a flow diagram of a process 1300 performed by a facial recognition system to perform facial recognition in a captured image of an audience area in accordance with an aspect of the disclosure. In the process 1300, an image of the audience area is received (1305). As discussed above, the received image may be processed to conform the image to the requirements of the process 1300.

Portions of the received (and optionally processed) image that include a facial image are identified (1310). As discussed above, each portion may be further processed to conform the facial image to the requirements of the facial recognition process. A facial recognition comparison to the facial images stored in the facial recognition record is performed to identify the records that match the facial images (1315). The identifiers of the matching records are provided to the content control module or device.

The information of the facial images from the captured image generated for the facial recognition comparisons is used to generate demographic information for the audience (1325). The demographic information provided is discussed above with respect to FIG. 12. The demographic information for the audience is provided to the content control nodule or device (1330).

The information of the facial images from the captured image generated for the facial recognition comparisons is also used to generate audience characteristic information (1335). The process for generating the audience characteristic information and the information generated are discussed above with reference to FIG. 12. The audience characteristic information is also provided to the content control module or device (1340), at which point the process 1300 may end.

An exemplary process for determining audience information using facial recognition in accordance with embodiments of the disclosure is described above with respect to FIG. 13. Other processes for obtaining group information that add, combine, rearrange, and/or omit one or more steps described above are possible in accordance with other embodiments.

Figure 14:
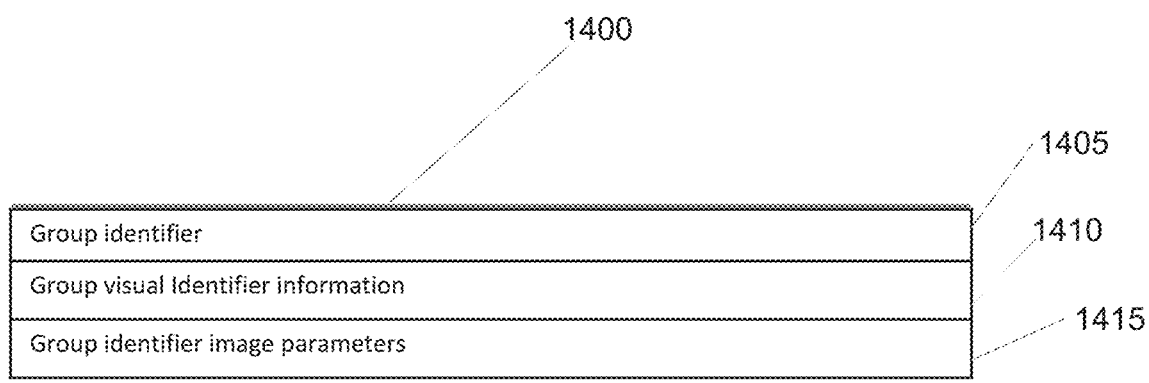
FIG. 14 is a conceptual drawing of an exemplary group image analysis record maintained by facial recognition system in accordance with an aspect of the disclosure.

FIG. 14 is a conceptual data structure for a group record 1400 in accordance with an aspect of the disclosure. The group record 1400 includes a group identifier of the group 1405, the received group visual identifier information 1410, and optionally, the group visual identifier parameters for image comparisons 1415. The identifier 1405 may be, for example, a name and/or nickname of the group, or the identifier may be a number or alphanumeric string that associates the group visual identifier information to a specific group record stored by the content control device or module and/or the central control system.

Although an exemplary group record in accordance with embodiments of the disclosure is described above with reference to FIG. 14, other group records that add, combine, rearrange, and/or omit information are possible in accordance with other embodiments.

Figure 15:
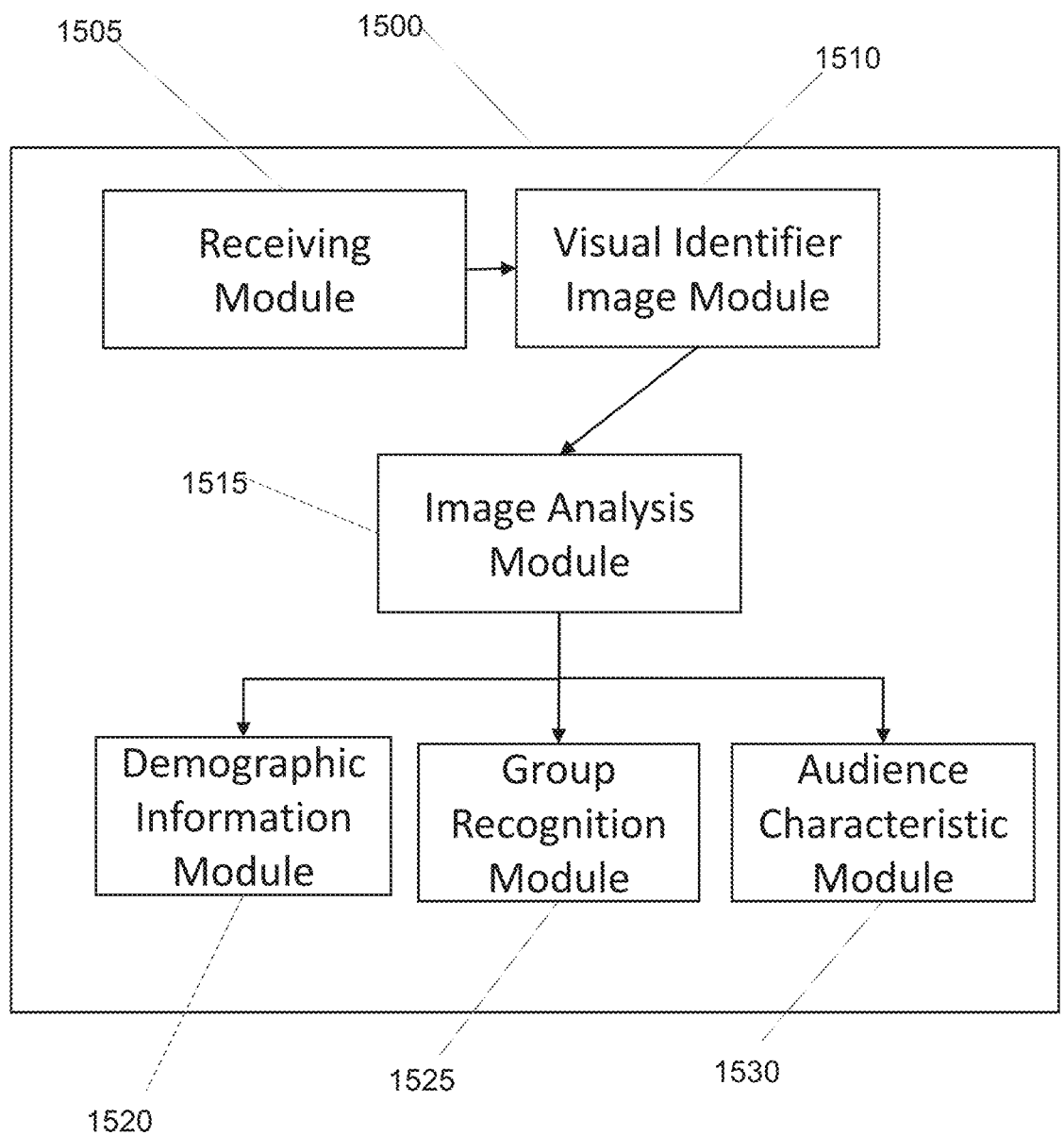
FIG. 15 is a conceptual diagram of an embodiment of functional modules for performing image analysis on a captured image of an audience area in accordance with an aspect of the disclosure.

An image analysis device or system 1500, comprising software and/or hardware modules that perform an image analysis process in accordance with some embodiments of the disclosure, is shown in FIG. 15. The image analysis system 1500 includes a receiving module 1505, a visual identifier image module 1510, an image analysis module 1515, a demographic information module 1520, a group recognition module 1525, and an audience characteristic module 1530.

The receiving module 1505 receives a captured image and processes the captured image to conform the image to the parameters needed to perform the various subsequent processes for image analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 1505 uses the image information in the image processing to conform the image to the required standards.

The processed image is provided to the visual identifier image module 1510, which identifies the portions of the image that include a visual identifier associated with a group and/or audience member, e.g., a particular color, pattern, or symbol, as described above, that is worn or displayed by all members of the group. The identification may use edge detection and other various search processes to identify those portions of the image that include the requisite visual identifier. In accordance with some aspects, the visual identifier image module 1510 may also perform some image processing to conform the portions including visual identifier to the requirements of an analysis module.

The image analysis module 1515 receives the identified portions of the image and/or the entire captured image, and it performs analysis on the each identified portion of the image to generate the data from which the required information is derived. For example, the image analysis module 1515 may generate pixel color and vector data needed to perform edge detection, pixel color detection, and the like needed to perform the various subsequent processes. In accordance with some aspects, the image analysis module 1515 also receives the image information and/or a complete image for use in performing the analysis. The information generated by the image analysis module 1515 is provided to the demographic information module 1520, the group recognition module 1525, and the audience characteristic module 1530 for use in performing group recognition and to generate the demographic and audience characteristic information.

The demographic information module 1520 uses the information from each identified portion and/or the entire image received from the image analysis module 1515 to generate demographic information for the entire audience, or at least a substantial portion of the audience (e.g., a representative sample). The demographic information may include, for example, the ages, nationalities, races, and the like of the audience members. The demographic information may also optionally include a statistical analysis of the categories to provide the mean, medium, and other information for each category.

The group recognition module 1525 receives the information from the received image and compares the information of the group visual identifier information in each group record to determine a match and returns the group identifier of each group record that matches the data from the captured image to a predefined degree of confidence. To facilitate the comparison, the records may include visual identifier image data that is precomputed to provide quicker comparisons by eliminating the need to analyze each reference image.

The audience characteristic module 1530 receives the information for the captured image and compiles audience characteristic information. The characteristic information may include the size of the audience, the positions of the audience in the audience area, and other information pertaining the physical characteristics of the audience as a whole. To do so, the audience characteristic module 1530 may also optionally receive the image information to help define the spatial characteristics shown in the image.

Although the above description describes modules of an image analysis device or system in accordance with an exemplary embodiment of the disclosure, other image processing modules that that add, combine, rearrange, and/or omit modules are possible in accordance with other embodiments.

Figure 16:
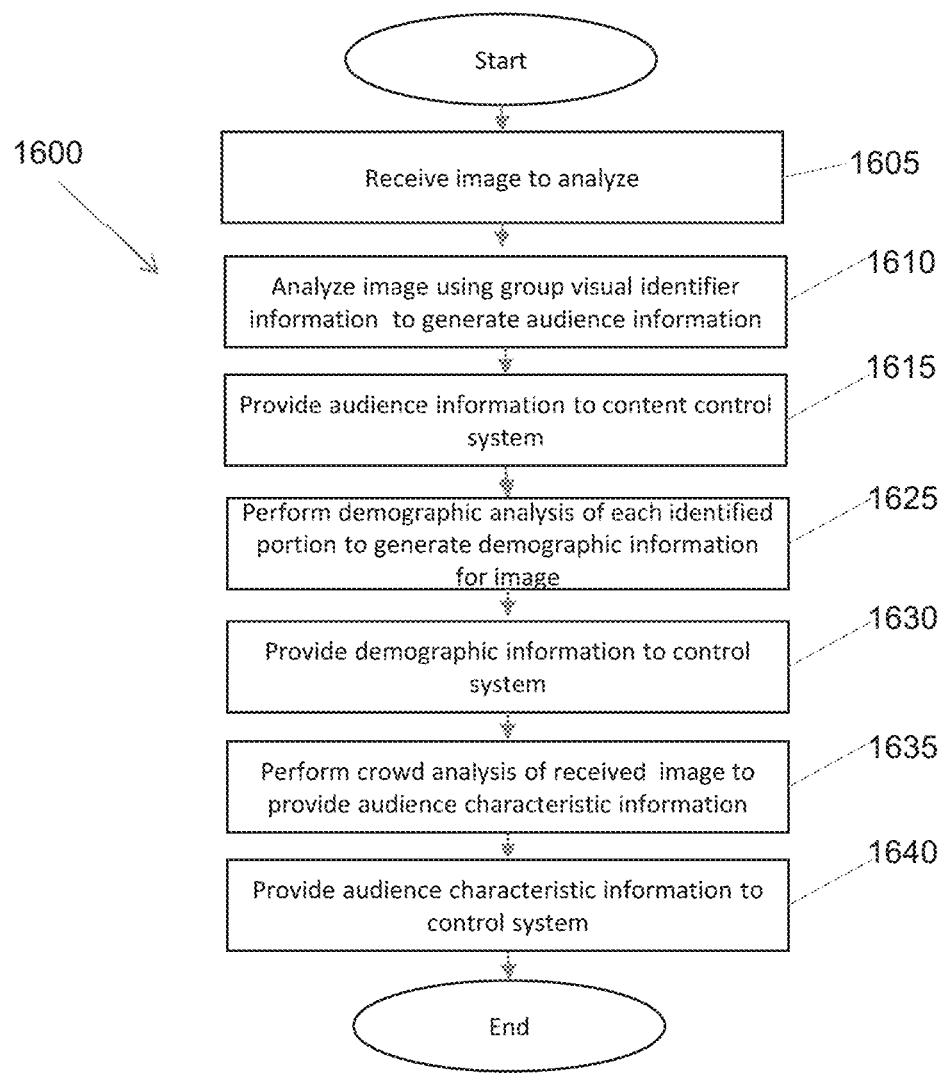
FIG. 16 is a flow diagram of an exemplary process performed by an image analysis module to generate audience information from a captured image of an audience area in accordance with an aspect of the disclosure.

FIG. 16 illustrates a flow diagram of a process 1600 performed by an image analysis device or module to detect groups of audience members in a captured image of an audience area in accordance with an aspect of the disclosure. In the process 1600, an image of the audience area is received (1605). As discussed above, the received image may be processed to conform the image to the requirements of the process 1600.

The captured image is analyzed to detect groups in the audience based on the group identifier information in the group records (1610). In accordance with some embodiments, the analysis may include determining the color of each pixels and a total amount of pixels for each color in the captured image. The pixel colors may be ranked based on the number of pixels of each color in the image. The pixel colors present are compared to the colors identified in the visual identifier information of each group record. Other processes for analyzing the image in accordance with some other embodiments of the invention are discussed below with reference to FIGS. 17 and 18. The groups present are then determined by whether a threshold amount of pixels of the identified color is present and/or by the rankings of the pixel colors. The group identifier from each group record that has a match for the group visual identifier information is provided to the content provider device or module as part of the audience information (1615), and the process 1600 may end.

An exemplary process for determining audience information using image analysis in accordance with embodiments of the disclosure is described above with respect to FIG. 16. Other processes for obtaining group information that add, combine, rearrange, and/or omit one or more steps described above are possible in accordance with other embodiments.

Figure 17:
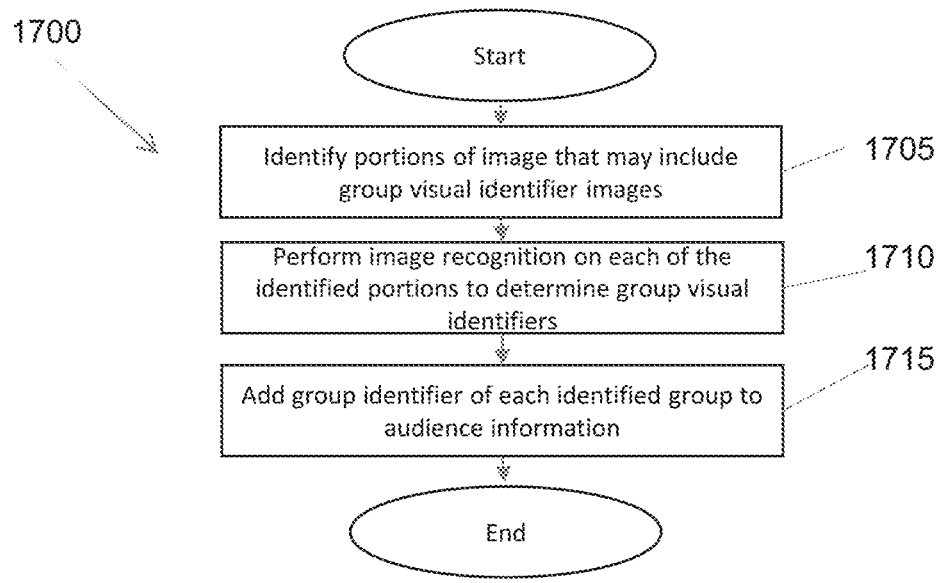
FIG. 17 is a flow diagram of an exemplary process performed by an image analysis module to analyze a captured image to identify visual identifiers of groups in an audience area in accordance with an aspect of the disclosure.

FIG. 17 illustrates a process 1700 for analyzing the captured image of the audience area for visual identifiers associated with each group in accordance with some aspects of the disclosure. Portions of the received (and optionally processed) image that include a visual identifier are identified (1705). As discussed above, each identified portion may be further processed to conform the requirements of the analysis process. An image comparison to the visual images stored in the group identifier information in each group record is performed to identify the group records that match the visual identifiers in the identified portions of the image (1710). The process 1700 may then end, and the above-described process 1600 (FIG. 16) may continue and provide the group identifiers of the matching group records to the content control module or device, as discussed above.

An exemplary process for performing image analysis in accordance with some embodiments of the disclosure is described above with respect to FIG. 17. Other processes for obtaining group information that add, combine, rearrange, and/or omit one or more steps described above are possible in accordance with other embodiments.

Figure 18:
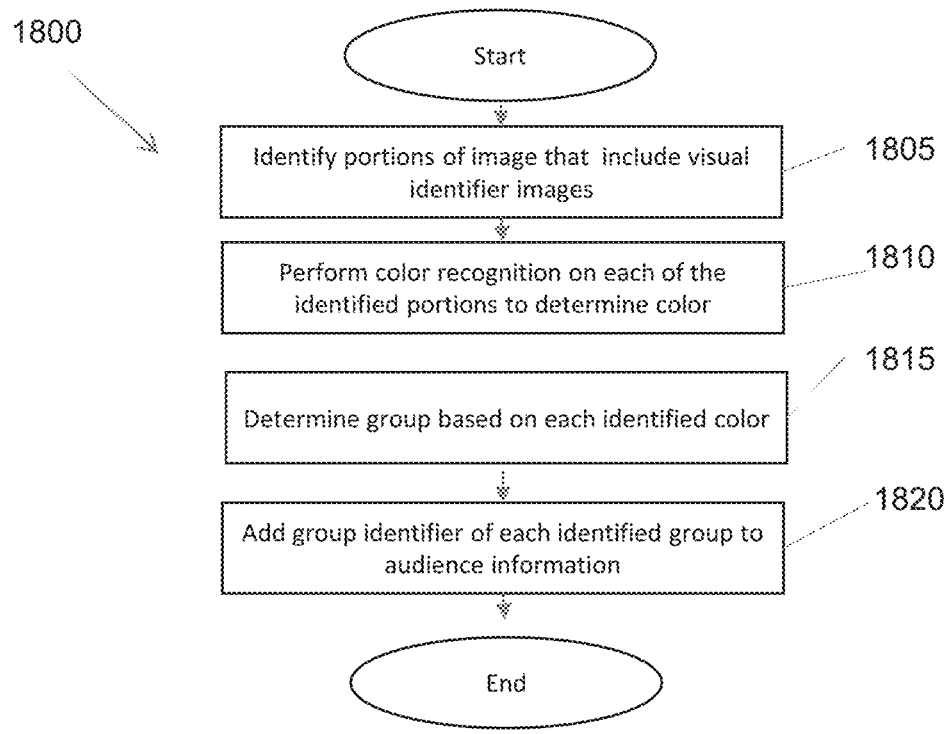
FIG. 18 is a flow diagram of an exemplary process performed by an image analysis module to analyze a captured image to identify members of groups based upon colors or patterns of visual identifiers in accordance with an aspect of the invention.

FIG. 18 illustrates a process 1800, in accordance with some embodiments, for analyzing the captured image of the audience area for visual identifiers (e.g., a particular color, pattern or symbol, as discussed above) associated with each group. Portions of the received (and optionally processed) image of audience area that may include a visual identifier are identified (1805). For example, the process may identify portions of the image including a badge, pin, lanyard, flag, article of clothing, or some other accessory that is worn or displayed by an audience member. As discussed above, each identified portion may be further processed to conform the requirements of the analysis process.

Color recognition may be performed on each identified portion to determine the color(s) of the visual identifier (1810). The color(s) are then used to determine a group associated with each portion based on the colors stored in the group visual identifier information of each group record (1815). The group identifier of each group identified is added to the audience information (1820). In accordance with some embodiments, a count of the number of portions identified to be associated with each identified group may be determined and added to the audience information for use in determining the media content provided based on the number of audience members in each group. The process 1800 may then end, and the above-described process 1600 (FIG. 16) may continue and provide the group identifiers of the matching group records to the content control module or device as discussed above.

An exemplary process for performing image analysis using color recognition of visual identifiers in accordance with some embodiments of the disclosure is described above with respect to FIG. 18. Other processes for obtaining group information that add, combine, rearrange, and/or omit one or more steps described above are possible in accordance with other embodiments.

Figure 19:
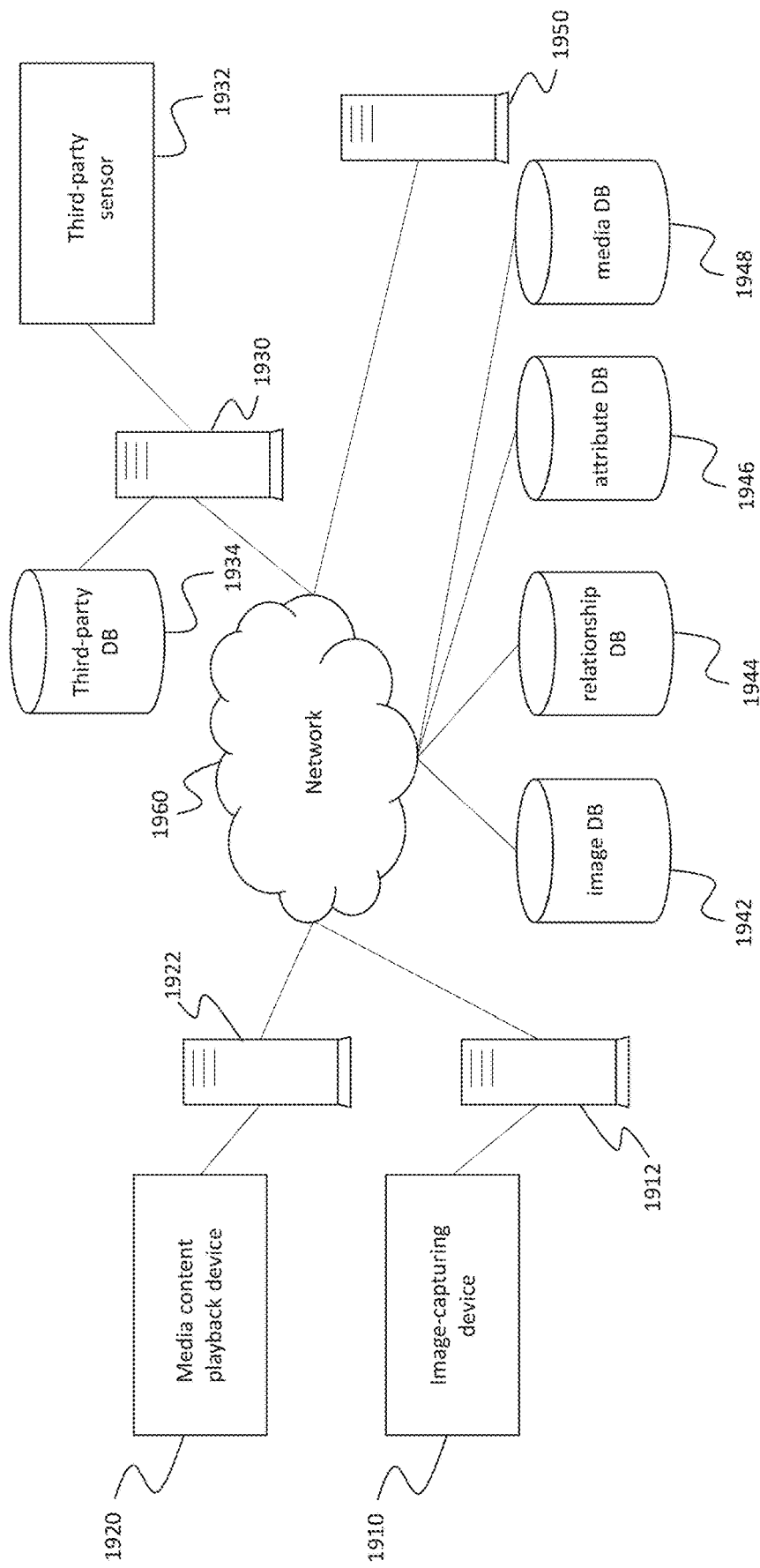
FIG. 19 shows a schematic of an embodiment of a media delivery system.

FIG. 19 shows a schematic of an alternative embodiment of the invention, having an image-capturing device 1910 that captures images, and a media content playback device 1920 that plays media content. While image-capturing device 1910 could be a camera that captures individual images, the image-capturing device 1910 is preferably a camera that captures a stream of images and saves those images to a memory, for example a hard drive or RAM in a computer system 1912. Preferably, an image stream is saved on the memory as a loop, for example a ten-minute loop or an hour-long loop, which is constantly overwritten as the number of images stored in the memory reach a memory threshold. In some embodiments, the image-capturing device 1910 could activate to capture a set of images in response to a trigger, for example a motion-sensor (not shown) electronically coupled to the camera or an inductive vehicle loop sensor, to capture a set of images.

Preferably, after a set of image fingerprints has been derived from a set of images, the set of images is deleted or overwritten in memory. In some embodiments, the image-capturing device 1910 may capture just a single image, but preferably the image-capturing device 1910 captures a plurality of images over time. In exemplary embodiments, the image-capturing device 1910 is controlled by an image computer system 1912 having software that, when executed by a processor, captures images, saves at least some of them in a transient or non-transient memory (not show), and forwards them to a server 1950 over a network 1960 for analysis. The network 1960 is shown symbolically in FIG. 19 as a "cloud" network that electronically connects devices with one another, such that data can be transmitted from one device to another via the network 1960. The server 1950 then analyzes one or more images sent from the image computer system 1912 to determine what sort of media content is appropriate as a function of data gleaned from the image-capturing device 1910. As previously mentioned, computer-system 1912 and server 1950 are shown symbolically here as two discrete computer systems electronically coupled using the network 1960, but they could be integrated into a single computer system in some embodiments. Likewise, as previously mentioned, while the image-capturing device 1910 is shown as a single device, a plurality of image-capturing devices could be electronically coupled to the image-computer system 1912 or to the server 1950.

The image-capturing device 1910 is preferably configured to capture images in real-time, but it could be configured to continuously record sets of images, for example by using a looped memory to hold a video stream. Such embodiments could be preferred in situations where an image-capturing device is monitoring a road with constant traffic, or a parking lot with multiple customers. In embodiments in which images are analyzed in real-time, extracted image fingerprints may be generated, to prevent raw images from being saved on a transient memory. In other embodiments, the image-capturing device 1910 is configured to capture images in response to a trigger from a sensor electronically coupled to image-capturing device 1910. For example, a motion sensor could trigger capturing of an image, or a detection of a vehicle within an inductive vehicle loop sensor could trigger capturing of an image. In such embodiments, the image-capturing device 1910 preferably captures a set of images over time, for example a video stream that starts when a motion sensor detects movement, and ends when the motion sensor fails to detect a movement within a threshold period of time. Feedback mechanisms could also be introduced that trigger alterations in the way image-capturing device 1910 captures images. For example, image-capturing device 1910 could be configured only to derive facial image fingerprints using a real-time analysis algorithm that compares derived facial image fingerprints against facial image fingerprints in an image database 1942, and recognition of matching image fingerprints could trigger image-capturing device 1910 to derive both facial image fingerprints and transactional identifiers, or both facial image fingerprints and interactions. While a single image-capturing device 1910 is shown, a media content system could have any number of image-capturing devices that work in conjunction with one another with any number of computer systems.

Server 1950 performs its analysis of a set of images using one or more databases, such as the image database 1942, a relationship database 1944, an attribute database 1946, and a media database 1948. While each of these databases is shown symbolically as a separate network-attached-storage (NAS) database electronically coupled to network 1960, each of the databases could be integrated into a single memory, or could be distributed among a plurality of memory systems depending upon need. The databases could be spread among a plurality of systems, and may be integrated in any suitable manner.

The image database 1942 is used to associate image fingerprints with identifiers. Preferably, the image database 1942 is pre-populated with identifiers that are entered into the database by an authenticated user or by importing such data from a third-party database, such as a third-party database 1934. Authenticated users could comprise administrators of the system, or guests with limited rights, for example a teacher who is provided rights to add identifiers for students in her classroom (e.g. a student ID). Such identifiers could be added using any suitable user interface, for example a website hosted by a server 1950, an email address that automatically processes filled form templates containing identifier information, a service kiosk (not shown), or a combination thereof. In other embodiments, the server 1950 could query the image database 1942 for identifiers that match a given image fingerprint, and if the query returns a null result, the server 1950 could then add a unique identifier into the image database 1942. For example, a facial fingerprint could be searched, and if the image database 1942 returns a null result, that facial fingerprint could be assigned a unique identifier for the future. In this manner, as the media content system is used over time, the image database 1942 could grow dynamically.

The relationship database 1944 is used to associate identifiers with other identifiers. Again, preferably, the relationship database 1944 is pre-populated with relationships that are entered into the database by an authenticated user or by importing such data from a third-party database, such as the third-party database 1934, but the media content system could dynamically add to the relationship database 1944 as well.

In some embodiments, when the server 1950 identifies image fingerprints belonging to commonly associated classes, and the relationship database 1944 returns a null value, the server 1950 could create a new relationship. For example, if the server 1950 detects a group of facial fingerprints and a car license plate within a set of images, and discovers that identifiers for the people with those facial fingerprints and the identifier for the car with that license plate are not in the relationship database 1944, the server 1950 could then add a relationship to the relationship database 1944 to associate the identifiers of those people with that car. In some embodiments, identifiers captured within a set of images can alter relationships within relationship database 1944. For example, every time a set of images contains both a person identifier and a car identifier, a weight of a relationship of occupant between the person identifier and the car identifier could be altered (e.g. an increment of a value). On the other hand, every time a set of images contains a car identifier with a different person identifier, a weight of a relationship of occupant between the car identifier and other person identifiers could be decremented. In this way, as the system repeatedly detects the same occupants in a car within sets of images, the weight of the relationship between the occupants and the car can be incremented, and as system repeatedly detects occupants in a car within sets of images that are of not of a person that has an existing relationship with the car can have that relationship weight decremented.

In some embodiments, several relationships could be defined between identifiers, for example an association of a person with a vehicle, and an association of a car seat of that vehicle (e.g. driver's seat, front passenger seat, middle rear seat). In some embodiments, mere proximity is enough to create an association (e.g. a group of identifiers within the same set of images), while in other embodiments motion recognition is necessary (e.g. a movement of a body associated with a facial fingerprint moving into the front passenger door of a vehicle) to trigger addition of a new relationship to the relationship database 1944.

The attribute database 1946 is used to associate an identifier with attributes of that identifier. Any suitable attribute could be used, for example a preference of a good/service or a demographic. Again, while the attribute database 1946 is preferably pre-populated with attributes that are entered into the database by an authenticated user or by importing such data from a third-party database, such as the third-party database 1934, the media content system could dynamically add to the attribute database 1946. In some embodiments, the media content system could analyze activities that are captured in one or more sets of images. Such embodiments preferably retrieve sets of image data from additional image-capturing devices controlled by the server 1950 or by their own image computer systems, such as the image computer system 1912, and could also glean data from third party sensors, such as a third-party sensor 1932, which feeds information into the third-party computer system 1930 to be stored on the third-party database 1934.

For example, in one embodiment, a set of images could capture an image of a person wearing a branded piece of clothing. The server 1950 could then analyze that set of images to uniquely identify a facial fingerprint that is associated with an identifier of a person, and uniquely identify a logo fingerprint that is associated with a brand and a clothing type (e.g. a brand Nike® and a clothing type of a sports bra). The server 1950 could then create an attribute for that person's identifier in the attribute database 1946 to associate that person's unique identifier with the brand and/or the clothing type. Attributes could be weighted in any suitable manner, for example via third-party data (e.g. updated data retrieved from a server that contains updated information for a person's attributes), and/or via analysis of sets of images over time (e.g. a person who is found holding a tennis racket in 25 sets of images and who is found holding a basketball in 3 sets of images could have an associated weight distribution favoring a tennis racket, using an algorithm that uses the number of images matching an attribute as an input of the function).

In other embodiments, interactions that are analyzed within a set of images could be used to alter attributes in the attribute database 1946. For example, if the image-capturing device 1910 captures a set of images of an identified person watching media content that is associated with a tennis racket, and identifies an action of that person looking away from the media content or identifies that the person has not looked at the media content within a threshold period of time, the server 1950 could decrement the weight of the tennis racket attribute associated with that person's identifier in the attribute database 1946. Interactions could also include body movements of an analyzed entity. For example, a smile or an extended thumbs-up could indicate an increased favorability towards another object in the image, while a frown or an extended thumbs-down could indicate a decreased favorability towards another object in the image. In response to detecting such interactions in a set of images along with an identified object or transaction identifier in the set of images, the server 1950 could be configured to alter an attribute of the attribute database 1946, for example by incrementing or decrementing a weight of a numerical attribute value associated with an identifier of the identified object (e.g. a detected smile when holding a type of identified food increments a weight of a value associated with that type of identified food).

The media content database 1948 is used to associate one or more attributes with a set of media content to provide targeted media content to the media content playback device 1920. Again, while the media content database 1948 is preferably pre-populated with media content that is saved onto the database by an authenticated user or by importing such data from a third-party database, such as the third-party database 1934, the media content system could dynamically add new media content to the media content database 1946, or could even add new associations to the media content database 1946. In preferred embodiments, new associations could be added as a function of identified triggering interactions within a set of images. For example, if the image-capturing device 1910 captures a set of images of an identified person watching media content that is associated with an ice cream cone for a threshold period of time, the server 1950 could identify that action and could then associate one or more attributes of that identified person to the media content. Preferably, such additions are only triggered with rare identified triggers and/or interactions, for example a movement towards the media content playback device 1920, or a large number of persons having a common attribute (e.g. a smile while consuming media content, a threshold period of time looking in a particular direction).

The server 1950 could then transmit one or more sets of media content from the media content database 1948 to a playback computer system 1922 for playing on the media content playback device 1920. In some embodiments, the set of media content is weighted in accordance with weighted attributes of the identifiers, such that media content with greater weight is afforded priority. In other embodiments, media content from the set of media content is randomly chosen for playback. In some embodiments, both the media content and attributes are sent to the playback computer system 1922, where the attributes alter the manner in which selected media content is played. For example, an attribute may be a volume of a video that is played, or may be a language that an audio portion of a video is played in, or may be a language that in which a video's subtitles are shown. In some embodiments, attributes may trigger different media content to be derived, for example an age attribute may trigger a decision between a cartoon or a live-action media file.

While FIG. 19 illustrates a plurality of computer systems that work cooperatively with one another—the image computer system 1912, the playback computer system 1922, the server 1950, and the third-party computer system 1930—any number or combination of computer systems could be used. For example, the image-capturing device 1910 and the media content playback device 1920 could be controlled by a common computer system, and that common computer system could even function in the role of the server 1950 with one or more of the databases 1942, 1944, 1946, and 1948 stored on its local memory. In other embodiments, the roles and responsibilities of each of the computer systems could be distributed among a plurality of computer systems.

Figure 20:
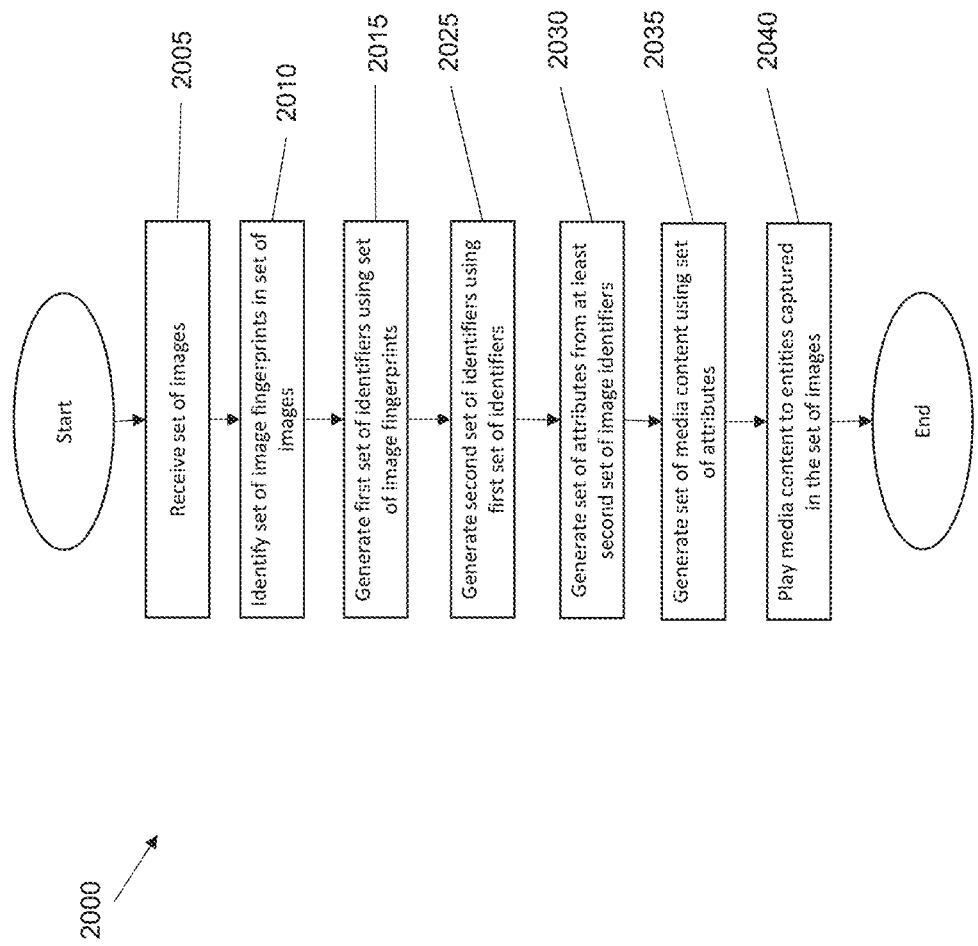
FIG. 20 shows an exemplary method of using the media delivery system of FIG. 19.

FIG. 20 shows an exemplary process 2000 that could be used by one or more media content computer systems to provide media content to a media content playback device. In step 2005, the media content computer system could receive a set of images, for example from an image capture device. In step 2010, the computer system could analyze the set of images to derive a set of image fingerprints, such as facial fingerprints, license plates, or shirt tags. In step 2015, the computer system could generate a first set of image identifiers, for example by cross-referencing the set of image fingerprints against in image database comprising correlations between image fingerprints and identifiers. In step 2025, the computer system could generate a second set of identifiers using at least some, if not all, of the first set of identifiers, for example by querying a relationship database using the first set of identifiers. In step 2030, the computer system could generate a set of attributes using at least some of the second set of identifiers, and in some embodiments using at least some of both the second set of identifiers and the first set of identifiers. Derivation of the set of attributes could be performed, for example, by querying an attribute database comprising correlations between identifiers and attributes. In step 2035, the computer system could generate a set of media content using the set of attributes, for example by querying a media content database comprising correlations between attributes and media content. Preferably the attributes are weighted, where some attributes have heavier weights than others. In some embodiments, the set of media content could comprise just identifiers that are used by a playback system to retrieve media content, while in other embodiments the set of media content could comprise media files themselves. Preferably, the set of media content is weighted or organized into a weighted list, where media content with a higher weight has a higher correlation with higher weighted attributes. In step 2040, the computer system could then play at least some of the set of media content on a media content playback device.

The embodiments herein could be utilized to provide targeted media content to a media content playback device using any suitable identified relationship within a set of images. For example, the image-capturing device 1910 could capture an image of a face, and the image computer system 1912 could transmit that image or a facial fingerprint via the network 1960 to the server 1950 for analysis. The server 1950 could then compare that facial fingerprint via the network 1960 with the image database 1942 to determine an identifier. That identifier is then used to query the attribute database 1946, to find out that the identified person has a preferred language, e.g., "Dutch." The server 1950 then checks the "Dutch" attribute against the media database 1948 to find media content preferably watched by someone who is Dutch, which is then forwarded to the playback computer system 1922. The playback computer system 1922 then pulls one of the media content files and plays it on the media content playback device 1920 of an A/V display at a service station fuel pump, checking subsequent images captured by the image-capturing device 1910 to see if the person is watching. If the person is not watching within a certain threshold time period, the playback computer system 1922 then cycles to another media file.

In another embodiment, the image-capturing device 1910 captures a group of people and transmits a set of images to the server 1950 for analysis. The server 1950 identifies a first set or number (e.g., 20) of the group of people as wearing an aqua-colored, square-shaped tag, and a second set or number (e.g., 5) as wearing a teal-colored, square-shaped tag. In this embodiment, the server 1950 is configured to only analyze square-shaped tags. The server 1950 then compares "aqua" against the image database 1942 to determine that "aqua" is associated with a first identified group, and compares "teal" against the image database 1942 to determine that "teal" is associated with a second identified group. These identifiers are then compared against the attribute database 1946 to determine the attribute "English" is associated with the first identified group, and that the attribute "Spanish" is associated with the second identified group. "English" is given a weight of 20, since there were 20 instances of aqua found in the set of images, while "Spanish" is given a weight of 5, accordingly. Those attributes are then compared against the media database 1948 to retrieve media having English audio and Spanish subtitles. The playback computer system 1922 then plays that media on the media content playback device 1920 of a museum exhibit after receiving that media content from the server 1950.

In another embodiment, the image-capturing device 1910 may be configured to capture a group of people entering a vehicle, and to transmit a set of images to the server 1950 for analysis. The server 1950 would then query the image database 1942 to determine identifiers for the people and the vehicle, and then query the relationship database 1944 to determine if those people are associated with the vehicle. If the latter query results in a null value, the server 1950 could then add relationships between the identifiers of the people and the identifiers of the vehicle to the relationship database 1944. This relationship could be set to have no expiration date, or it could be set to expire at the end of a given time period, for example, at the end of a spring break holiday week or on Sunday when the weekend is over. At a later time, the image-capturing device 1910 could then capture an image of just that vehicle, and transmit that set of images to the server 1950 for analysis. The server 1950 would then query the image database 1942 to determine an identifier for the vehicle using the captured license plate number, and then could query the relationship database 1944 to determine a relationship between the identifier of the vehicle and various identifiers for the people. The server 1950 could then query the attribute database 1946 using the identifiers of the people to determine attributes of the people, and could weight all the attributes appropriately in an aggregated list of attributes, for example by adding the attributes together (e.g. person 1 has a 0.2 attribute for a hamburger and person 2 has a 0.3 attribute for a hamburger resulting in an aggregated 0.5 attribute for a hamburger). The server 1950 could then query the media content database 1948 to determine a set of media content appropriate for the attributes in that vehicle, and could send that set of media content to the playback computer system 1922, which would be coupled to a media content playback device 1920 of a billboard that will display to that vehicle. In some embodiments, that media could be played immediately, while in other embodiments, the system could be programmed to play the media at a given distance (e.g., one mile or 1.5 km) up the road, triggered as a function of a calculated time/distance threshold, or when a separate image-capturing device placed just before the billboard identifies the same license plate.

In other embodiments, groups of vehicles could be analyzed to derive attribute data for the group. For example, a set of images of various vehicles could be captured by image-capturing device 1910 over a period of time (e.g. a single instant or a period of five seconds). Image computer system 1912 could then analyze the set of images to generate image fingerprints. In some embodiments the analysis could generate identifiers of the cars, such as a license plate of a vehicle or a make/model of the vehicle, while in other embodiments the image fingerprints are transmitted to server 1950 to query image database 1942 to determine identifiers of each vehicle. The generated identifiers could then be used by server 1950 to query relationship database 1944 and glean a plurality of related identifiers (e.g. occupants of those vehicles or types of vehicles), which could, in turn, be used to query attribute database 1946 and glean attributes for each related identifier. In this manner, attributes for a large population of derived vehicle occupants could be gleaned. Preferably, the attributes are aggregated, for example by summing the weighted values of the attributes. While the totality of the attributes could then be used by server 1950 to derive sets of media content for media database 1948, in preferred embodiment only a subset of the attributes are selected, preferably as a function of the weight of the attributes (e.g. the top attribute or the top 5 attributes), to be used to derive sets of appropriate media content from media database 1948. Server 1950 could then transmit the set of media content to playback computer system 1922 to play to media content playback device 1920. In some embodiments, where the vehicles are not moving, for example a traffic jam or at a drive-in movie theater, the playback computer system 1922 could be configured to avoid repeating media (e.g. by deleting media content from a list of the set of media saved on memory after playback), or non-repeating media within a threshold of time (e.g. within a half an hour).

In some embodiments, a third-party computer system 1930 could be provided access to relationship database 1944 to verify relationship data that has been saved to relationship database 1944. For example, server 1950 could derive both a driver identifier (e.g. by recognizing an interaction of entering a driver's door of a vehicle and capturing a one or more images of the entity entering that vehicle) and a vehicle identifier from a set of images (e.g. by querying image database 1942 with a facial fingerprint and a license plate number) and could then save both identifiers as a relationship along with a time-stamp in relationship database 1944. A third-party computer system 1930 could then transmit a query to the server 1950 using an identifier of a vehicle (e.g. a license plate of the vehicle) and a time period and the server 1950 could respond to the third-party sensor by providing identifiers of all parties that have been captured drivers of that vehicle within the time period. In other embodiments, the third-party computer system 1930 could provide a facial fingerprint or an identifier of an authorized driver, and server 1950 could be programmed to only provide information that an entity that is not the authorized driver or is not a person who matches the received facial fingerprint is the driver of the car.

In some embodiments, third-party computer system 1930 could be configured to have authorized access to set a triggering alarm on server 1950 related to a vehicle identifier. For example, third-party computer system 1930 could provide a vehicle identifier to server 1950 along with a set of facial fingerprints, and server 1950, in response, could then create identifiers for each of the set of facial fingerprints in image database 1942, and could associate the vehicle identifier with the newly created identifiers in relationship database 1944 with an "authorized driver" tag. Server 1950 could then analyze sets of images for facial fingerprints of entities having a recognized interaction of driving a vehicle, or exiting/exiting a driver's door of a vehicle, and for vehicle fingerprints (e.g. a license plate number). Server 1950 could then derive identifiers for entities having the driver interaction with the vehicle and the identifier of the vehicle, and search relationship database 1944 for a relationship of "authorized driver" between the input search query terms. If server 1950 fails to find an authorized driver relationship, then server 1950 could then transmit to third-party computer system 1930 (or any other computer system defined by a user of third-party computer system 1930) an alert that an unauthorized driver is driving the vehicle.

In a related embodiment, server 1950 could be configured to save one or more sets of images from image-capturing device 1910 to a memory in response to a trigger, for example local memory on server 1950, media database 1948, or third-party database 1934. In some embodiments, third-party computer system 1930 could transmit a request for server 1950 to save images having or lacking a relationship, or having or lacking an attribute. For example, server 1950 could be configured to save one or more sets of images where server 1950 fails to find an authorized driver relationship between a captured driver and an identified vehicle. In another embodiment, server 1950 could be configured to save one or more sets of images where server 1950 identifies an attribute of "save image" with an identifier. Such images could be saved with metadata information, such as a timestamp, a location of the image-capturing device, and/or an identifier of a location of the image-capturing device, and could be pushed to a third-party computer system that requested the information in real-time, or could be stored on a memory for retrieval at a later time. In some embodiments, the request from third-party computer system 1930 could have an expiration-date timer to delete sets of images after a provided time period threshold.

In other embodiments, server 1950 could transmit one or more attributes to a third-party computer system 1930 instead of, or in addition to, playing a set of media content. For example, where image-capturing device 1910 captures images about a gas station pump and media content playback device 1920 is a screen at a gas station, third-party computer system 1930 could be configured to control an auto-select feature of a gas pump. In such embodiments, the set of captured images from image-capturing device 1910 could comprise a vehicle fingerprint, such as a photo of a license plate, which can be processed by a computer system, such as image computer system 1912 or server 1950 to derive a license plate identifier or a make/model vehicle identifier. Server 1950 or image computer system 1912 could then use that derived identifier to query attribute database 1946 and determine a preferred gas type of the vehicle, and could then transmit that preferred gas type to third-party computer system 1930, which then auto-selects the preferred gas type.

Figure 21:
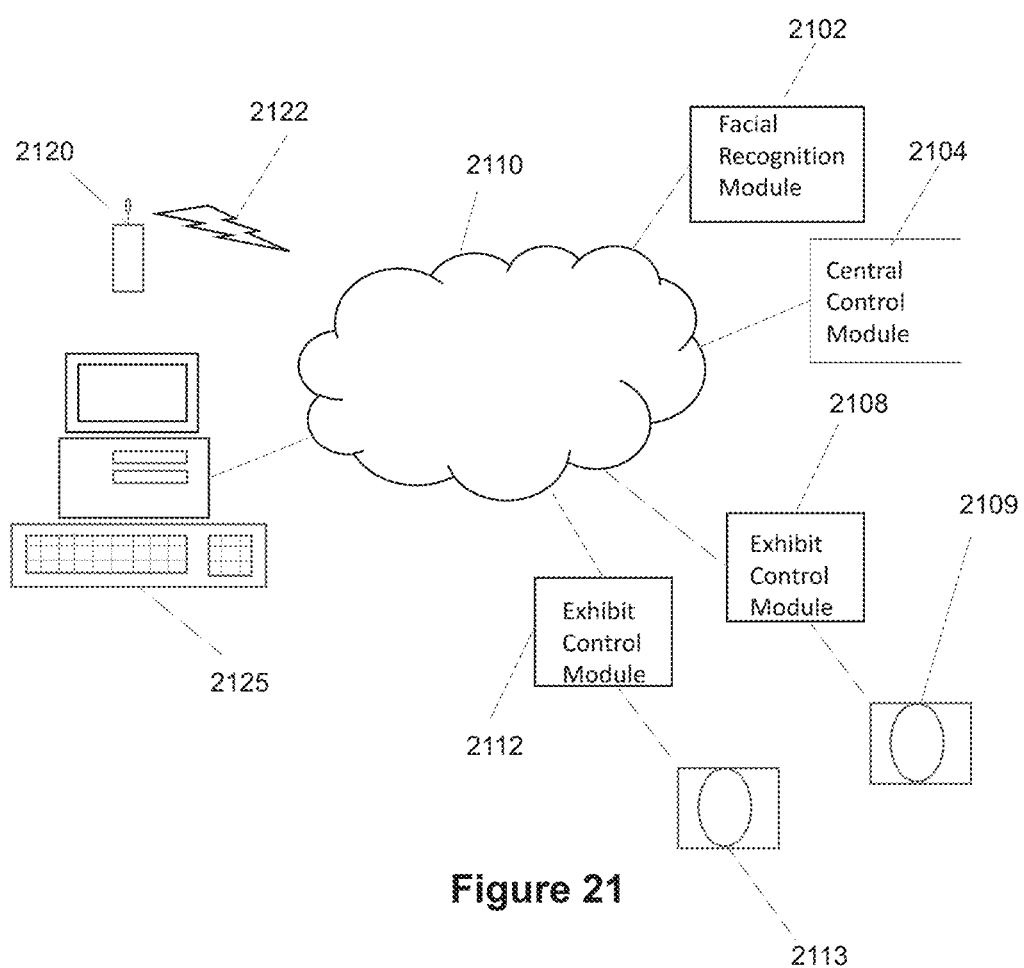
FIG. 21 shows a diagrammatic representation of an embodiment of systems and devices that perform processes for providing location information for groups of users in a venue in accordance with one aspect of the invention.

FIG. 21 illustrates an alternative system 2100 for providing media content to supplement an exhibit in accordance with an aspect of the disclosure. The system 2100 includes a facial recognition module 2102; a central control module 2104; and exhibit control modules 2108 and 2112 that are communicatively connected by a network 2110. A portable personal communication device 2120 and a computer 2125 may also be connected to the network 2110. Although shown as four separate devices or functionalities in FIG. 21, the facial recognition module 2102; the central control module 2104; and the exhibit control module 2108 and 2112 may be provided by a single computing system. Alternatively, the processes that provide one or more of the facial recognition module 2102, the central control module 2104, and the exhibit control module 2108 may be distributed across multiple systems that are communicatively connected via the network 2110.

The facial recognition module, functionality, or system 2102 may be implemented or functionalized by a computer system that includes a memory and a processing unit to perform the processes for providing facial recognition and/or other image analysis. The computer system that implements the facial recognition module, functionality, or system may include one or more servers, routers, computer systems, and/or memory systems that are communicatively connected via a network to provide facial recognition and/or other image analysis.

The central control module 2104 may be implemented or functionalized by a computer system that includes a memory and a processing unit to perform processes for storing and providing media content for one or more exhibits in a venue. The central control module 2104 may also advantageously store and update location information of a user. The central control functionality may be provided by a central control system for the venue. Specifically, the central control module 2104 may be implemented or functionalized by a system that includes one or more servers, routers, computer systems, and/or memory systems that are communicatively connected via a network to store and provide media content for one or more exhibits in the venue, as well as to store and update location information for registered users.

Each of the exhibit control modules 2108 and 2112 may be implemented or functionalized by a computer system that controls devices in the exhibit area that include an image capture device. Advantageously, one computer system may control devices for more than one exhibit. In specific embodiments, the exhibit control modules 2108 and 2112 may be implemented or functionalized by a system that includes one or more servers, routers, computer systems, memory systems, an image capture device and/or media playback devices that are communicatively connected via a local network to obtain and present media content for the exhibit.

The network 2110 may advantageously be the Internet. Alternatively, the network 2110 may be a Wide Area Network (WAN), a Local Area Network (LAN), or any combination of Internet, WAN, and LAN that can be used communicatively to connect the various devices and/or modules shown in FIG. 21.

The portable personal communication device 2120 may a smart phone, tablet, Personal Digital Assistant (PDA), a laptop computer, or any other device that is connectable to the network 2110 via wireless connection 2122. The computer 2125 may advantageously connect to the network 2110 via either a conventional "wired" or a wireless connection. The computer 2125 may be, for example, a desktop computer, a laptop, a smart television, and/or any other device that connects to the network 110. The portable personal communication device 2120 and/or the computer 2125 allow a user to interact with one or more of the above-described modules to provide information such as, for example, personal information to be added to registered user information of the user.

Although a particular system of devices and/or functional modules is described above with respect to FIG. 21, other system architectures that, add, remove, and/or combine various devices and/or modules may be used to perform various processes in accordance with various other aspects of the disclosure.

Figure 22:
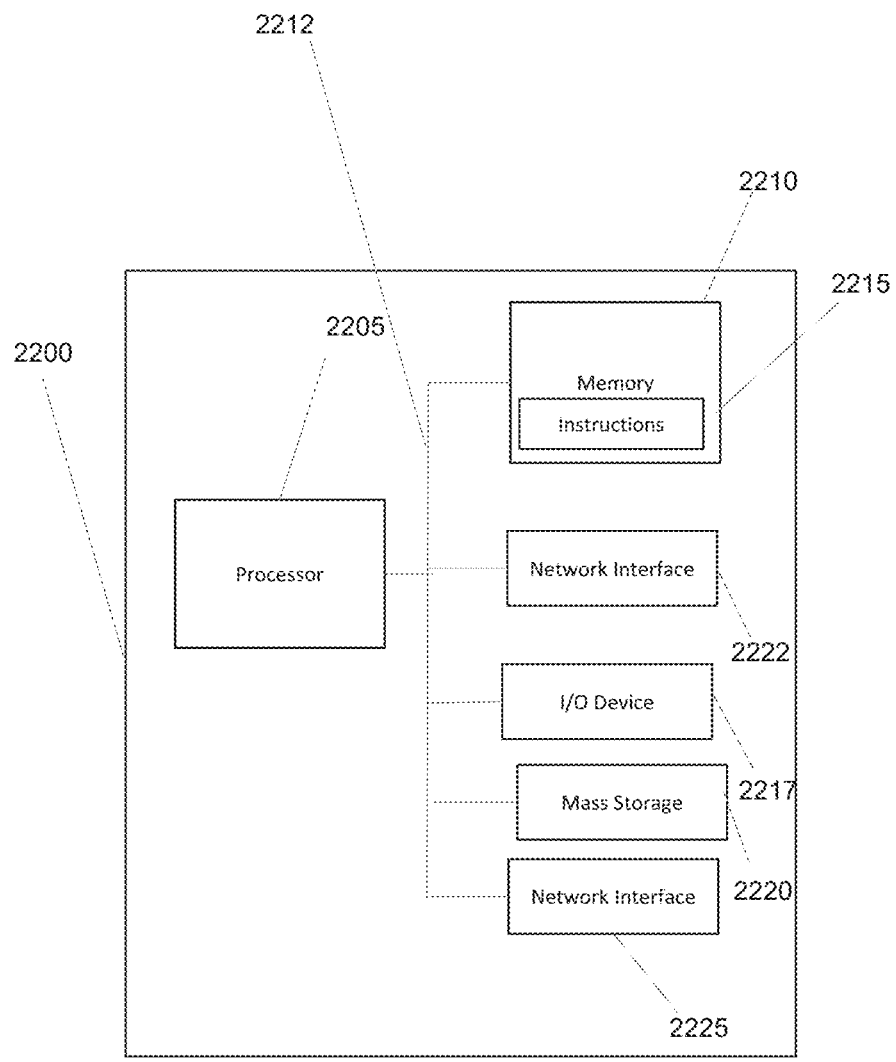
FIG. 22 is a block diagram of an embodiment of a computer processing system in a component in accordance with an aspect of the disclosure.

FIG. 22 is a high-level block diagram showing architecture of an exemplary processing system 2200 that may be used according to some aspects of the disclosure. The processing system 2200 can represent a computer system that provides a facial recognition functionality, a central control functionality, an exhibit control functionality, and/or other components or functionalities. Certain standard and well-known components of a processing system which are not germane to the subject matter of this disclosure are not shown in FIG. 22.

Processing system 2200 includes one or more processors 2205 in operative communication with memory 2210 and coupled to a bus system 2212. The bus system 2212, as shown in FIG. 22, is a schematic representation of any one or more separate physical buses and/or point-to-point connections, connected by appropriate bridges, adapters and/or controllers. The bus system 2212, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The one or more processors 2205 are the central processing units (CPUs) of the processing system 2200 and, thus, control its overall operation. In certain aspects, the one or more processors 2205 accomplish this by executing software stored in memory 2210. The processor(s) 2205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 2210 represents any form of random-access memory (RAM), read-only memory (ROM), flash memory, or the like, or a combination of such devices. Memory 2210 includes the main memory of the processing system 2200. Instructions 215 implementing the process steps of described below may reside in memory 2210 and are executed by the processor(s) 2205 from memory 2210.

Also advantageously connected operatively to the processor(s) 2205 through the bus system 2212 are one or more internal or external mass storage devices 2220, and a network interface 2222. The mass storage device(s) 2220 may be, or may include, any conventional medium for storing large volumes of data in a non-volatile manner, such as one or more solid state, magnetic, or optical based disks. The network interface 2222 provides the processing system 2200 with the ability to communicate with remote devices (e.g., storage servers) over a network, and may be, for example, an Ethernet adapter, a Fiber Channel adapter, or the like.

The processing system 2200 also advantageously includes one or more input/output (I/O) devices 2217 operatively coupled to the bus system 2212. The I/O devices 2217 may include, for example, a display device, a keyboard, a mouse, etc.

Figure 23:
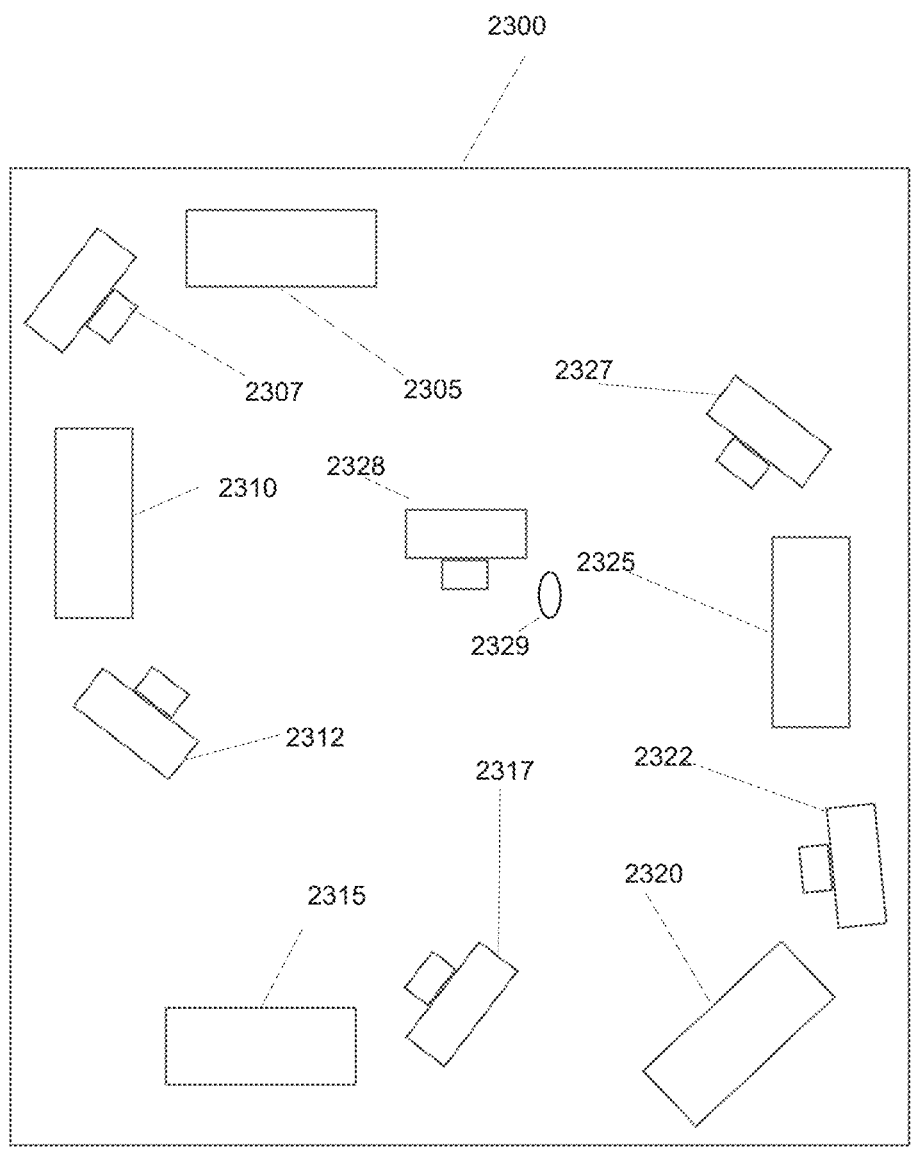
FIG. 23 is conceptual perspective view of an exemplary venue having placement of image capture devices at various exhibits in the venue in accordance with an aspect of the disclosure.

FIG. 23 illustrates a venue with multiple exhibits or attractions in accordance with an aspect of the invention. Venue 2300 includes multiple exhibits or attractions including exhibits 2305, 2310, 2315, 2320, and 2325. Each exhibit has an associated image capture device 2307, 2312, 2317, 2322, and 2327 respectively.

For example, exhibit 2305 has an associated image capture device 2307 that is focused on an area in front of exhibit 2305 to capture an image with facial images of patrons entering the exhibit 2305. Preferably, the area is defined by an admin user who focuses on sections of an image, or controls a camera to point at pre-defined areas in front of exhibit 2305. Preferably, the image capture device is focused on an area near an entrance and/or exit of the exhibit to ensure capturing images with the greatest number of facial images of patrons. Furthermore, although one associated image capture device is shown with each exhibit, an exhibit can have more than one associated image capture devices in accordance with various aspects of this disclosure. Furthermore, image capture devices, such as image capture device 2328, may be placed in various locations around the venue 300, such as but not limited to, high traffic areas to capture location information of patron in the location and/or as many patrons as possible.

In accordance with some aspects, a proximity sensor 2329 may be associated with an image capture device 2328 to detect when one or more patrons are in a location. The proximity sensor may send a signal to the image capture 2328 when one or more patrons are detected. The image capture device then captures an image of the location for use in location determination of registered users as will be discussed in more detail below.

Although an exemplary venue in accordance with an aspect of the invention is described above with reference to FIG. 23, other configurations that add, remove, combine, and/or move components relative to one another are possible.

Figure 24:
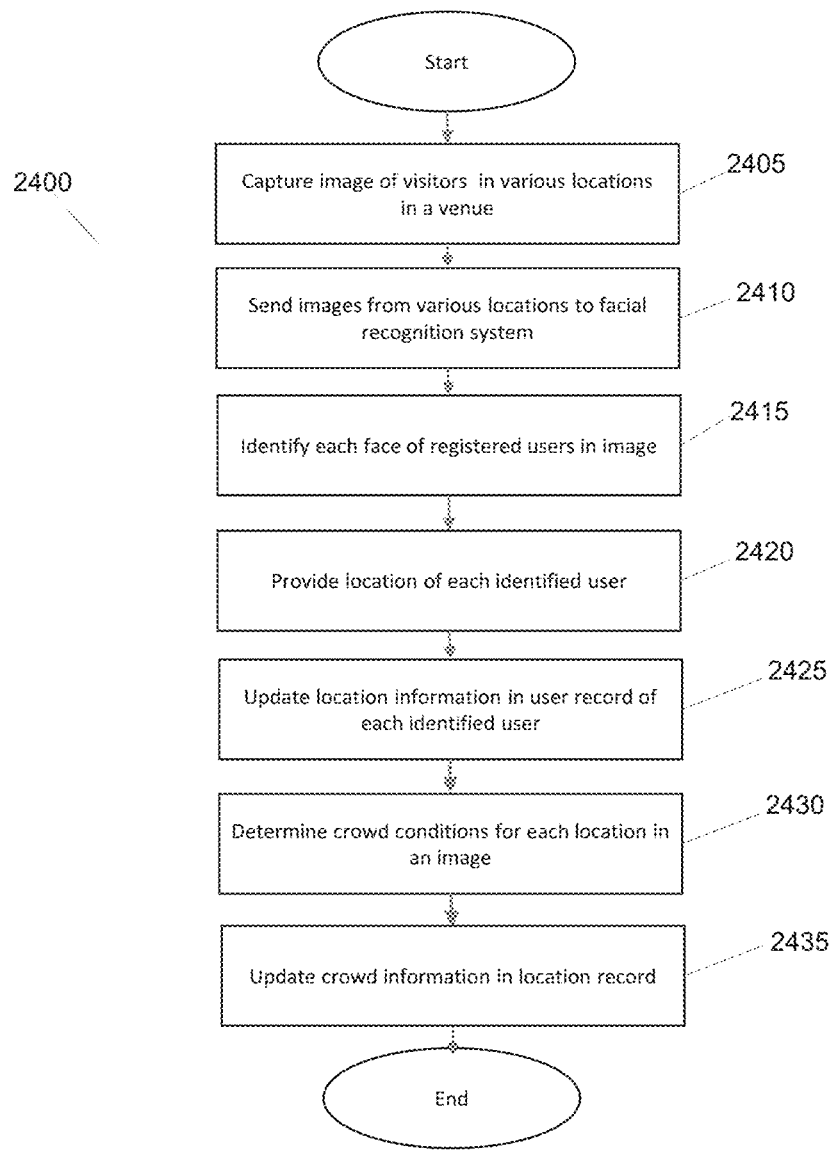
FIG. 24 is a flow diagram of an exemplary process for providing location information about users at various locations in a venue in accordance with an aspect of the disclosure.

FIG. 24 illustrates a flow diagram of a process for providing location information about users at various locations in a venue in accordance with an aspect of the disclosure. One example of a registration process for users is described below in detail with respect to FIG. 36. The process 2400 captures images of patrons in various known locations throughout the venue 2405 using a plurality of image capture devices, for example devices 2307, 2312, 2317, 2322, 2327, and 2328 in FIG. 23. For example, a location may be, but is not limited to, an entrance or an exit of an exhibit; an entrance or exit of the venue; and/or other high traffic locations in the venue. The captured images are advantageously provided to a facial recognition device or module (e.g. 2102 in FIG. 1) in step 2410. The facial recognition device or module identifies the desired portions of each captured image that include the facial image of one or more patrons in step 2415.

A facial recognition process is then performed on the identified portion of each captured image to identify (e.g., with appropriate user information) each registered user in each image and associate each identified user with the location where the image was captured in step 2420. The location of each identified user is then updated in a location record, such as those shown in FIG. 33, for the user in step 2425. Crowd conditions in a location including, but not limited to, crowd size for an exhibit, may also be determined from the image of each location in step 2430. For example, software could count entities with unique facial fingerprints in a set of images taken over time. The crowd information for each location is then updated in a location record, for example in database 3400 shown in FIG. 34, in step 2435 after which the process 2400 ends.

As discussed above, an exhibit control system, device, or module (e.g. 2108, 2112, FIG. 21) could capture the images of the patrons in near an exhibit/high traffic area. In some embodiments, the exhibit control system, device, or module may be a separate system that is not associated with a specific exhibit. Instead, the image capture device (e.g. 2328, FIG. 23) is a high traffic location and associated with a location control system and/or associated exhibit control system, to send information to the central control device or module (e.g. 2104, FIG. 21).

The above describes an overall process for obtaining location information registered users and/or crowd information for a location in a venue in accordance with one aspect of the disclosure. However, other processes that add, combine, remove, and/or reorder the steps of the process are possible.

Figure 25:
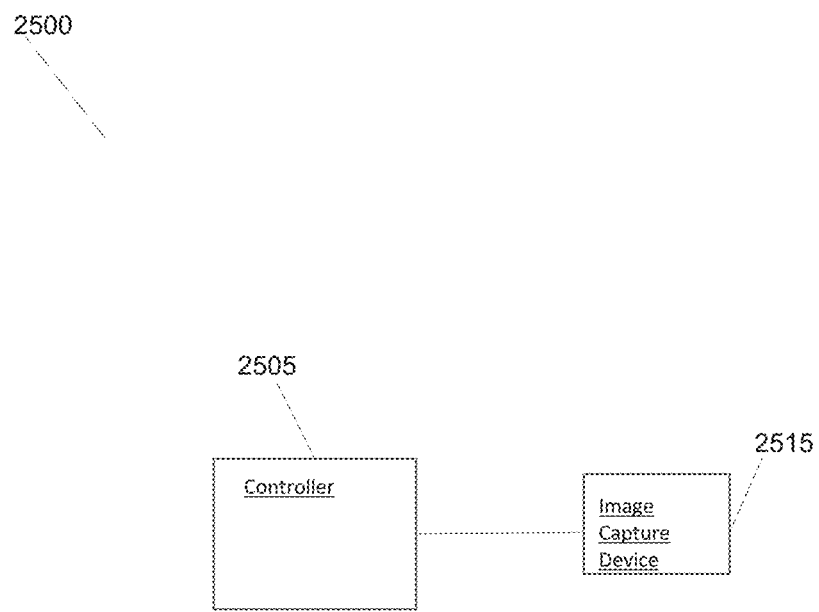
FIG. 25 is a block diagram of exemplary components of an exhibit control system in accordance with an aspect of the disclosure.

FIG. 25 is a block diagram of components of an exemplary exhibit control system, device or module 2500 and/or location control system (similar to 2108, 2112, FIG. 21) which, in accordance with an aspect of the disclosure, includes a controller 2505 and an image capture device 2515 (similar to 2328, FIG. 23).

The controller 2505 may be implemented as a processing system that controls the image capture device 2515 in capturing images of an area and/or location to obtain the location information for registered users using image analysis of the captured image. In accordance with some aspects, the controller 2505 may also control one or more components of the exhibit. These components may include, for example, valves, hydraulic lifts, animatronics that provide motion in the exhibit, and any other components that receive instructions to perform a task to facilitate the presentation of the exhibit. In some other aspects, the control system for more than one exhibit may be provided by a processing system. These control devices could be controlled via a triggering mechanism that is triggered by recognition of pre-defined image characteristics or movements within a set of images. For example, a table could define that an animatronic activates when a predefined teacher or a predefined student or an entity having the attribute of a teacher is recognized within a set of images.

The image capture device 2515 may be a camera that captures still images and/or a video camera that captures video images (i.e. a set of images). In the exemplary embodiment shown in FIG. 25, the image capture device 2515 is a separate device including a processing system that is communicatively connected to the controller 2505 via a wireless or wired connection. In some other aspects, the image capture device 2515 is an I/O device of the processing system or module including the controller 2505. As discussed above, the image capture device 2515 is positioned such that the device is focused on a particular area near the exhibit in a manner to capture images that include facial images of patrons in the area. The image capture device 2515 may also capture, record, or otherwise provide other information, such as depth information for the imaged image objects.

Although an exemplary embodiment of an exhibit control device or module is described above with respect to FIG. 25, other embodiments that add, combine, rearrange, and/or remove components are possible.

Figure 26:
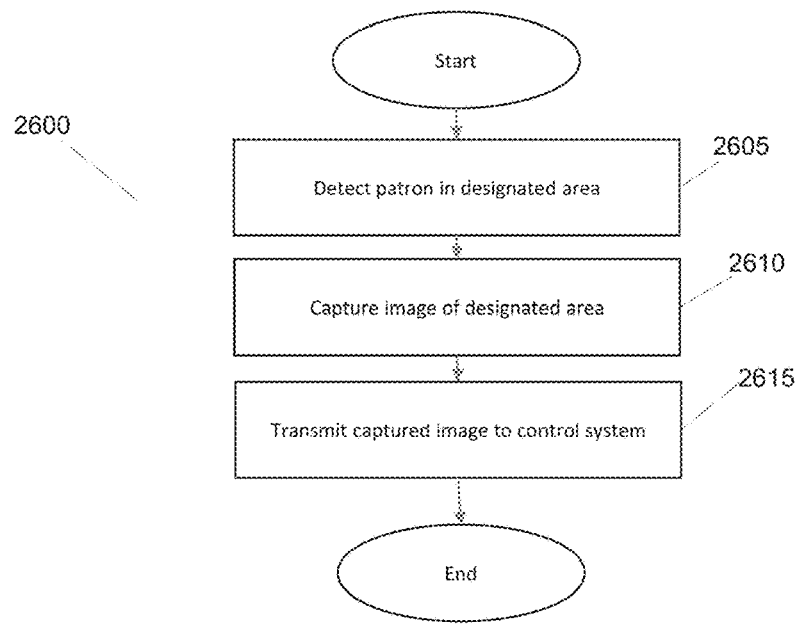
FIG. 26 is a flow diagram of an exemplary process performed by the exhibit control system to capture an image of registered users in an exhibit area in accordance with an aspect of this disclosure.

FIG. 26 illustrates a flow diagram of an exemplary process 2600 performed by the exhibit control device or module (2500 or 2108/2112) to capture images to provide location information for registered users in accordance with an aspect of this disclosure. In the process 2600, a patron is detected in an area (2605) by, for example, the facial recognition system, motion sensors, heat sensors, and/or any other type of sensor that may detect the presence of one or more patrons in the audience area.

An image is captured of the area (2610), for example, in response to the detection of one or more patrons in the designated area by image capture device 2515. Alternatively, the image capture device may periodically capture an image at pre-defined intervals of time, or a video feed of the designated area may be continuously captured and one or more images may then be extracted from the video feed when one or more patrons are detected in the designated area.

The captured image is transmitted to a central control device or module (e.g. 2104, FIG. 21) (2615), optionally with other information about the image. Such other image information may include, for example, camera settings, depth information, a time stamp, lighting information, a location, and/or other like information related to the image. The image information may be transmitted separately, or it may be transmitted in or with the captured image. Optionally, a video feed may be provided to the central control device or module. The exhibit control device or module may optionally monitor a video feed and only send an image that includes patrons taken from a feed when a patron is detected in the area. The exhibit control device or module may optionally perform image processing to improve image quality prior to transmitting the image, and/or it may optionally isolate facial images from the captured image and send only portions of the image that include facial images to the central control device or module. Process 2600 may then end.

Although an exemplary process performed by the exhibit control device or module to obtain location information for registered users in accordance with aspects of this disclosure is discussed above with respect to FIG. 26, other processes performed by the exhibit control device or module to provide the media content that add to, combine, rearrange, or remove any of the described steps are possible and are considered within the scope of this disclosure.

In accordance with some aspects of this disclosure, the system may also store records of consumable products that a registered user purchases and/or is awarded. Such records could be entered into a database via one of the disclosed computer systems that recognizes a transaction and records attributes of that transaction in a database. For purposes of this discussion, consumable products are any item that may be awarded to or purchased by a registered user in the venue. Examples include, but are not limited to, toys, gift certificates, souvenirs, or any other item that a user may obtain in the venue. The user may then go to a redemption center at a later time and obtain the consumable products that the user had purchased/received earlier. Preferably, the redemption center would be near the exit of the venue to allow the user to collect the obtained consumable products just prior to leaving the venue.

Figure 27:
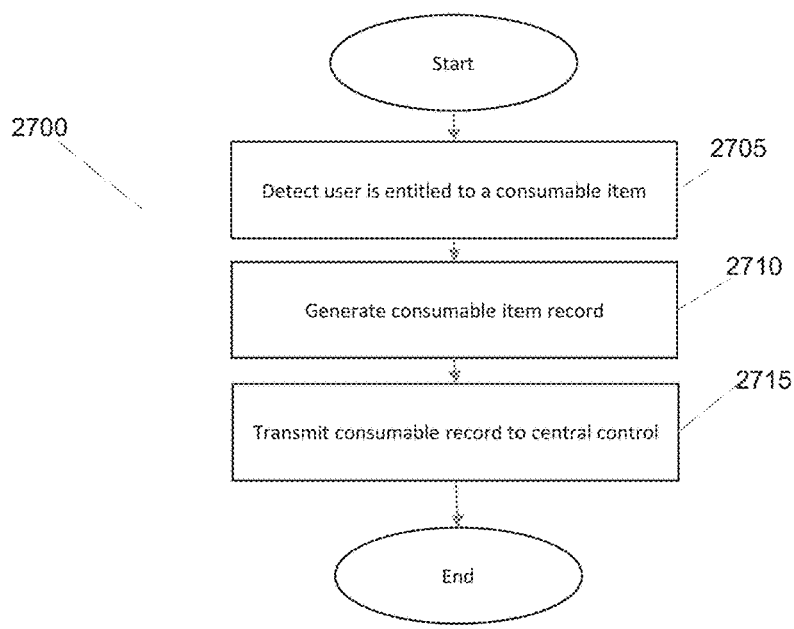
FIG. 27 is a flow diagram of an exemplary process performed by the exhibit control system to capture provide consumable information about registered users in accordance with an aspect of this disclosure.

FIG. 27 illustrates a flow diagram of a process performed by an exhibit control module or device (e.g. 2108, FIG. 21) to send information about a consumable product obtained by a registered user at the exhibit. The process 2700 begins by detecting the user is entitled to a consumable product (2705). This detection may be a purchase of a consumable product or an awarding of the consumable product as a prize in a game and/or contest. For example, an image could be taken of the user, and a facial fingerprint could be entered into an image database to retrieve an identifier of the user, which is then cross-referenced against a database that contains relationships between entity identifiers and product entitlements. When such an entitlement is returned by the database, this could trigger recognition that the user in the image is entitled to a consumable product identified in the database.

The process then generates a record for the consumable product that indicates the consumable product contained and the registered user that obtained the item (2710). The record of the consumable product is then transmitted to the central control system (2715) and the process 2700 ends.

Although an exemplary process performed by the exhibit control device or module to provide records of consumable products obtained by users in accordance with aspects of this disclosure is discussed above with respect to FIG. 27, other processes performed by the exhibit control device or module to provide the media content that add to, combine, rearrange, or remove any of the described steps are possible and are considered within the scope of this disclosure.

Similar to the consumable products discussed above, some exhibits and/or areas may have areas available for photo opportunities and have venue employees and/or professional photographers at the photo opportunity area to capture an image of a registered users and/or a group of users. In accordance with some aspects of the invention, the system provides a system for storing the images captured at various photo opportunity areas and making the images available to the registered user or a user authorized to act for the register user for retrieval and/or purchase.

Figure 28:
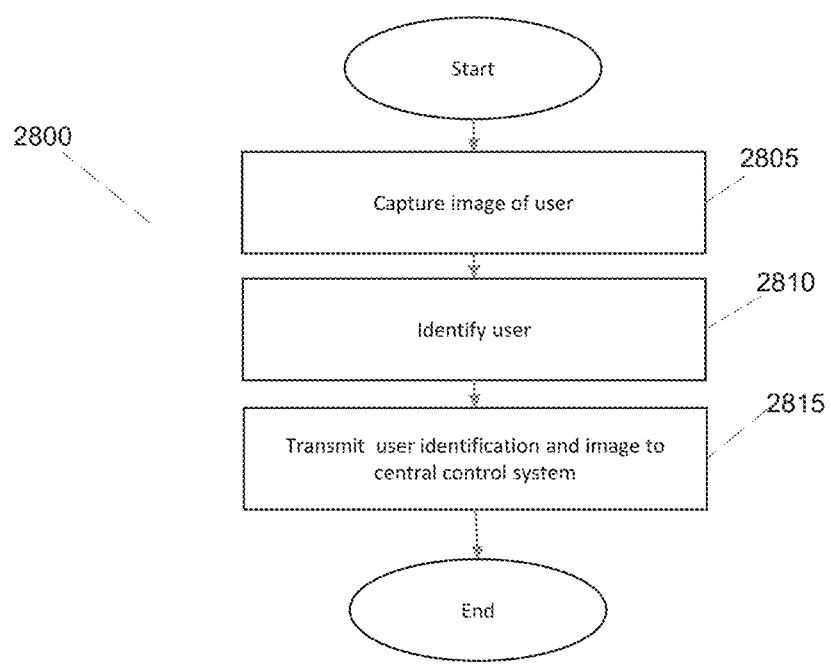
FIG. 28 is a flow diagram of a process performed by an exhibit control system to associate an image captured at a photo opportunity are with a registered user in accordance with an aspect of the invention.

FIG. 28 illustrates a flow diagram of another exemplary process performed by an exhibit control system, device, or module (e.g. 2108, FIG. 21); and/or location control system, device, or module to provide images of a captured user to the central control system, device, or module (2104, FIG. 21) for retrieval by the user in accordance with an aspect of the invention.

The process 2800 begins by capturing an image of a registered user at a photo opportunity area associated with the exhibit/area (2805). This image can be captured with an image capture device that is separate and/or different from the image capture device(s) used for location determination. The process then identifies each registered user associated with the captured image (2810). The identification may be performed by reading a bar and/or bar code on a card carried by the user in accordance with some aspects. In accordance with some other aspects, the identification may be performed using the facial recognition system, device, or module (e.g. 2102, FIG. 21). The image and identifiers (FIG. 33) associated with each identified registered user in the image are transmitted to the central control system (2815). In accordance with some embodiments, the identifiers of the identified registered users may be embedded in the metadata of the image, or may be added to the metadata of the image by the system. In accordance with some other embodiments, an image record that includes the image and the identifiers may be generated and transmitted. This metadata may be saved onto a database to allow for easy-searching of the image. The process 2800 may then end.

A process performed by an exhibit control system, device or module to provide images of registered users captured in an photo opportunity area in accordance with an aspect of the invention is described above with reference to FIG. 28, other processes performed by the exhibit control system, device, or module to provide the media content that add to, combine, rearrange, or remove any of the described steps are possible and are considered within the scope of this disclosure.

Figure 29:
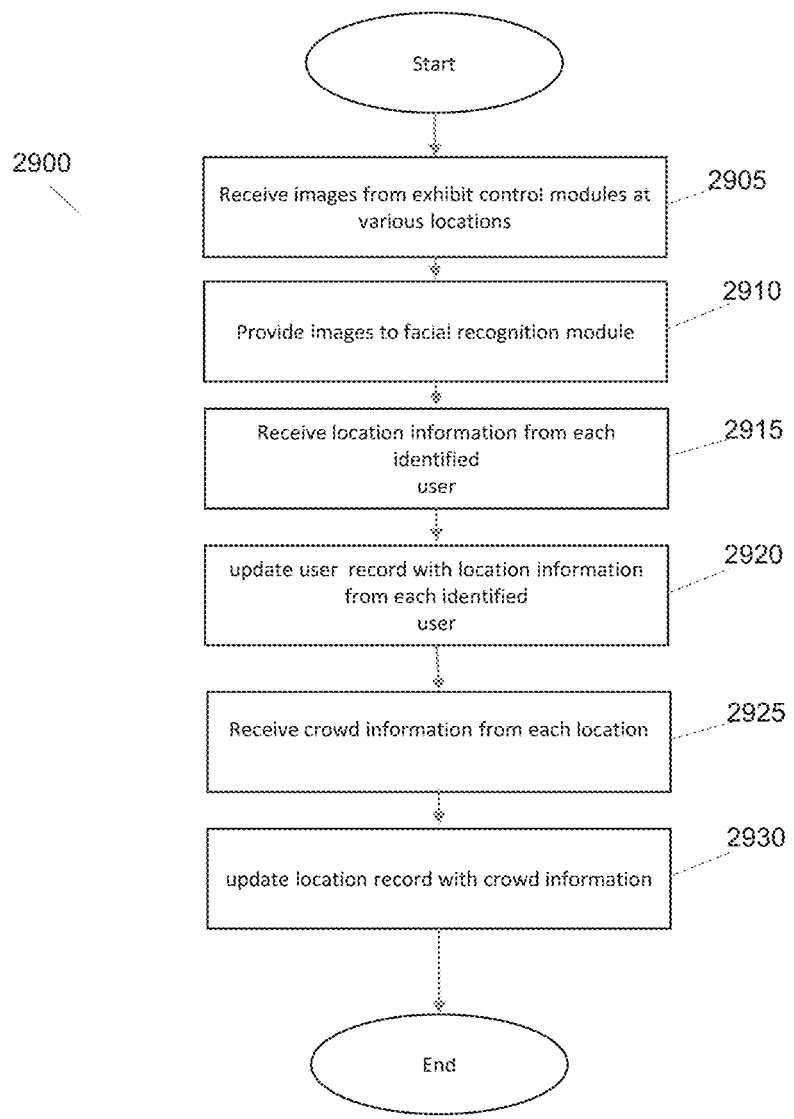
FIG. 29 is a flow diagram of a process performed a central control system to maintain and provide location information for registered users and crowd information for locations including exhibits in accordance with an aspect of this invention.

FIG. 29 illustrates a flow diagram of an exemplary process performed by the central control device or module (e.g. 2104, FIG. 21) to obtain and store location information for registered users; and/or obtain and store crowd information for exhibits and/or locations, based upon captured images from various locations throughout a venue. A process 2900 may be performed for some or all of the images received. Thus, the process 2900 may be performed once to determine the current locations of registered users, or, alternatively, the process 2900 may be periodically performed on images from all of the locations to constantly update the location information for the registered users.

In the process 2900, captured images of various locations in the venue are received from an exhibit control device or module (e.g., 2108, FIG. 21) (2905). As discussed above, additional image information may optionally be received with the image. The images are then provided to a facial recognition device or module (e.g. 2102, FIG. 21) for image analysis. The central control device or module may perform some image processing prior to providing the images to the facial recognition device or module. The analysis may include, for example, isolating facial images in each of the images, modifying the images to improve image quality, and/or analyzing the images to determine or obtain additional or other image information. In some embodiments, such other image information may be provided by the captured image to the facial recognition system. The received images from the various locations are provided to the facial recognition module or system. As will explained in more detail below, the facial recognition system identifies users in each image and associates a location of the image with each identified user to provide location information for each of the identified registered users. Furthermore, the location information may include a time stamp indicated the time at which the image of a registered user is detected at a location.

The process 2900 receives location information and identifiers for the registered users identified in the captured images (2915). The central control system (e.g. 2104, FIG. 21) updates the location information in the record of each identified registered user based on the received location information (2920).

The process 2900 may also receive crowd information (see FIG. 34) for each location/exhibit from the facial recognition system (2925) and update the crowd information in the location record maintained for each location (2930). Locations may be defined as places within an image, but a table or database may be used to cross-reference locations (e.g. x and y location) within an image against identifiers of a location (e.g. an entity in position 4,5 is in seat 4B but an entity in position 2,3 is in seat 3A) Process 2900 may then end.

Although an exemplary process performed by the central control device or module to obtain and maintain location information for registered users and/or crowd information for locations in accordance with aspects of this disclosure is discussed above with respect to FIG. 29, other processes performed by the central control device or module to provide the media content that add to, combine, rearrange, or remove any of the described steps are possible and are considered within the scope of this disclosure.

Figure 30:
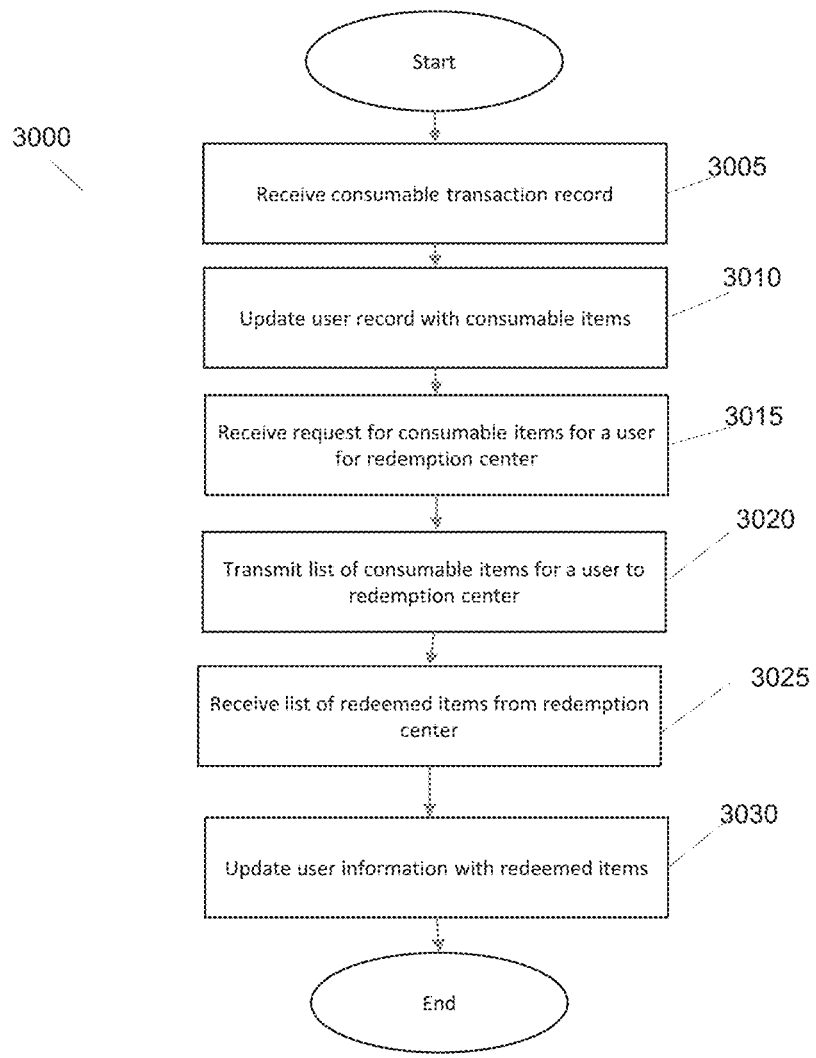
FIG. 30 is a flow diagram of a process performed a central control system to maintain and provide identifications of consumable products available to registered users in accordance with an aspect of this invention.

FIG. 30 illustrates a flow diagram of an exemplary process performed by a central control module or system (e.g. 2104, FIG. 21) to maintain a list of consumable products obtained by a registered user. The process 3000 begins with the central control module or system receiving a consumable transaction record from an exhibit control system of module (2108, 2112, FIG. 21) (3005). The transaction record includes an identifier of the consumable product and an identifier of the registered user entitled to the product. In some instances, the transaction record may include other information such a transaction information may show a purchase prices and/or payment, an expiration date/time, or other information related to the product. Any suitable user interface could be used to save the transaction record, such as a transaction device that saves metadata related to a transaction to a database accessible by the system when the transaction occurs.

The consumable products information in the record of the identified registered user is updated to include the consumable product (3010). At a later time, the central control system may receive a request for the list of consumable products that have been obtained by the registered user from a redemption center system (not shown) (3015). The redemption center system may include one or more computing devices for enabling the process blocks described herein with respect FIG. 30 or otherwise. In some embodiments, a user having the authorization to obtain products for one or more other users (such as the children of the user or other group members) may obtain the list of consumable products available to each user for which the registered user has authorization to obtain their products. The central control system transmits the list of consumable products from the user record of the registered user to the redemption center system in response to the request (3020). The redemption center system then provides the listed consumable products to the user. The redemption center system then adds each consumable product received by the registered user to a redeemed items list and transmits the list to the central control system (3025). The central control system then updates the consumable products list in the user record of the registered user to reflect the products redeemed (3030) and the process 3000 may end.

Although an exemplary process performed by the central control device or module to maintain consumable product information for registered users in accordance with aspects of this disclosure is discussed above with respect to FIG. 30, other processes performed by the central control device or module to provide the media content that add to, combine, rearrange, or remove any of the described steps are possible and are considered within the scope of this disclosure.

In accordance with some aspects of this invention, the central control system, device, or module stores images from photo opportunity areas and associates the images with registered users. The central control system, device, or module then may provide the images to a redemption device for selection, deletion, and/or purchase of the images by the registered user, for example by configuring a database to return an image as a function of an identifier of a person (e.g. a bar code, a person's name).

Figure 31:
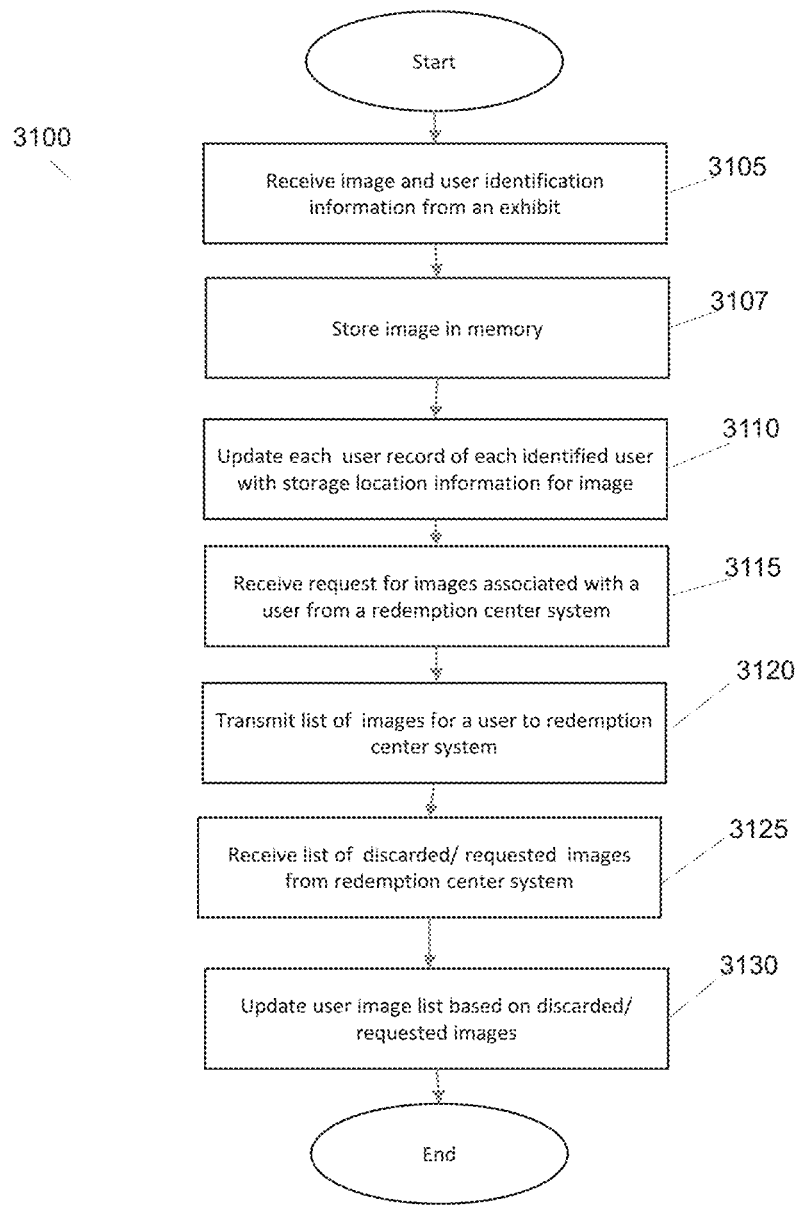
FIG. 31 is a flow diagram of a process performed by a central control system to obtain and maintain captured images for photo opportunity areas associated with registered users in accordance with an embodiment of the invention.

FIG. 31 illustrates another exemplary process performed by an inventive central control system, device, or module (e.g. 2104, FIG. 21) for storing the images, associating with registered users, and providing the images to a redemption device in accordance with an aspect of this disclosure. In process 3100, an image and identifiers associated with registered users in the image are received from an exhibit/location system, module, or device (3105). The image is then stored at a memory location accessible to a processor (3107). In accordance with some embodiments, the image is stored in an image database, data structure using structured or unstructured objects or library maintained by central control system, device, or module as described below with respect to FIG. 33. The user record of each registered user identified in the image is then updated to indicate storage information for the image to associate the image with the registered user (3110).

At a later time, the central control system may receive a request for the list of images that have been associated with a registered user from a redemption device (3115). In some embodiments, a user having the authorization to obtain/view images associated with one or more other users (such as the children of the user or other group members) may obtain the list of images associated each user for which the registered user has authorization to view/obtain their images. The central control system transmits the list of images from the user record(s) of the registered user(s) to the redemption device in response to the request (3120). The redemption device then provides the listed images to the requesting user. This may include the redemption device downloading the images from the image database and/or requesting the images from the central control system. The redemption device then adds each image received, purchased, or uploaded by the registered user to a saved image list and transmits the saved list to the central control system; and/or adds each deleted/discarded image to a discarded image list. The saved image list and/or discarded image list are received by the central control system (3125). The central control system may then update the associated images in the user record of the registered user and/or images stored in memory to reflect each of the received lists (3130) and the process 3100 may end.

Although an exemplary process performed by the central control device or module to store and provide images from photo opportunity areas for registered users in accordance with aspects of this disclosure is discussed above with respect to FIG. 31, other processes performed by the central control device or module to provide the media content that add to, combine, rearrange, or remove any of the described steps are possible and are considered within the scope of this disclosure.

Figure 32:
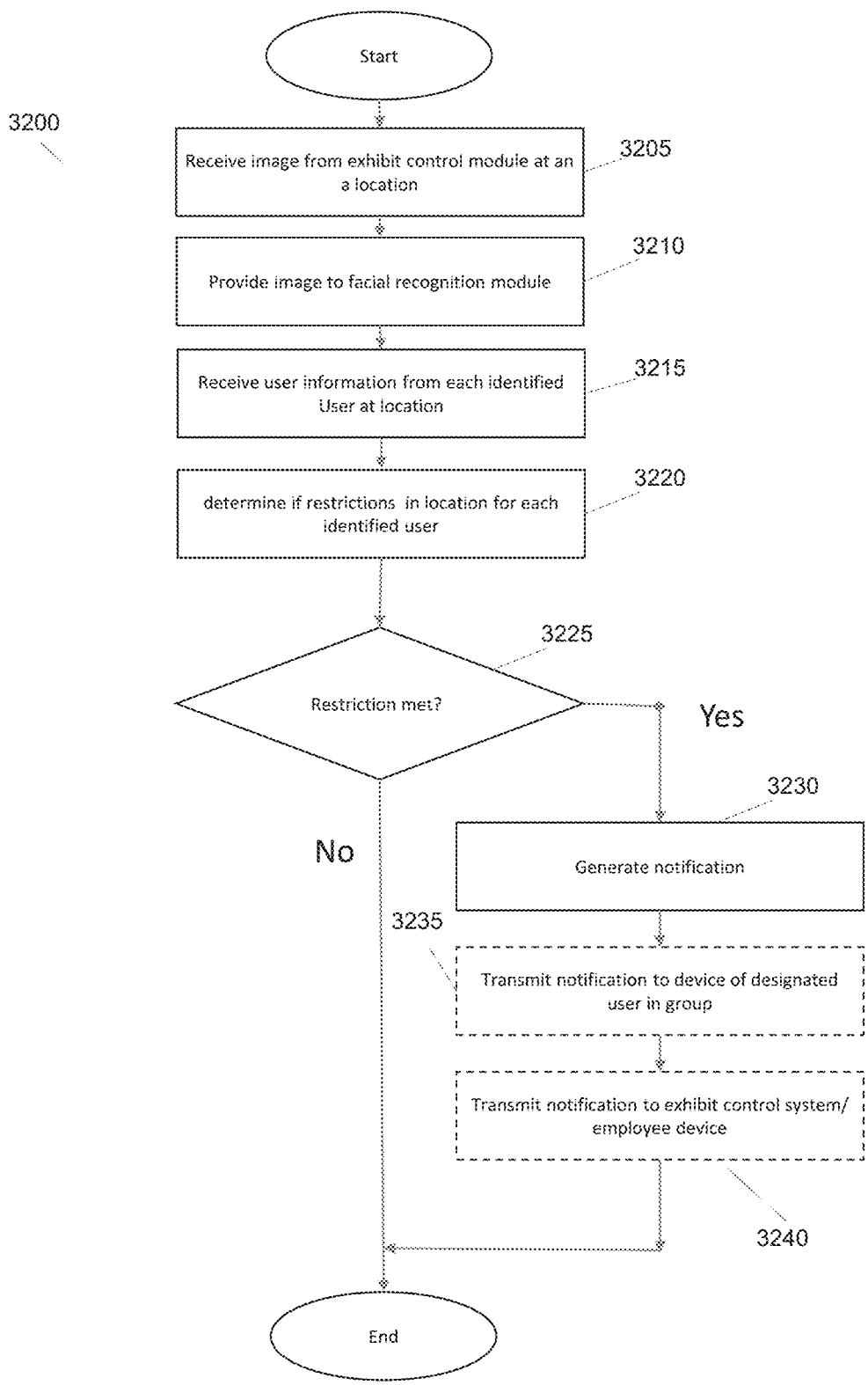
FIG. 32 is a flow diagram of a process performed by the central control system to determine whether registered users meet required criteria for an area in the venue in accordance with an aspect of the disclosure.

A registered user may have certain restrictions regarding the exhibits or locations that the user may visit. For example, some parents may not want their children to view and/or ride certain exhibits as the material in the exhibit or ride may not be age appropriate for their children. Also, the venue may want to assure children exit the venue with the appropriate guardian such as a teacher or parent or that the parent or other adult does not leave a minor unattended in all or a portion of the venue. Thus, systems and processes in accordance with some of these aspects of the invention may want to monitor the location of a registered users and determine whether any restrictions and/or access privileges are met when a registered user is determined to be at a certain exhibit and/or other location. FIG. 32 illustrates of a process performed by the central control system to monitor an area in accordance with an aspect of this disclosure to determine whether a register user is permitted in the area based on restrictions and/or access privileges.

Process 3200, shown in FIG. 32, receives an image captured from an exhibit control module or system (e.g. 2108, 2112, FIG. 21) associated with a particular exhibit or location (3205). The image is provided by the central control system or module (e.g. 2104, FIG. 21) to a facial recognition system or module (e.g. 2102, FIG. 21) (3210). The central control system receives location information for each user identified in the image (3215). The central control system or module then determines whether the each of the identified users has any restrictions and/or access privileges for the particular exhibit and/or location (3220). For example, a parent may be restricted from leaving without a minor and/or a minor may be restricted from leaving without an authorized adult. In a second example, an exhibit may be popular and users are restricted to access the exhibit at a certain time. In some cases, the user may have an access privileges, such as a right to enter a premium exhibit and/or ride. If there are restrictions and/or access privileges for identified registered user for the particular exhibit location, a check is made to determine the restrictions/access privileges are met (3225). As a second example, the central control system may determine if an authorized adult is with an identified minor and/or if a parent is with their minor at an exit or at an exhibit with material that may not be age appropriate for the minor. If the restrictions/access privileges are met, process 3200 may end. If the restrictions/access privileges are not met, a notification identifying the restriction or privilege is generated (3030). In some aspects, this may cause a warning such as an alarm, buzzer, or some other device to be activated to notify venue personnel of the restriction/access. In some aspects, the notification is sent to a device of the user and/or a designated party in the group and/or subgroup of the registered user (3235). In some other aspects, the notification is transmitted to one or more devices of venue personnel at the exhibit/location to allow the personnel to handle the situation. Process 3200 may then end.

Although an exemplary process performed by the central control device or module to monitor restrictions and/or privileges at an exhibit/location in accordance with aspects of this disclosure is discussed above with respect to FIG. 32, other processes performed by the central control device or module to provide the media content that add to, combine, rearrange, or remove any of the described steps are possible and are considered within the scope of this disclosure.

Figure 33:
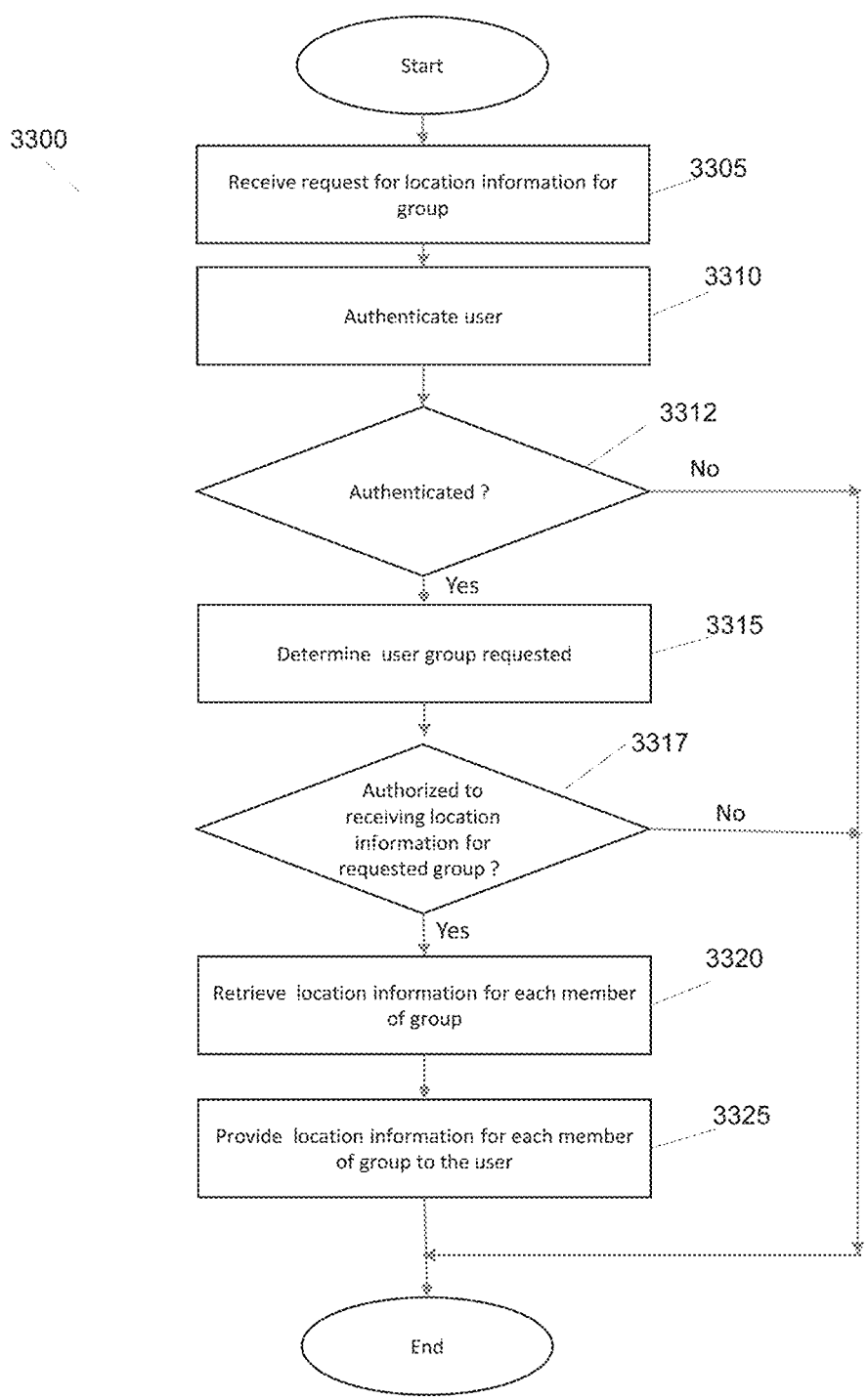
FIG. 33 is a flow diagram of a process performed by the central control system to provide location information of registered users in a group to a group member in accordance with an aspect of the disclosure.

In accordance with some aspects of this disclosure, the central control system may provide information about the locations of registered users in a group to other registered users in the group. Furthermore, users in groups may be further divided into subgroups with only certain group member having access privileges for location information for the groups and/or particular subgroups. The location information for members in a group/subgroup may be conveyed to an application being executed on a personal device of a registered user or a device at a kiosk in the venue that has a computer system for providing the location information. FIG. 33 illustrates a flow diagram of a process performed by the central control system or module (e.g. 2104, FIG. 21) to provide location information of a group of registered users in accordance with an aspect of the disclosure.

In process 3300, a request for location information for registered users associated with a specific group is received (3305). The user requesting the information is authenticated (3310). Authentication may be performed using a password, biometric readings, or in some other manner. If the authentication fails (3312), process 3300 ends and location information is not provided. If the requesting user is authenticated, The registered users in the requested group/subgroup are then determined (3315), the determination may be a list of members maintained for each registered group and may be performed by reading the group and/or subgroup field in the registered user record of each user in the group maintained by the central control system or module. A determination is made whether the requesting user is authorized to obtain the location information (3317). This may be performed by reading the access permissions stored in the registered user record of the requesting user. In other embodiments, the permission may be stored in a group data record maintained by the central control system, device, or module for the requested group and/or subgroup. If the requesting user does not have authorization to receive the information, the process 3300 ends. If the requesting user is authorized, the central control system, device or module retrieves the location information for each registered user in the group and/or subgroup from the user records maintained by the central control system, device, or module (3320). In some embodiments, the location information for each registered user only includes information about the last determined location of the user. In accordance with some other embodiments, the location information may include information about 2 or more last locations where the registered user was detected. In still some other embodiments, the entire history of locations of each registered user in the group is provided. In some further aspects, directions to get to the current location of a particular user or group of users may be provided. The location information for each of the registered users in the group is provided to the requesting device (3325) and process 3300 may end.

Although an exemplary process performed by the central control device or provide location information for a user or group of users in accordance with aspects of this disclosure is discussed above with respect to FIG. 33, other processes performed by the central control device or module to provide the media content that add to, combine, rearrange, or remove any of the described steps are possible and are considered within the scope of this disclosure.

Figure 34:
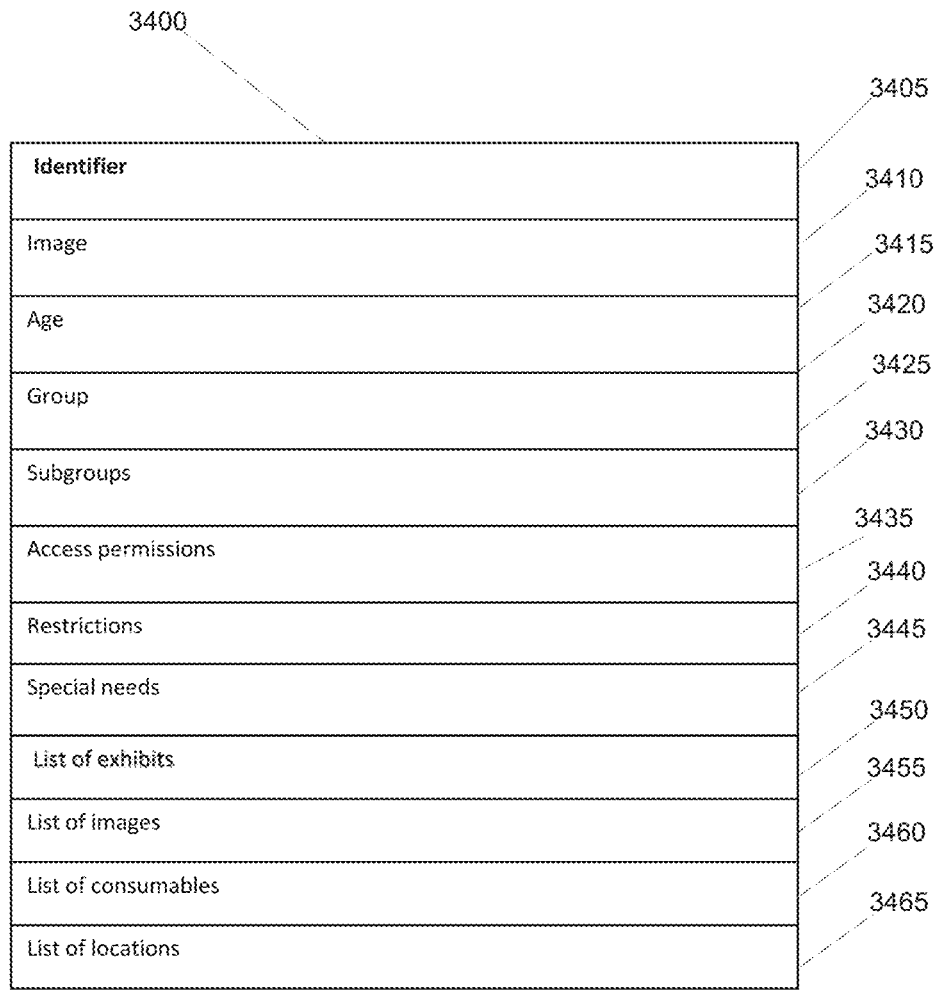
FIG. 34 is a conceptual diagram of a data record for a registered user stored by the central control system in accordance with an aspect of the disclosure.

FIG. 34 illustrates an example of a registered user record maintained by the central control device or module in accordance with an aspect of this disclosure. The register record 3400 advantageously includes an identifier 3405, such as a name or member number for the registered user. The record 3400 also includes a facial image 3410 of the registered user, either provided to the central control device or module, or captured from the registered user during a registration process. The record 3400 also includes a group field 3425 that identifies a group that is associated with the registered user. In addition, one or more subgroup fields 3430 may be provided. Alternatively, the subgroup field may be a pointer to or a linked list that includes all of the subgroups to which the user belongs.

Record 3400 may also include access permission field 3435 and restrictions field 3440. An access permission field or data structure 3435 stores codes indicating all of the access privileges of the user. The access privileges may indicate the exhibits to which the user has access, the rights to access location information of other users or groups, and/or quality of service indicators such as Very Important Person (VIP) privileges that the user may have in the venue. Restrictions field or data structure 3440 is a list, pointer to a list, or other data structures that includes all of the restrictions that apply to a user. The restrictions may include, but are not limited to, restrictions on exiting the venue, restrictions on access or access time to an exhibit, prohibited areas of the venue and the like.

Other fields for particular information about the registered user may be saved in a database. For example, the fields in the record 3400 may advantageously include a field for the user's age 3415, a link to a list of user locations 3465, a link to a list of consumable products 3460, list of images associated with the user 3455, list of desired exhibits to visit 3450 and any special needs of the registered user 3445. The list of special needs may include a list of requirements such as language, subtitles, special access and the like that user may require during a visit to exhibits in the venue. In some embodiments, the fields could be inputted by an admin user, while in other embodiments the user could input one or more fields in a user interface kiosk at the venue.

Although an example of a registered user data record is described above with reference to FIG. 34, other suitable data records that add, remove, and/or combine fields could be utilized.

Figure 35:
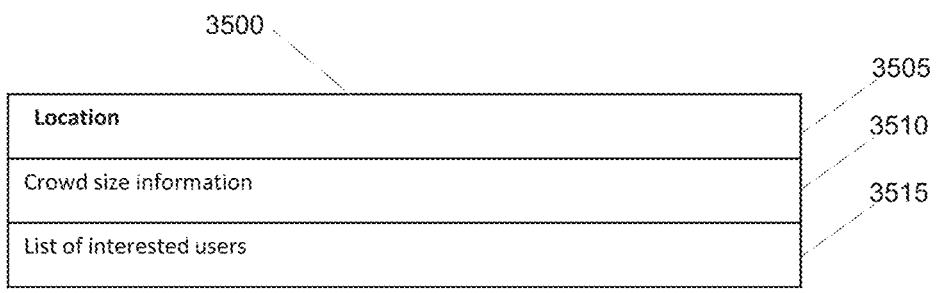
FIG. 35 is a conceptual diagram of a data record for a location in the venue stored by the central control system in accordance with an aspect of the disclosure.

In accordance with some aspects of the disclosure the central control system, device, or module may also or alternatively provide crowd information for particular exhibits and/or other areas of a venue. For example, the system may indicate to a registered user when a desired exhibit is either crowded with long wait time or not crowded with short wait times. In some embodiments, the system may even suggest an ordering of the exhibits and/or areas to visit to ensure that a registered user can visit all of the exhibits and/or areas desired by the user in an amount of time allocated by the user. To do so, the central control system (2104, FIG. 21) may maintain a location database that stores crowd information for each location and/or exhibit in the venue. A location record in accordance with an aspect of the disclosure is shown in FIG. 35.

Location record 3500 includes a location identifier field 3505, crowd information field 3510, and interested user field 3515. The location identifier field 3505 is a field that stores a name or some other alpha numeric identifier of the location/exhibit. The crowd information field 3510 is a lost or pointer to a list that stores, among other pieces of information, the size of the crowd at certain times as determined from the captured images of the location/exhibit. The interested user field 3515 is a list, pointer to list or some other data structures that stores identifiers of registered users interested in visiting the particular location/exhibit.

Although a location record maintained for a location/exhibit by the central control system in accordance with an aspect of the disclosure is discussed above with reference to FIG. 35, location records that add, remove, or combine fields are considered part of this disclosure.

Figure 36:
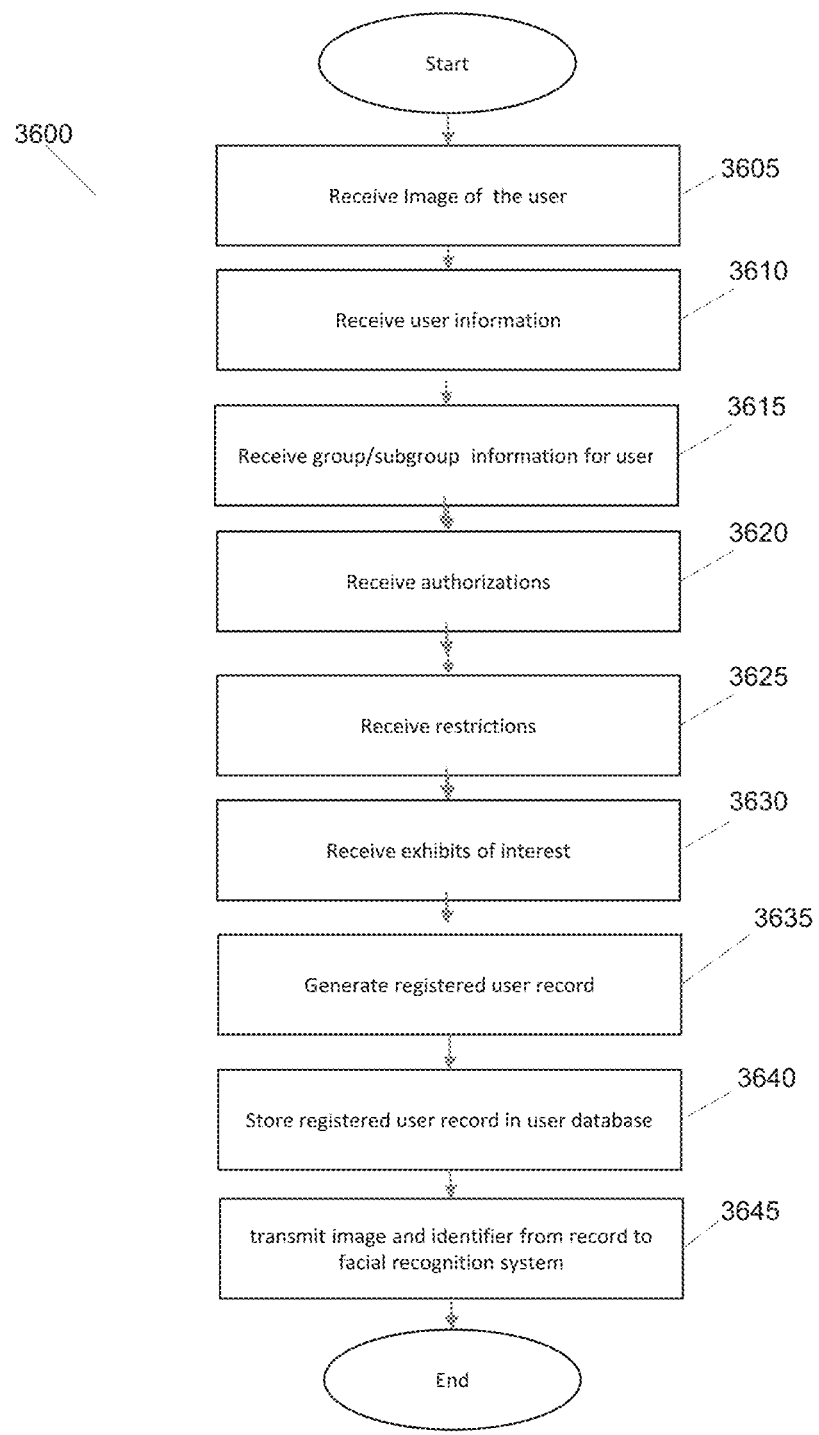
FIG. 36 is a flow diagram of a process performed by a central control system to obtain user information and generate a registered user record in accordance with an aspect of this disclosure.

FIG. 36 illustrates a flow diagram of an exemplary registration process performed by a central control system or the central control system, device, or module (e.g. 2104, FIG. 21) in accordance with an aspect of this disclosure. In the registration process 3600, a facial image of the user that is registering with the system is received (3605). For example, the user may provide a facial image stored on the user device that the user is using to register. In that situation, the process 3600 may issue a command (for example, by a wireless communication) that directs the user device to capture the facial image using an image capture device associated with the user device, and to provide the image to process 3600. The process 3600 may also receive user information for the user (3610). The personal information may include, but is not limited to, age, address, e-mail address, home telephone number, cellular telephone number, language, disabilities, and another special needs. In accordance with some aspects, the registering user may input the information to a personal device that provides the information to the process 3600. The process 3600 may also receive group information and subgroup information (3615) where the subgroup is a set of one or more users from the group.

The process 3600 may also receive any authorizations for the user (3620). Authorizations may include access to location information for users in a particular group and/or subgroup as well as authorization to collect and/or receive consumable items for one or more other users and access to images of one or more other users (3625). The process 3600 may also receive restrictions for the users. As discussed above, restrictions may include restrictions prohibiting attending particular exhibits and/or areas of the venue as well as restrictions for exiting the venue. The process 3600 may also receive a list of one or more exhibits of interest of the user (3630) for use in providing guidance to the user in attending the exhibits of interest. Further any other information that may include at least a portion of the information discussed above with reference to FIG. 14 may also be received by process 3600. However, the information may also include any information that may be desired.

A registered user record that includes the received user member information discussed above and the captured facial image is generated (3635) and stored in a user database (3640). The captured facial image and an identifier of the registered user is provided to the facial recognition device or model (3645), and the process 3600 may then end.

An exemplary process for registering a user in accordance with embodiments of the disclosure is described above with respect to FIG. 36. Other registration processes that add, combine, rearrange, and/or remove one or more steps described above are possible in accordance with other embodiments.

In accordance with some aspects of the disclosure, the systems and process may provide information relating to exhibits to registered users to guide the users through the venue to maximize the users enjoyment by ensure that all of the exhibits desired by the user may be visited. This may include providing a schedule or map to the user to guide the user to the venue and/or updating the schedule and/or map based on observed crowd conditions throughout the venue. In accordance with some embodiments, the system may only provide information regarding crowd information regarding particular exhibits to aid the user in determining which exhibits to visit next.

Figure 37:
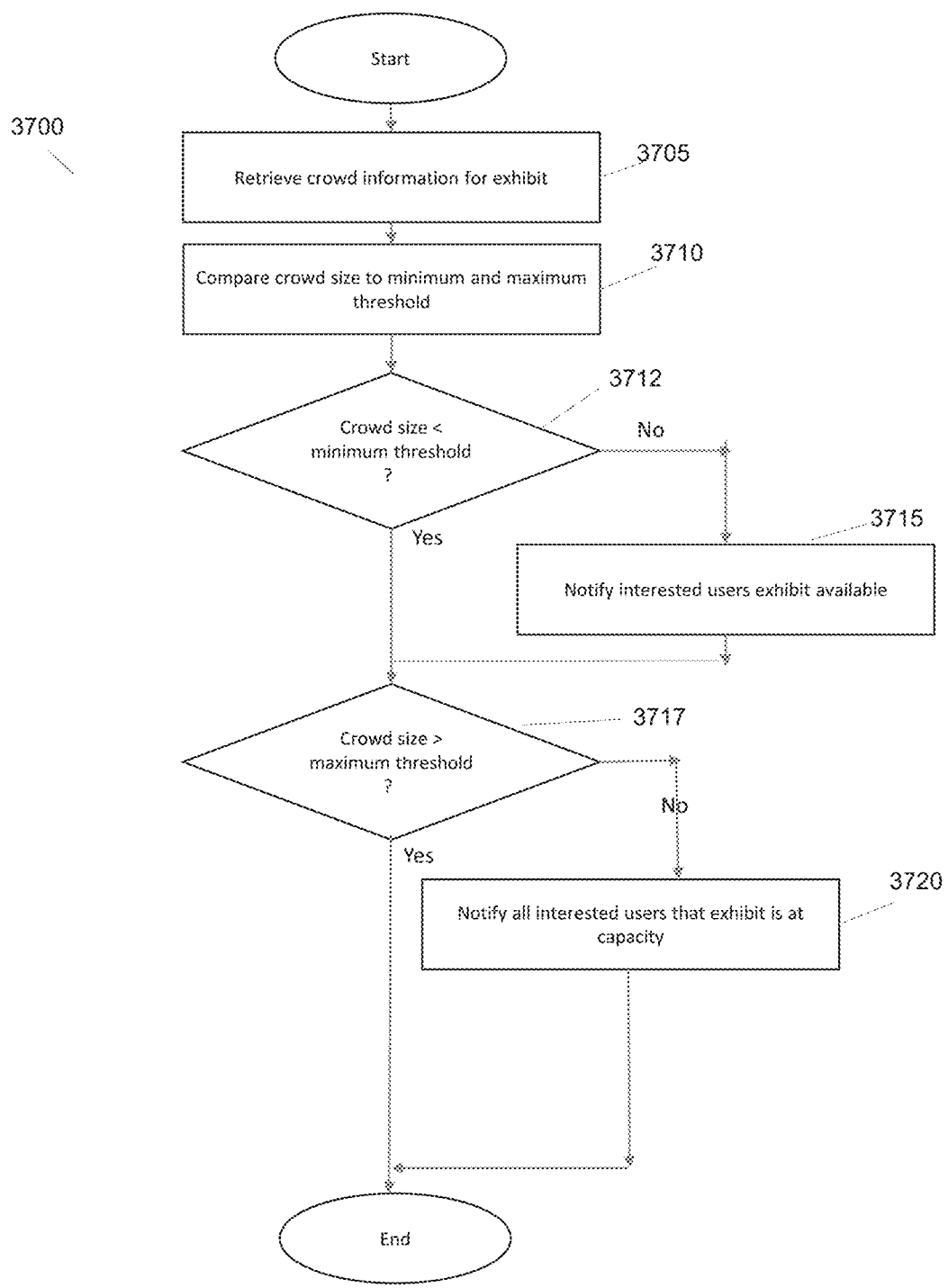
FIG. 37 is a flow diagram of a process performed by a central control system to provide crowd information to registered users in accordance with an aspect of the disclosure.

FIG. 37 shows an exemplary process performed by a central control system, device, or module (e.g. 2104, FIG. 21) for informing registered users about crowd conditions at an exhibit and/or location in a venue. A process 3700 retrieves crowd information for a particular exhibit and/or location from a location record for the particular exhibit and/or location (3705). The crowd information may be a crowd size determined from a captured image of an area near and/or in the exhibit and/or the location that was stored in the location record, as described above with respect to FIG. 34. The crowd information is compared to pre-determined minimum and maximum crowd thresholds (3710). The threshold values indicate a crowd size.

If the crowd size is less than a minimum threshold (3712), the process 1300 determines a set of the registered users interested in the exhibit and/or location and notifies the each of the registered users in the set (3715). In accordance in some embodiments, a list of interested users is maintained by the system and a predetermined number from the top of the list are notified. The registered users on the list may be removed after it is determined that the user has visited the location, for example, by using the processes described above. In some other embodiments, all of the users on list may be notified and a user is removed from list after it is determined that the user has visited the location, for example, by using the processes described above. If the crowd size is greater than or equal to a maximum threshold (3737), the interested users are notified that the exhibit and/or location is at or beyond capacity. In accordance with various aspects of this disclosure, the notifications may be sent to a hand held device via a message such as, for example, an SMS message or an e-mail message. Process 3700 then ends.

An exemplary process for notifying registered users of crowd conditions at an exhibit and/or location in accordance with embodiments of the disclosure is described above with respect to FIG. 37. Other notification processes that add, combine, rearrange, and/or remove one or more steps described above are possible in accordance with other embodiments.

Figure 38:
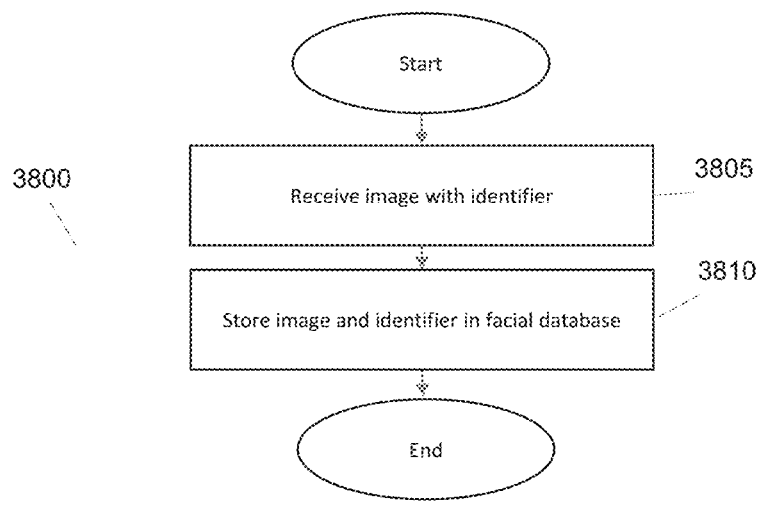
FIG. 38 is a flow diagram of a process performed by a facial recognition system to store data records of images of registered users in accordance with an aspect of the disclosure.

FIG. 38 illustrates an exemplary process performed by a facial recognition device or module (e.g. 2102, FIG. 21) in response to receiving a facial image and identifier of a registered user in accordance with embodiments of this disclosure. In the process 3800, the facial recognition device or module receives a facial image and identifier of a registered user from a central control system or central control device or module (3805). A facial recognition record is generated and stored (3810). The generation of the facial recognition record may include, for example, performing analysis of the image to generate facial parameters that may be used for image comparisons during the facial recognition process, as discussed further below.

An exemplary process for obtaining facial images of registered users in a facial recognition system accordance with embodiments of the disclosure is described above with respect to FIG. 38. Other processes for obtaining facial images that add, combine, rearrange, and/or omit one or more steps described above are possible in accordance with other embodiments.

Figure 39:
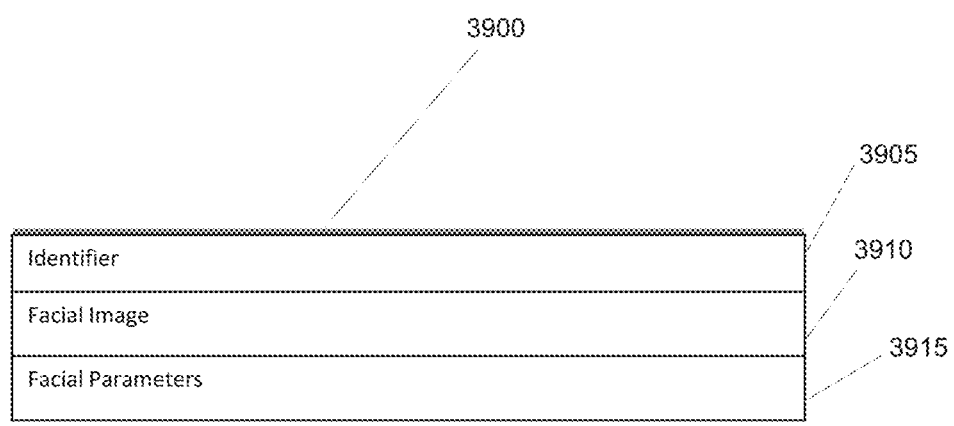
FIG. 39 is a conceptual drawing of a facial image record maintained by facial recognition system in accordance with an aspect of the disclosure.

FIG. 39 is a conceptual data structure for a facial recognition record in accordance with an aspect of the disclosure. A facial recognition record 3900 includes an identifier of the registered user 3905, the received facial image 3910, and the facial parameters for facial recognition comparisons 3915. The identifier may be, for example, a name and/or nickname of the registered user, or the identifier may be a number or alphanumeric string that associates the image to a specific registered user record stored by the central control device or module.

Although an exemplary facial recognition record in accordance with embodiments of the disclosure is described above with reference to FIG. 39, other facial recognition records that add, combine, rearrange, and/or omit information are possible in accordance with other embodiments.

Figure 40:
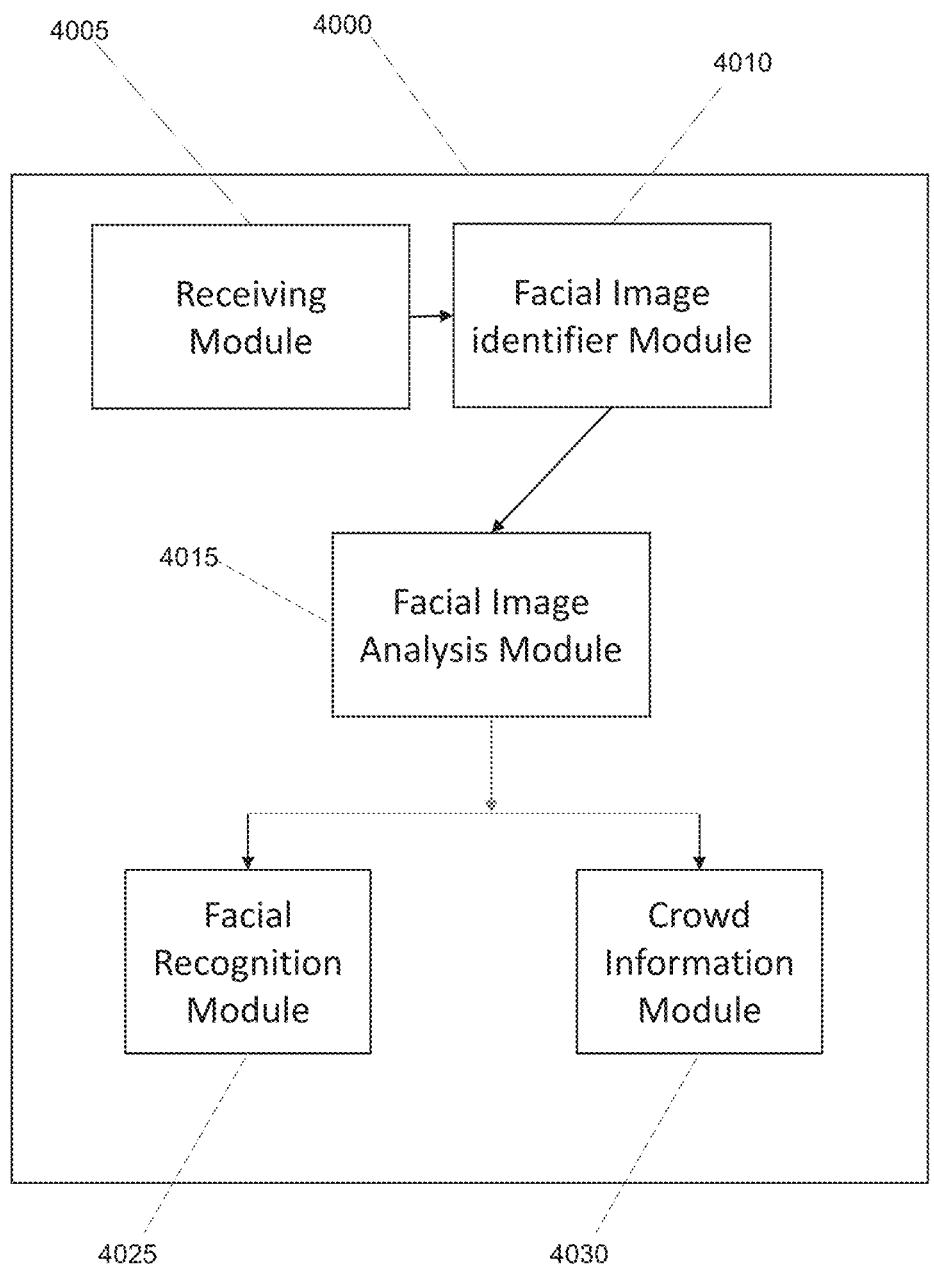
FIG. 40 is a conceptual diagram of the modules of software for performing facial recognition analysis on a captured image of a location in accordance with an aspect of the disclosure.

The software and/or hardware modules that perform a facial recognition process in accordance with embodiments of the disclosure are shown in FIG. 40. The facial recognition system 4000 includes a receiving module 4005, a facial image identifier module 4010, a facial image analysis module 4015, a facial recognition module 4025, and a crowd information module 4030.

The receiving module 4005 receives a captured image and processes the captured image to conform the image to the parameters needed to perform the various subsequent processes for facial recognition analysis. In accordance with some aspects, the image processing may include, for example, focus adjustments, color adjustments, edge defining, and other image adjustments needed to conform the image to the requirements of the subsequent modules. In accordance with some aspects, the receiving module also receives image information such as, for example, depth information, camera information, and lighting information. The receiving module 3605 uses the image information in the image processing to conform the image to the required standards.

The processed image is provided to the facial image identifier module 4010, which identifies the portions of the image that include a facial image. The identification may use edge detection and other various search processes to identify those portions of the image that include an image of a face to which facial recognition may be applied. In accordance with some aspects, the facial image identifier may also perform some image processing to conform the portions including a facial image to the requirements of an analysis module.

The facial image analysis module 4015 receives the portions of the image that include a facial image and performs analysis on each portion of the image to generate the data needed by the other modules to generate the information required. For example, the image analysis module may generate pixel color and vector data needed to perform edge detection, color detection, and the like needed to perform the various subsequent processes. In accordance with some aspects, the facial image analysis module 4015 also receives the image information and/or a complete image for use in performing the analysis. The information generated by the facial image analysis module 4015 is provided to the facial recognition module 4025 and crowd information module 4030.

The facial recognition module 4025 receives the information for each facial image and compares the information of each facial image to the information for the facial images in each facial recognition record to determine a match and returns the identifier of each record that matches one of the facial images from the captured image to a predefined degree of confidence. To facilitate the comparison, the records may include facial image data that is precomputed to provide quicker comparisons by eliminating the need to analyze each reference image.

In accordance with some aspects, crowd information module 4030, receives the image information and determines the number of visitors (whether identified as a registered user or not) that are detected in the image. The crowd information module then uses the determined number of visitors to determine an estimate of the crowd size at the exhibit and/or location.

Although the above description describes modules of a facial recognition system in accordance with an exemplary embodiment of the disclosure, other facial recognition modules that that add, combine, rearrange, and/or omit modules are possible in accordance with other embodiments.

Figure 41:
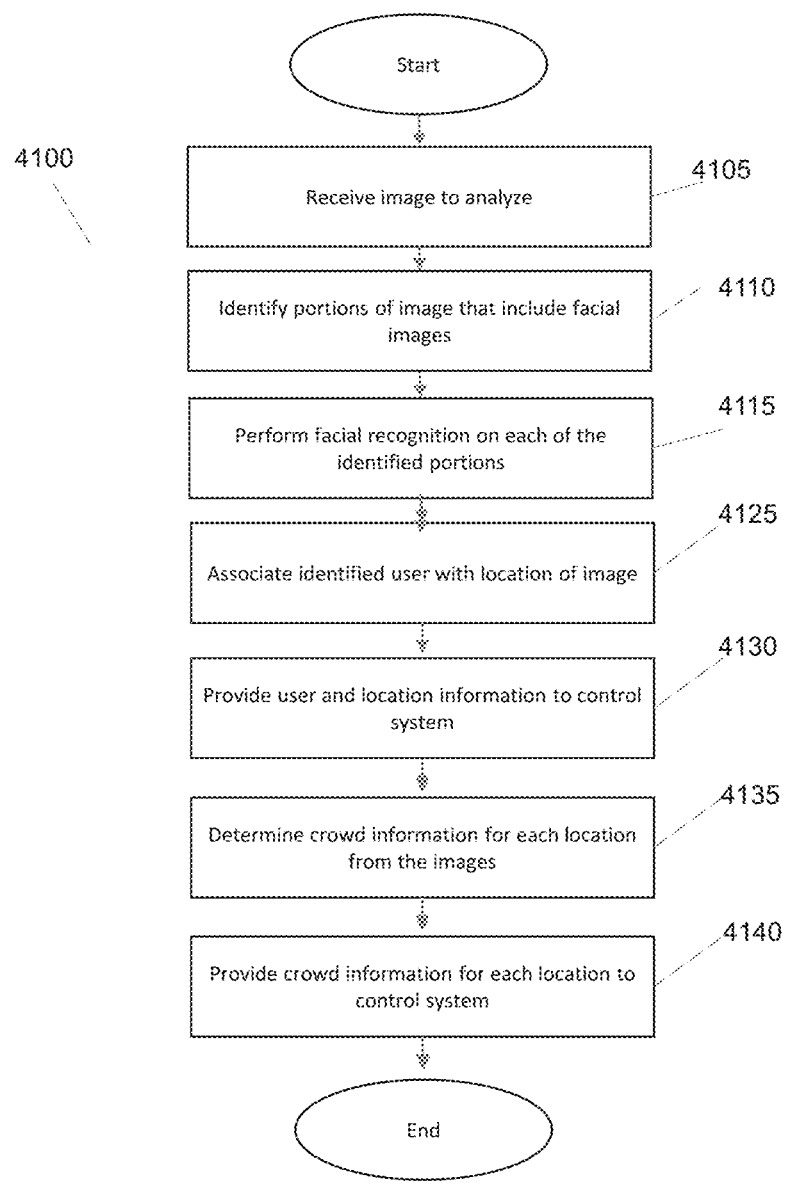
FIG. 41 is a flow diagram of a process performed by a facial recognition system to generate location information from a captured image of an area location in accordance with an aspect of the disclosure.

FIG. 41 illustrates a flow diagram of a process performed by the facial recognition system 4000 to perform facial recognition in a captured image of an area in accordance with an aspect of the disclosure. In the process 4100, an image of a known location is received (4105). As discussed above, the received image may be processed to conform the image to the requirements of the process 4100.

Portions of the received (and optionally processed) image that include a facial image are identified (4110). As discussed above, each portion may be further processed to conform the facial image to the requirements of the facial recognition process. A facial recognition comparison to the facial images stored in the facial recognition record is performed to identify the records that match the facial images (4115).

The location shown in the image is associated with each identified registered user (4125). The user and location information is then provided to the central control system (4130). Crowd information for each exhibit and/or location associated with each image is determined (4135) and the crowd information for each location is provided to the central control system, device, or module. Process 4100 may then end.

An exemplary process for determining user location information and crowd information for exhibits and/or location in a facial recognition system accordance with embodiments of the disclosure is described above with respect to FIG. 41. Other processes that add, combine, rearrange, and/or omit one or more steps described above are possible in accordance with other embodiments Many other variations of the above could be derived using the disclosed computer infrastructure and functionality to dynamically deliver media content. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

Below are additional points that could be embodied using the inventive systems and methods disclosed.

A first point being a system for providing media content, comprising: a first image capture device that captures a first set of captured images, wherein the first set of captured images comprise a first set of image fingerprints; a media content playback device; an image database that correlates image fingerprints with identifiers; a relationship database that correlates identifiers with one another; an attribute database that correlates identifiers with attributes; a media database that correlates attributes with media content; and a media content computer system programmed to: generate a first set of identifiers as a function of the first set of image fingerprints using the image database, generate a second set of identifiers as a function of the first set of identifiers using the relationship database, generate a derived set of attributes as a function of the second set of identifiers using the attribute database, generate a set of media content as a function of the derived set of attributes using the media database; and play at least a portion of the set of media content on the media content playback device.

A second point being a system of the first point, wherein the derived set of attributes are generated as a function of both the first set of identifiers and the second set of identifiers.

A third point being a system of the first point, wherein the first set of identifiers comprise a license plate number and wherein the second set of identifiers comprise a facial fingerprint.

A fourth point being a system of the third point, wherein the second set of identifiers comprises both a person and a position within a car associated with the license plate number.

A fifth point being a system of the first point, further comprising a second image capture device that captures a second set of captured images, wherein the second set of captured images comprise a second set of image fingerprints, and wherein the media content computer system is further programmed to: generate a correlation set of identifiers as a function of the second set of image fingerprints using the image database, generate a set of relationships using the correlation set of identifiers, and saving the set of relationships in the relationship database.

A sixth point being a system of the fifth point, wherein the second set of image fingerprints comprise both a license plate number and a facial fingerprint.

A seventh point being a system of the first point, further comprising: a transactional capture device that captures a set of transaction attributes and a captured transaction identifier, wherein the media content computer system is further programmed to: recognize a transaction in the first set of captured images; generate a generated transaction identifier as a function of the recognized transaction; transmit the generated transaction identifier to the transactional capture device; receive the set of transaction attributes from the transactional capture device; and save the set of transaction attributes to the attribute database.

An eighth point being a system of the seventh point, wherein the generated transaction identifier and the captured transaction identifier both comprise a timestamp value, and wherein the transactional capture device matches the generated transaction identifier with the captured transaction identifier before transmitting the set of transaction attributes to the media content computer system.

A ninth point being a system of the seventh point, wherein the media content computer system recognizes a transaction in the first set of captured images by identifying a movement among a plurality of the first set of captured images.

A tenth point being a system of the seventh point, wherein the derived set of attributes comprises at least a portion of the set of transaction attributes.

An eleventh point being a system of the first point, wherein the media content computer system is further programmed to transmit at least a portion of the derived set of attributes to a service computer system.

A twelfth point being a method for generating targeted media content, comprising: capturing a first set of images using a first image capture device; identifying a first set of captured image fingerprints within the first set of images; deriving a first set of identifiers as a function of the identified first set of captured image fingerprints using an image database; deriving a second set of identifiers as a function of the first set of identifiers using a relationship database; deriving a first set of attributes as a function of the second set of identifiers using an attribute database; deriving a set of media content as a function of the first set of attributes using a media database; and playing a portion of the set of media content on a media content playback device.

A thirteenth point being a method of the twelfth point, wherein identifying the first set of captured image fingerprints comprises identifying a license plate number within the first set of images, wherein deriving the first set of identifiers comprises deriving an identifier of a car as a function of the license plate number using the image database, and wherein deriving the second set of identifiers comprises deriving a set of occupants of the car from the identifier of the car using the relationship database.

A fourteenth point being a method of the thirteenth point, further comprising: capturing a second set of images using a second image capture device; identifying a second set of captured image fingerprints within the second set of images, wherein identifying the second set of captured image fingerprints comprises identifying the license plate number within the second set of images and identifying a set of facial fingerprints within the second set of images; deriving a set of occupant identifiers as a function of the identified set of facial fingerprints using the image database; deriving the identifier of the car as a function of the license plate number using the image database; and adding a relationship between the identifier of the car and the identified set of facial fingerprints to the relationship database.

A fifteenth point being a method of the thirteenth point, further comprising: identifying a transaction in the first set of images; retrieving a set of transaction attributes from a transactional capture device as a function of the identified transaction; adding the set of transaction attributes to the attribute database as a function of the second set of identifiers.

A sixteenth point being a method of the thirteenth point, further comprising: deriving an average speed of the car from at least two of the first set of images, wherein the media content playback device comprises a roadside billboard; and deriving a time as a function of the average speed and a distance to the roadside billboard, wherein playing the portion of the set of media content comprises delaying a time to play the portion of the set of media content as a function of the derived time.

A seventeenth point being a method of the twelfth point, wherein deriving a first set of attributes comprises deriving the first set of attributes as a function of both a portion of the first set of identifiers and the second set of identifiers using the attribute database.

An eighteenth point being a method of the twelfth point, further comprising: identifying an interaction with the media content playback device within the first set of images; and playing a different portion of the set of media content on the media content playback device as a function of the interaction.

A nineteenth point being a method of the eighteenth point, wherein the interaction comprises an action of looking away from the media content playback device.

A twentieth point being a method of the nineteenth point, further comprising updating a set of attributes associated with at least one of the first set of identifiers and the second set of identifiers as a function of the interaction.

What is claimed is:

1. A system for providing media content, comprising:
a first image capture device that captures a first set of captured images, wherein the first set of captured images comprise a first set of image fingerprints;
a media content playback device;
an image database that correlates image fingerprints with identifiers;
a relationship database that correlates identifiers with one another;
an attribute database that correlates identifiers with attributes;
a media database that correlates attributes with media content; and
a media content computer system programmed to:
generate a first set of identifiers as a function of the first set of image fingerprints using the image database,
generate a second set of identifiers as a function of the first set of identifiers using the relationship database,
generate a derived set of attributes as a function of the second set of identifiers using the attribute database,
generate a set of media content as a function of the derived set of attributes using the media database; and
play at least a portion of the set of media content on the media content playback device.

2. The system of claim 1, wherein the derived set of attributes are generated as a function of both the first set of identifiers and the second set of identifiers.

3. The system of claim 1, wherein the first set of identifiers comprise a license plate number and wherein the second set of identifiers comprise a facial fingerprint.

4. The system of claim 3, wherein the second set of identifiers comprises both a person and a position within a car associated with the license plate number.

5. The system of claim 1, further comprising a second image capture device that captures a second set of captured images,
wherein the second set of captured images comprise a second set of image fingerprints, and
wherein the media content computer system is further programmed to:
generate a correlation set of identifiers as a function of the second set of image fingerprints using the image database,
generate a set of relationships using the correlation set of identifiers, and
saving the set of relationships in the relationship database.

6. The system of claim 5, wherein the second set of image fingerprints comprise both a license plate number and a facial fingerprint.

7. The system of claim 1, further comprising:
a transactional capture device that captures a set of transaction attributes and a captured transaction identifier,
wherein the media content computer system is further programmed to:
recognize a transaction in the first set of captured images;
generate a generated transaction identifier as a function of the recognized transaction;
transmit the generated transaction identifier to the transactional capture device;
receive the set of transaction attributes from the transactional capture device; and
save the set of transaction attributes to the attribute database.

8. The system of claim 7,
wherein the generated transaction identifier and the captured transaction identifier both comprise a timestamp value, and
wherein the transactional capture device matches the generated transaction identifier with the captured transaction identifier before transmitting the set of transaction attributes to the media content computer system.

9. The system of claim 7, wherein the media content computer system recognizes a transaction in the first set of captured images by identifying a movement among a plurality of the first set of captured images.

10. The system of claim 7, wherein the derived set of attributes comprises at least a portion of the set of transaction attributes.

11. The system of claim 1, wherein the media content computer system is further programmed to transmit at least a portion of the derived set of attributes to a service computer system.

12. A method for generating targeted media content, comprising:
capturing a first set of images using a first image capture device;
identifying a first set of captured image fingerprints within the first set of images;
deriving a first set of identifiers as a function of the identified first set of captured image fingerprints using an image database;
deriving a second set of identifiers as a function of the first set of identifiers using a relationship database;
deriving a first set of attributes as a function of the second set of identifiers using an attribute database;
deriving a set of media content as a function of the first set of attributes using a media database; and
playing a portion of the set of media content on a media content playback device.

13. The method of claim 12,
wherein identifying the first set of captured image fingerprints comprises identifying a license plate number within the first set of images,
wherein deriving the first set of identifiers comprises deriving an identifier of a car as a function of the license plate number using the image database, and
wherein deriving the second set of identifiers comprises deriving a set of occupants of the car from the identifier of the car using the relationship database.

14. The method of claim 13, further comprising:
capturing a second set of images using a second image capture device;
identifying a second set of captured image fingerprints within the second set of images,
wherein identifying the second set of captured image fingerprints comprises identifying the license plate number within the second set of images and identifying a set of facial fingerprints within the second set of images;
deriving a set of occupant identifiers as a function of the identified set of facial fingerprints using the image database;
deriving the identifier of the car as a function of the license plate number using the image database; and adding a relationship between the identifier of the car and the identified set of facial fingerprints to the relationship database.

15. The method of claim 13, further comprising:
identifying a transaction in the first set of images;
retrieving a set of transaction attributes from a transactional capture device as a function of the identified transaction;
adding the set of transaction attributes to the attribute database as a function of the second set of identifiers.

16. The method of claim 13, further comprising:
deriving an average speed of the car from at least two of the first set of images, wherein the media content playback device comprises a roadside billboard; and
deriving a time as a function of the average speed and a distance to the roadside billboard, wherein playing the portion of the set of media content comprises delaying a time to play the portion of the set of media content as a function of the derived time.

17. The method of claim 12, wherein deriving a first set of attributes comprises deriving the first set of attributes as a function of both a portion of the first set of identifiers and the second set of identifiers using the attribute database.

18. The method of claim 12, further comprising:
identifying an interaction with the media content playback device within the first set of images; and
playing a different portion of the set of media content on the media content playback device as a function of the interaction.

19. The method of claim 18, wherein the interaction comprises an action of looking away from the media content playback device.

20. The method of claim 19, further comprising updating a set of attributes associated with at least one of the first set of identifiers and the second set of identifiers as a function of the interaction.

* * * * *